United States Patent [19]
VanderPloeg et al.

[11] Patent Number: 5,859,681
[45] Date of Patent: Jan. 12, 1999

[54] NORMALLY WHITE TWISTED NEMATIC LCD WITH POSITIVE UNIAXIAL AND NEBATIVE BIAXIAL RETARDERS HAVING $N_X > N_Y > N_Z$

[75] Inventors: John A. VanderPloeg, Highland; Gang Xu, Northville; Adiel Abileah, Farmington Hills, all of Mich.

[73] Assignee: OIS Optical Imaging Systems, Inc., Northville, Mich.

[21] Appl. No.: 81,829

[22] Filed: May 20, 1998

Related U.S. Application Data

[63] Continuation of Ser. No. 768,502, Dec. 18, 1996, which is a continuation-in-part of Ser. No. 559,275, Nov. 15, 1995, Pat. No. 5,657,140, and Ser. No. 711,797, Sep. 10, 1996, Pat. No. 5,706,068, said Ser. No. 559,275, and Ser. No. 711,797, each is a continuation-in-part of Ser. No.167,652, Dec. 15, 1993, Pat. No. 5,570,214.

[51] Int. Cl.⁶ .................................................. G02F 1/1335
[52] U.S. Cl. ............................................ 349/120; 349/118
[58] Field of Search ..................................... 349/120, 118

[56] References Cited

U.S. PATENT DOCUMENTS

| | | | |
|---|---|---|---|
| 4,889,412 | 12/1989 | Clerc et al. .............................. | 349/118 |
| 5,071,997 | 12/1991 | Harris ..................................... | 528/353 |
| 5,138,474 | 8/1992 | Arakawa ................................. | 349/120 |
| 5,184,236 | 2/1993 | Miyashita et al. ...................... | 349/120 |
| 5,189,538 | 2/1993 | Arakawa ................................. | 349/120 |
| 5,213,582 | 5/1993 | Arakawa et al. ......................... | 8/506 |
| 5,227,903 | 7/1993 | Miyazawa et al. ..................... | 349/120 |
| 5,291,323 | 3/1994 | Ohnishi et al. ......................... | 349/120 |
| 5,344,916 | 9/1994 | Harris et al. ............................ | 528/353 |
| 5,406,396 | 4/1995 | Akatsuka et al. ....................... | 349/118 |
| 5,430,565 | 7/1995 | Yamanouchi et al. .................. | 349/120 |
| 5,430,566 | 7/1995 | Sakaya et al. .......................... | 349/118 |
| 5,504,603 | 4/1996 | Winker et al. .......................... | 349/117 |
| 5,557,434 | 9/1996 | Winker et al. .......................... | 349/117 |
| 5,570,214 | 10/1996 | Abileah et al. ........................ | 349/120 |
| 5,576,861 | 11/1996 | Abileah et al. ........................ | 349/120 |
| 5,594,568 | 1/1997 | Abileah et al. ........................ | 349/120 |
| 5,612,801 | 3/1997 | Winker ................................... | 349/119 |
| 5,638,197 | 6/1997 | Gunning, III et al. .................. | 349/96 |

FOREIGN PATENT DOCUMENTS

| | | |
|---|---|---|
| 0679921 | 11/1995 | European Pat. Off. . |
| 0774682 | 5/1997 | European Pat. Off. . |
| 456802 | 2/1992 | Japan . |
| 497322 | 3/1992 | Japan . |
| 4311903 | 11/1992 | Japan . |
| 5257014 | 10/1993 | Japan . |
| 6130227 | 5/1994 | Japan . |

OTHER PUBLICATIONS

Patent Abstracts of Japan, 07253573, Mar. 10, 1995.

*Primary Examiner*—William L. Sikes
*Attorney, Agent, or Firm*—Joseph A. Rhoa, Esq.

[57] ABSTRACT

A normally white twisted nematic liquid crystal display is provided for outputting improved viewing characteristics which are defined by high contrast ratios and reduced inversion. The display includes both positive and negative retardation films, the negative films being biaxial and defined by $n_x > n_y > n_z$ in certain embodiments where the "z" direction is substantially perpendicular to the film plane and the "x" and "y" directions are substantially parallel to the film plane. By providing the positive and biaxial negative retarders with specific retardation values and/or ratios, improved viewing characteristics are provided. According to other embodiments, a positive and a negative (uniaxial or biaxial) retarder may be provided on only one side of the liquid crystal layer.

1 Claim, 48 Drawing Sheets

NORMALLY WHITE TWISTED NEMATIC LCD WITH POSITIVE UNIAXIAL AND NEBATIVE BIAXIAL RETARDERS HAVING $N_X > N_Y > N_Z$

This is a continuation of application Ser. No. 08/768,502, filed Dec. 18, 1996; which is a CIP of Ser. No. 08/559,275, filed Nov. 15, 1995 (now U.S. Pat. No. 5,657,140) which is a CIP of Ser. No. 08/167,652 filed Dec. 15, 1993 (now U.S. Pat. No. 5,570,214); and this application is also a CIP of Ser. No. 08/711,797, filed Sep. 10, 1996, which is a continuation of Ser. No. 08/167,652, filed Dec. 15, 1993, (now U.S. Pat. No. 5,570,214), the disclosures of which are all hereby incorporated herein by reference.

This invention relates to a normally white (NW) liquid crystal display (LCD) including positive uniaxial and negative biaxial (or uniaxial) retardation films. More particularly, this invention relates to a NW twisted nematic (TN) LCD including positive and negative retardation films (birefringent films) of specific values, arranged in a manner so as to provide improved contrast, wherein the negative retardation films are of a biaxial nature in certain embodiments.

RELATED APPLICATIONS

This application is related to commonly owned U.S. Pat. No. 5,576,861, filed Jun. 8, 1994; U.S. Ser. No. 08/235,691, filed Apr. 29, 1994; U.S. Ser. No. 08/559,275, filed Nov. 15, 1995; U.S. Ser. No. 08/711,797, filed Sep. 10, 1996, and U.S. Pat. No. 5,570,214, filed Dec. 15, 1993, the entire disclosures of which are hereby incorporated herein by reference. Each of these commonly owned applications and/or patents relates to a liquid crystal display with specific retarder values, contrast ratios, and/or retarder positions or orientations.

BACKGROUND OF THE INVENTION

Informational data in liquid crystal displays (LCDs) is presented in the form of a matrix array of rows and columns of numerals or characters (i.e. pixels) which are generated by a number of segmented electrodes arranged in a matrix pattern. The segments are connected by individual leads to driving electronics which apply a voltage to the appropriate combination of segments and adjacent liquid crystal (LC) material in order to display the desired data and/or information by controlling the light transmitted through the liquid crystal (LC) material.

Contrast ratio (CR) is one of the most important attributes considered in determining the quality of both normally white (NW) and normally black (NB) LCDs. The contrast ratio (CR) in a normally white display is determined in low ambient conditions by dividing the "off-state" light transmission (high intensity white light) by the "on-state" or darkened transmitted intensity. For example, if the "off-state" transmission is 200 fL at a particular viewing angle and the "on-state" transmission is 5 fL at the same viewing angle, then the display's contrast ratio at that particular viewing angle is 40 (or 40:1) for the particular "on-state" driving voltage utilized.

Accordingly, in normally white LCDs, a significant factor adversely limiting contrast ratio is the amount of light which leaks through the display in the darkened or "on-state." In a similar manner, in normally black displays, a significant factor limiting the contrast ratio achievable is the amount of light which leaks through the display in the darkened or "off-state." The higher and more uniform the contrast ratio of a particular display over a wide range of viewing angles, the better the LCD in most applications.

Normally black (NB) twisted nematic displays typically have better contrast ratio contour curves or characteristics then do their counterpart NW displays (i.e. the NB image can often be seen better at large or wide viewing angles). However, NB displays are optically different than NW displays and are much more difficult to manufacture due to their high dependence on the cell gap or thickness "d" of the liquid crystal layer as well as on the temperature of the liquid crystal (LC) material itself. Accordingly, a long-felt need in the art has been the ability to construct a normally white display with high contrast ratios over a large range of viewing angles, rather than having to resort to the more difficult and expensive to manufacture NB displays in order to achieve these characteristics.

What is often needed in NW LCDs is an optical compensating or retarding element(s), i.e. retardation film(s), which introduces a phase delay that restores the original polarization state of the light, thus allowing the light to be substantially blocked by the output polarizer (analyzer) in the "on-state." Optical compensating elements or retarders are known in the art and are disclosed, for example, in U.S. Pat. Nos. 5,184,236; 5,189,538; 5,406,396; 4,889,412; 5,344,916; 5,196,953; 5,138,474; and 5,071,997.

The disclosures of Ser. No. 08/559,275; and U.S. Pat. Nos. 5,570,214 and 5,576,861 (all incorporated herein by reference) in their respective "Background" sections illustrate and discuss contrast ratio, and driving voltage versus intensity (fL), graphs of prior art NW displays which are less than desirable. Prior art NW LCD viewing characteristics are problematic in that, for example, their contrast ratios are limited both horizontally and vertically (and are often non-symmetric), and their gray level performance lacks consistency.

Gray level performance, and the corresponding amount of inversion, are also important in determining the quality of an LCD. Conventional active matrix liquid crystal displays (AMLCDs) typically utilize anywhere from about 8 to 64 different driving voltages. These different driving voltages are generally referred to as "gray level" voltages. The intensity of light transmitted through the pixel(s) or display depends upon the driving voltage utilized. Accordingly, conventional gray level voltages are used to generate dissimilar shades of color so as to create different colors and images when, for example, the shades are mixed with one another.

Preferably, the higher the driving voltage in a normally white display, the lower the intensity (fL) of light transmitted therethrough. The opposite is true in NB displays. Thus, by utilizing multiple gray level driving voltages, one can manipulate either a NW or NB LCD to emit desired intensities and shades of light/color. A gray level voltage $V_{ON}$ is generally known as any driving voltage greater than $V_{th}$ (threshold voltage) up to about 4.0 to 6.5 volts.

Gray level intensity in an LCD is dependent upon the display's driving voltage. It is desirable in NW displays to have an intensity versus driving voltage curve at a given viewing angle wherein the intensity of light emitted from the display or pixel continually and monotonically decreases as the driving voltage increases. In other words, it is desirable to have gray level performance in a NW pixel such that the transmission intensity (fL) at 6.0 volts is less than that at 5.0 volts, which is in turn less than that at 4.0 volts, which is less than that at 3.0 volts, which is in turn less than that at 2.0 volts, etc. Such desired gray level curves across a wide range of view allows the intensity of light reaching viewers at different viewing angles to be easily and consistently controlled.

U.S. Pat. Nos. 5,576,861 and 5,570,214 discuss, in their respective "Background" sections, prior art NW LCDs with inversion problems (e.g. inversion humps, specifically their transmission versus driving voltage graphs). As discussed therein, inversion humps are generally undesirable. A theoretically perfect driving voltage versus intensity (fL) curve for an NW display would have a decreased intensity (fL) for each increase in gray level driving voltage at all viewing angles. In contrast to this, inversion humps represent increase(s) in intensity of radiation emitted from the LCD or light valve (LV) for a corresponding increase in gray level driving voltage. Accordingly, it would satisfy a long-felt need in the art if a normally white TN liquid crystal display could be provided with no or little inversion and improved contrast ratios over a wide range of viewing angles.

U.S. Pat. No. 5,344,916 discloses a liquid crystal display including positive and negative retardation films. The negative uniaxial retarders (or birefringent films) of the '916 patent have as a characteristic that $n_x=n_y>n_z$. The "z" direction or axis is perpendicular to the plane of the film, while the "x" and "y" axes (of $n_x$ and $n_y$) are parallel to the retardation film plane. Thus, the optical axes of the negative retardation films in the '916 patent are perpendicular to the film plane. It is noted that $n_x$, $n_y$, and $n_z$ are the respective indices of refraction.

Unfortunately, while use of the negative retardation films of the '916 patent improves contrast over some prior art LCDs, twisted nematic (TN) displays including same may suffer from less than desirable contrast ratios at large viewing angles. Pointedly, the disclosure of the '916 patent does not appreciate, suggest, or disclose the use of negative biaxial and positive retarders together at specified values, ratios, and/or locations to even further improve viewing characteristics of an LCD as discussed below by the instant inventors.

U.S. Pat. No. 5,189,538 (see also U.S. Pat. No. 5,138,747) discloses a super twisted nematic (STN) LCD including films having different birefringent values. Unfortunately, STN LCDs have no real optical correspondence or correlation to ≈90° TN LCDs with regard to the behavior of the image due to retarders. In other words, teachings regarding retarders in STN devices (e.g. 270° twist) often have little or no relevance with regard to TN (≈90° twist) LCDs due to the substantially different optical characteristics of STNs.

U.S. Pat. No. 4,889,412 discloses an LCD with electrically controlled birefringence (ECB) and negative anisotropy. Unfortunately, ECB displays do not use twisted nematic LC material as does the instant invention. Again, ECB display teachings are generally unrelated to TN (≈90° twist) displays with regard to retardation teachings and principles.

U.S. Pat. No. 5,291,323 discloses a liquid crystal display with "positive and negative compensating films each with its optical axis parallel to the surface." Unfortunately, the disclosure and teaching of the '323 patent are unrelated to TN displays such as those of the instant invention, in that the '323 patent relates to supertwisted (e.g. 240° twist) LCDs.

The term "rear" when used herein but only as it is used to describe substrates, polarizers, electrodes, buffing films or zones, and orientation films means that the described element is on the backlight side of the liquid crystal material, or in other words, on the side of the LC material opposite the viewer.

The term "front" when used herein but only as it is used to describe substrates, polarizers, electrodes, buffing films or zones and orientation films means that the described element is located on the viewer side of the liquid crystal material.

The actual LCDs and light valves made and/or tested herein included a liquid crystal material with a birefringent value (Δn) of 0.084 at room temperature, Model No. ZLI-4718 obtained from Merck, unless specified otherwise.

The term "retardation value" as used herein for uniaxial retarders means "d·Δn" of the retardation film or plate, where "d" is the film or plate thickness and "Δn" is the film birefringence (i.e. difference in indices of refraction).

The term "interior" when used herein to describe a surface or side of an element (or an element itself), means that closest to the liquid crystal material.

The term "light valve" as used herein means a liquid crystal display including a rear linear polarizer, a rear transparent substrate, a rear continuous pixel electrode, a rear orientation film, an LC layer, a front orientation film, a front continuous pixel electrode, a front substrate, and a front polarizer (i.e. without the presence of color filters and active matrix driving circuitry such as TFTs). Such a light valve may also include retardation film(s) disposed on either side of the LC layer as described with respect to each example and embodiment herein. In other words, a "light valve" (LV) may be referred to as one giant pixel without segmented electrodes.

For all circular contrast ratio graphs herein, e.g. FIGS. 11(d), 12, 15(b), 16, 17, 18, 21(b), 22(b), 23, 24(b), 25, 26(b), 27(b), 28, 29, 30(b), 31, 32(b), 33(b), and 34(b); "EZContrast" equipment available from Eldim of Caen, France (ID #204F) was used to develop these graphs. This equipment includes a system for measuring Luminance and Contrast versus viewing angle (incident and azimuth angle), utilizing 14 bits A/D conversion to give luminance measurements from $\frac{1}{10}$ to 8,000 cd/m$^2$, with an accuracy of 3% and a fidelity of 1%. A temperature regulated CCD sensor and photopic response (specially designed lenses) are part of this commerically available Eldim system and corresponding software. The measurement device of this Eldim system includes a specially designed large viewing angle optical device having a numerical aperture of 0.86. The Eldim software is Windows™ 3.1 based, running on any 486 and above PC, supporting DDE interface with other programs.

It is apparent from the above that there exists a need in the art for a normally white liquid crystal display wherein the viewing zone of the display has both high contrast ratios and little or no inversion over a wide range of viewing angles.

This invention will now be described with respect to certain embodiments thereof, accompanied by certain illustrations wherein:

SUMMARY OF THE INVENTION

Generally speaking this invention fulfills the above-described needs in the art by providing a normally white twisted nematic liquid crystal display comprising:

a liquid crystal layer for twisting at least one normally incident visible wavelength of light from about 80° to 100° as it passes therethrough when the liquid crystal layer is in substantially the "off-state" thereby defining a normally white twisted nematic display;

a pair of negative biaxial retarders sandwiching the liquid crystal layer therebetween, wherein $n_x>n_y>n_z$ for each of the negative biaxial retarders;

a pair of positive retarders; and wherein the retardation value $d \cdot (n_x-n_z)$ of each of the negative biaxial retarders is from about 70 to 130 nm, and the retardation value d·($n_x$−$n_y$) of each of the negative biaxial retarders is from about 1 to 20 nm, and the retardation value d·Δn of each of the two positive retarders is from about 70 to 200 nm.

This invention further fulfills the above-described needs in the art by providing a method of making a twisted nematic LCD comprising the steps of:

providing a pair of negative biaxial retarders each defined by $n_x$>$n_y$>$n_z$;

providing a pair of positive uniaxial retarders;

disposing a twisted nematic liquid crystal layer between the pair of negative biaxial retarders, and also between the pair of positive uniaxial retarders; and disposing the pair of negative biaxial retarders between the pair of positive retarders so that the resulting display outputs contrast ratios of at least about 30 at horizontal viewing angles along the 0° vertical axis between about ±40°.

According to certain embodiments, an isotropic air gap may be provided to improve viewing characteristics.

According to still further embodiments, positive and negative (uniaxial or biaxial) retarders may be provided on only one side (e.g. the rear) of the LC layer.

This invention will now be described with respect to certain embodiments thereof, along with reference to the accompanying illustrations, wherein:

DETAILED DESCRIPTION OF CERTAIN EMBODIMENTS OF THIS INVENTION

Figure 1:
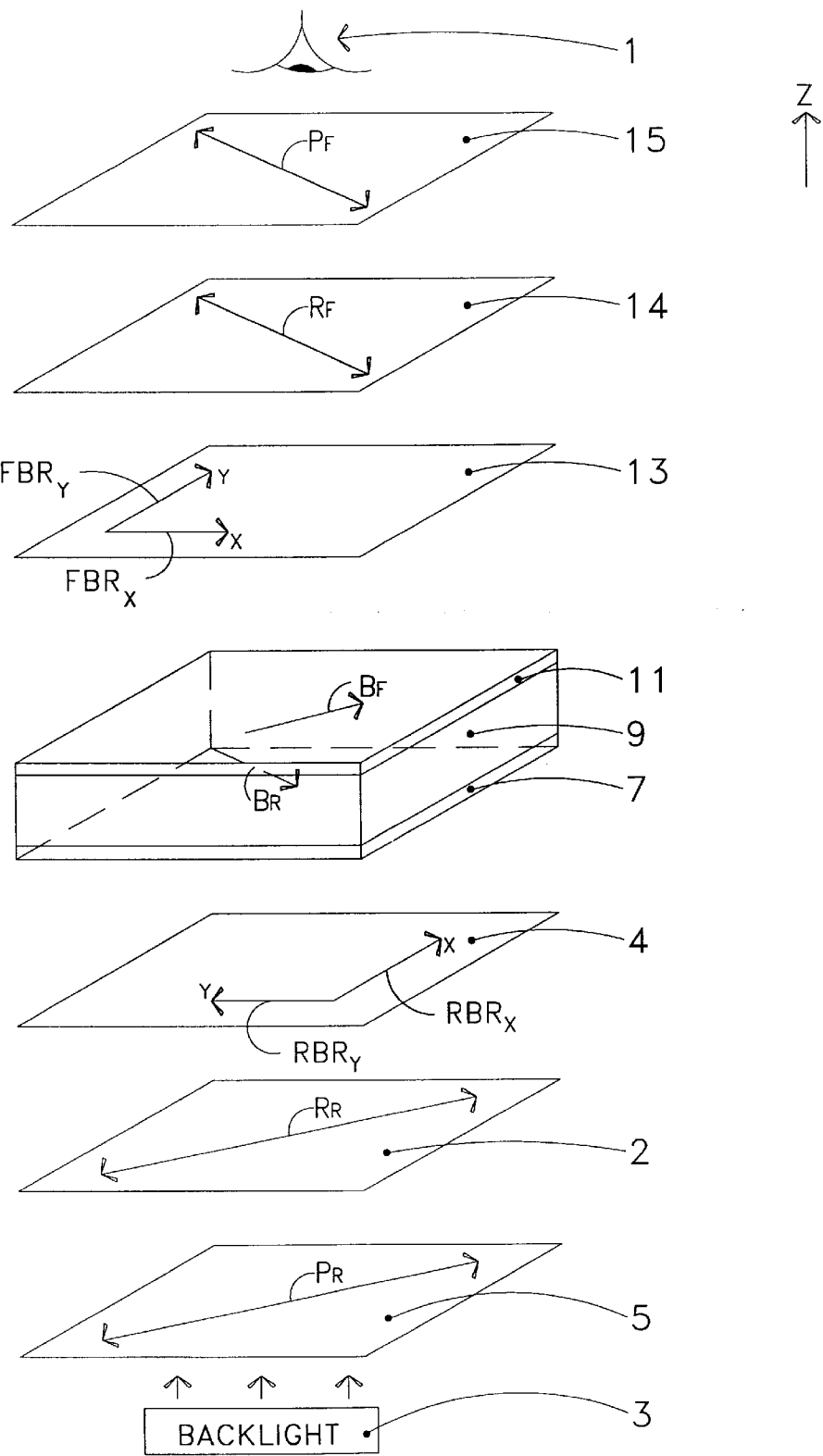
FIG. 1 is a schematic diagram of the optical components of a NW twisted nematic LCD including a pair of positive retarders and a pair of biaxial negative retarders according to an embodiment of this invention.

Referring now more particularly to the accompanying drawings in which like reference numerals indicate like parts throughout the several views.

FIG. 1 is an exploded schematic view of the optical components and their respective orientations of a twisted nematic NW LCD according to a first embodiment of this invention, this LCD being a light valve (LV) or an AMLCD having a matrix array of pixels and colored (e.g. RGB or RGBW) subpixels according to certain embodiments. As shown, this display includes from the rear forward toward viewer 1, conventional backlight 3, rear or light-entrance linear polarizer 5, rear positive uniaxial retarder 2, rear negative biaxial retarder 4 (including indices of refraction $n_x$, $n_y$, and $n_z$), rear buffing or orientation film 7, twisted nematic (TN) liquid crystal layer 9, front buffing or orientation film 11, front negative biaxial retarder 13 (including indices of refraction $n_x$, $n_y$, and $n_z$), front positive uniaxial retarder 14, and finally front or light-exit linear polarizer 15.

Glass substrates are located on both sides of liquid crystal layer 9 so as to be disposed between the respective orientation films and their adjacent negative biaxial retarders. Driving electrodes are disposed between the substantially transparent substrates and their adjacent orientation layers. A key to our invention is the surprise finding that when the positive and negative retarders referenced above are within a particular retardation value(s) range and/or ratio, or are arranged in predetermined positions in the LCD, improved viewing characteristics of the display result. For example, the viewing angle of the LCD is wider/larger, while inversion is lessened.

Retarders 4 and 13 are said to be "negative" as $n_z$ is less than both $n_x$ and $n_y$. Indices of refraction $n_x$ and $n_y$, while being co-planar, are oriented at a 90° angle relative to one another. Index of refraction $n_z$ is perpendicular to the plane defined by the $n_x$ and $n_y$ directions. Retarders 4 and 13 each have a retardation value $d \cdot (n_x - n_z) = 85$ nm, and a value $d \cdot (n_x - n_y) = 8$ nm, in certain embodiments.

Backlight 3 is conventional in nature and emits substantially collimated, or alternatively diffused, light toward the display panel. Backlight 3 may be, for example, the backlighting assembly disclosed in commonly owned U.S. Pat. No. 5,161,041, the disclosure of which is hereby incorporated herein by reference. Other conventional high intensity substantially collimated or diffuse backlight assemblies may also be used.

Rear and front polarizers, 5 and 15 respectively, are linear in nature according to certain embodiments of this invention, and their respective linear transmission axes $P_R$ and $P_F$ are oriented substantially perpendicular to one another (± about 10°) so that LCDs of different embodiments of this invention are of the normally white (NW) type. Therefore, when a driving voltage (e.g. 0.0 or 0.1 V) below the threshold voltage $V_{th}$ is applied by the electrodes across liquid crystal (LC) layer 9, transmission axes $P_R$ and $P_F$ of polarizers 5 and 15, respectively, are oriented such that the light emitted from backlight 3 proceeds through and is linearly polarized in direction $P_R$ by rear polarizer 5, is then twisted (e.g. from about 80° to 100°) by twisted nematic LC layer 9, and finally exits front polarizer or analyzer 15 via transmission axis $P_F$ thus reaching viewer 1. The light reaches viewer 1 because its polarization direction upon reaching front polarizer 15 is similar to the direction defined by transmission axis $P_F$. Thus, a NW display or pixel to which a voltage less than $V_{th}$ is applied is said to be in the "off-state" and appears white (or colored if color filters are present) to the viewer. These conventional polarizers 5 and 15 are commercially available from, for example, Nitto Denko America, as #G1220DUN or 102555-7.

However, when a substantial driving voltage (i.e. greater than the threshold voltage $V_{th}$) is applied across selected NW pixels of the matrix array, the light transmitted through rear polarizer 5 is not twisted as much by LC layer 9 and thus is at least partially blocked by front polarizer 15 due to the fact that the polarization direction of light reaching the interior surface of front polarizer 15 is substantially perpendicular (or otherwise non-aligned) to transmission axis $P_F$, thereby resulting in substantially no, or a lessor amount of, light reaching viewer 1 by way of the selected pixel(s) to which the substantial driving voltage (e.g. 4–6.5 volts) is applied. Thus, driven pixels in the LCD appear darkened to viewer 1, these pixels said to be in the "on-state."

Figure 2A:
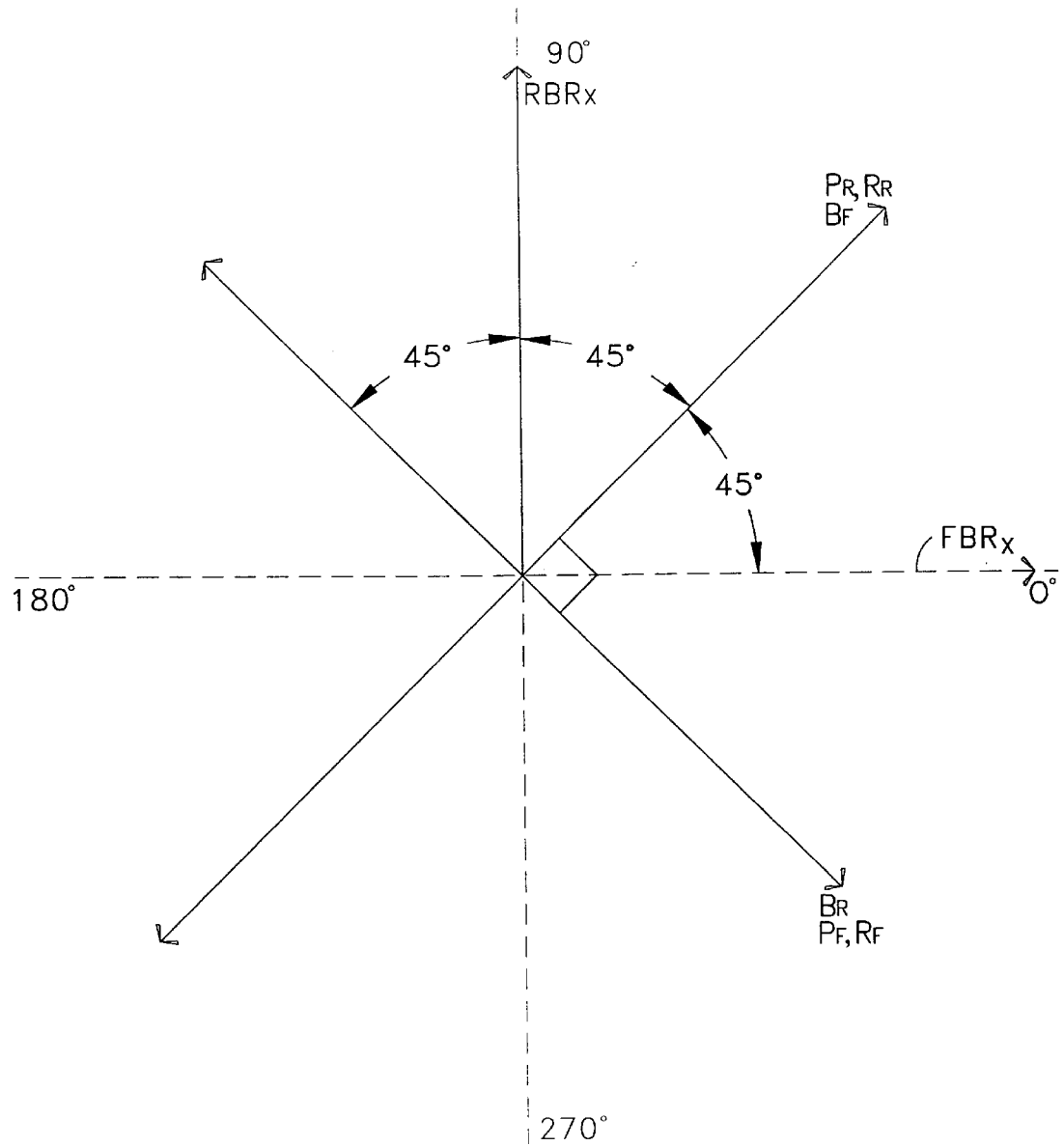
FIG. 2 illustrates the angular relationship between the respective axes shown in FIG. 1 according to one embodiment of this invention, as viewed from the point of view of the viewer.
Figure 3:
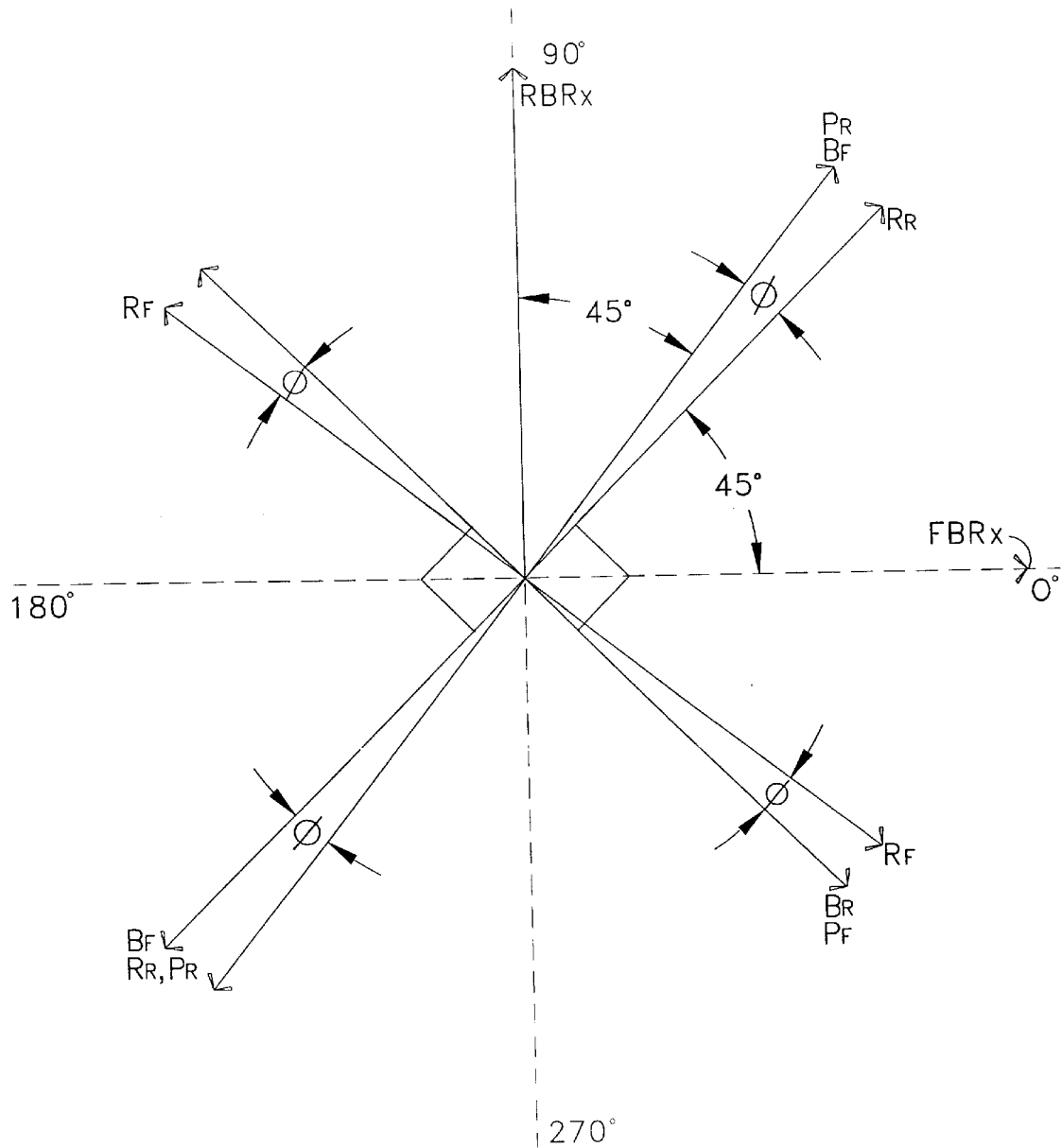
FIG. 3 illustrates the angular relationship between the axes shown in FIG. 1 according to another embodiment of this invention, again, from the point of view of the viewer.

In certain embodiments of this invention, transmission axis $P_R$ of rear polarizer 5 and transmission axis $P_F$ of front polarizer 15 are oriented in a manner substantially perpendicular (± about 10°) to one another as shown in FIGS. 1–3 so as to define a NW twisted nematic (TN) cell. However, polarizers 5 and 15 may alternatively be oriented in other manners which also render the display of the NW type.

Rear and front orientation or buffing films 7 and 11, respectively, are each from about 250–500 Å thick, and may be made of a substantially transparent polyimide as is known in the art. Rear orientation film 7 is conventionally buffed or oriented in direction $B_R$ as shown in FIGS. 1–3. Likewise, front orientation film 11 is conventionally buffed in direction $B_F$. Buffing directions $B_R$ and $B_F$ are oriented substantially perpendicular (± about 10°) to one another so as to allow the molecules of liquid crystal layer 9, when in the off or non-driven state, to be twisted from about 80° to 100°, preferably about 90°. The term "off-state" means that a voltage below the threshold voltage ($V_{th}$) is applied across LC layer 9.

Liquid crystal layer 9 has a thickness "d" of from about 4.0 to 6.5 $\mu$m according to certain embodiments, preferably from about 5.0 to 6.0 $\mu$m. Layer 9 has a birefringent value Δn of from about 0.08 to 0.10 according to certain embodiments, preferably from about 0.084 to 0.086.

The voltage applied across LC layer 9 determines the degree of twisting of the liquid crystal molecules and thus dictates the polarization direction of light emitted from the front or viewer side of layer 9. In turn, the polarization direction of light reaching front polarizer 15 dictates the amount of light permitted to pass therethrough via axis $P_F$ and reach viewer 1, in that the closer aligned transmission axis $P_F$ and the polarization direction of light reaching polarizer 15, the more light that is allowed to pass and reach viewer 1. While the application of a voltage $>V_{th}$ to layer 9 causes the LC molecules to substantially align vertically (to a degree that is a function of the voltage applied), the LC molecules do not completely stand on end or become perfectly aligned in the vertical direction as is known in the art. This gives rise to the need for retardation (or birefringent) films.

Positively birefringent uniaxial retardation plates or films 2 and 14 (e.g. A-plates) with optical axes $R_R$ and $R_F$ respectively (i.e. slow axes) in this embodiment (FIGS. 1–2) are disposed on opposing sides of layer 9 thereby sandwiching LC layer 9 therebetween. According to certain alternative embodiments, positive retarders 2 and 14 may be positive uniaxial tilted retarders of the type disclosed in co-assigned Ser. No. 08/383,200 or U.S. Pat. No. 5,504,603, the disclosures of which are hereby incorporated herein by reference. Slightly biaxial positive retarders will also suffice for films 2 and 14 in certain alternative embodiments.

Retardation films 2 and 14, in said certain embodiments of this invention, when positively birefringent and uniaxial in nature, may be obtained from, for example, Nitto Corporation, Japan, or Nitto Denko America, Incorporated, New Brunswick, N.J. as Model No. NRF-140 (i.e. 140 nm positive uniaxial retarders).

It is noted that U.S. Pat. No. 5,570,214 (parent hereto) discloses positive uniaxial retarders, each having a retardation value d·Δn of from about 80 to 200 nm, more preferably from about 100–160 nm, and most preferably from about 120 to 140 nm.

Negative biaxial retarders 4 and 13 are defined by the characteristic $n_x > n_y > n_z$, where $n_x$, $n_y$, and $n_z$ are respective indices of refraction, and the "z" direction is substantially perpendicular to the film plane while the "x" and "y" directions are substantially parallel to the film plane as shown in FIG. 1. According to certain embodiments of this invention, the $n_x$ index direction of retarder 4 differs from the $n_x$ index direction of retarder 13 by from about 80°–100°, preferably about 90°, while their respective planes are parallel. Negative biaxial retarders 4 and 13 may also be obtained from Nitto Denko America or Nitto Corporation (Japan).

According to certain embodiments, the positive and negative retarders, and the polarizers, may all be separate sheets, although they alternatively may be all integrally formed or laminated together with a known laminating material according to other embodiments. Thus, films 2, 4, and 5,(and/or films 13–15), for example, may be laminated together to form a single laminated sheet having a positive retarder, a negative biaxial retarder, and a polarizer.

FIGS. 2 and 3 illustrate the relationship between the FIG. 1 axes according to different embodiments of this invention, from the point of view of viewer 1. With reference to FIG. 2, rear transmission axis $PR_R$, rear optical or slow retarder axis $R_R$, and front buffing direction $B_F$ are substantially parallel (± about 10°) to one another, while rear buffing direction $B_R$, front polarizer transmission axis $P_F$, and front positive retarder axis $R_F$ are also substantially parallel (± about 10°) to one another thereby causing the display to output substantially symmetrical viewing characteristics relative to the "normal" (0° horizintal, 0° vertical) viewing angle. In such embodiments, axis $P_R$ and direction $B_R$ are substantially perpendicular to one another as are axis $P_F$ and direction $B_F$. A display having such an optical arrangement is said to be "X-buffed." The term "X-buffed" means that rear polarizer transmission axis $P_R$ is substantially perpendicular to rear buffing direction $B_R$, while the front polarizer transmission axis $P_F$ is substantially perpendicular to the front buffing direction $B_F$.

While the FIG. 2 optical configuration of the FIG. 1 NW display illustrates front retarder axis $R_F$ being substantially parallel to front transmission axis $P_F$, and rear retarder axis $R_R$ being substantially parallel to rear polarizer transmission axis $P_R$, the positive retarder optical axes (i.e. the slow axes) of retarders 2 and 14 may be angled from these positions as, for example, shown in the FIG. 3 embodiment.

FIG. 3 illustrates a configuration according to another embodiment of this invention corresponding to the FIG. 1 display. As shown in FIG. 3, φ may equal from about 1°–10° in either direction. This means, for example, that front positive retarder optical axis $R_F$ may be rotated φ° from axis $P_F$ in the counterclockwise direction (as viewed from the viewpoint of viewer 1), while rear positive retarder optical axis $R_R$ of retarder 2 is rotated φ° in the clockwise direction relative to rear polarizer transmission axis $P_R$. By angling the slow axes of positive retarders 2 and 14 symmetrically in such a manner that φ equals from about 1°–10° (e.g. 3°), the viewing zone of best contrast output by the display is shiftable in the vertical direction. This is of particular interest, for example, in avionic cockpit applications when the display's best viewing zone is needed, not at normal, but at a predetermined vertical viewing angle with respect thereto (e.g. at an angle +20° vertical of normal).

The slow axes $R_R$ and $R_F$ of positive retarders 2 and 14 may be angled φ° either symmetrically or non-symmetrically with respect to one another according to certain embodiments of this invention, depending on the desired viewing characteristics of the display. Angle φ for each positive retarder axis may be adjusted from about 0° to 10° in either the positive or negative direction (i.e. clockwise or counterclockwise). More preferably, φ may be from about 3° to 8°, and most preferably from about 3° to 5° in either direction. By adjusting φ for both (or alternatively only one) of the positive retarders, the position of the highest contrast viewing zone may be shifted vertically and the highest contrast areas (i.e. the "eyes" of the contrast plots) in the viewing zone may be spaced closer or further apart. This is particularly useful when not only the pilot, but also the co-pilot view a display within a cockpit.

It has been found that by providing the positive uniaxial and negative biaxial retarders of this invention with particular retardation or birefringent values, predetermined positions, and/or retardation value ratios, improved viewing characteristics (e.g. higher contrast ratios, wider viewing zones, and/or reduced inversion) of a normally white TN LCD may be achieved.

According to certain embodiments of this invention, the retardation value of each of the two positive uniaxial retarders 2 and 14 is from about 70 to 200 nm, more preferably from about 80 nm to 200 nm, even more preferably from about 120 to 160 nm, and most preferably about 140 nm. In combination with these positive retarder values, it has been found that excellent results are achieved when the $d \cdot (n_x - n_z)$ birefringent value (retardation value) of each of negative biaxial retardation films 4 and 13 is from about 50 to 150 nm, more preferably from about 70 to 130 nm, and most preferably from about 75–110 nm. In combination with these values, biaxial negative retarders 4 and 13 each have a retardation value $d \cdot (n_x - n_y)$ of from about 1 to 40 nm, more preferably from about 3 to 20 nm, and most preferably from about 6 to 12 nm.

U.S. Pat. No. 5,570,214 (parent hereto) discloses negative biaxial retarders ($n_x > n_y > n_z$), each having a retardation value $d \cdot (n_x - n_z)$ of from about 100 to 200 nm.

According to a preferred embodiment of this invention, each of rear positive uniaxial retarder 2 and front positive uniaxial retarder 14 has a retardation value of about 140 nm while each of rear negative biaxial retarder 4 and front negative biaxial retarder 13 has a retardation value $d \cdot (n_x - n_z)$ of about 100 nm, and a retardation value $d \cdot (n_x - n_y)$ of about 12 nm.

According to certain other embodiments, it has been found that improved viewing characteristics result when the retardation values of the positive uniaxial and negative biaxial retarders are maintained within a particular ratio range. The ratio of the positive retardation value of each of positive retarders 2 and 14 to the negative biaxial retardation value $d \cdot (n_x - n_z)$ of each of retarders 4 and 13 is from about 0.8:1 to 3:1 (more preferably from about 1:1 to 2:1) according to certain embodiments. Even more preferably, the retardation value ratio for the positive retardation value d·An to the biaxial retardation value $d \cdot (n_x - n_z)$ is from about 1.2:1 to 1.5:1.

The retardation values of each of the like (e.g. positive) retarders need not be identical, but the ratio range is typically met by both sets of positive:negative retardation values. The improved viewing characteristics resulting from maintaining the positive and negative retarder values within these ratios will be illustrated below with respect to the numerous examples set forth below.

As shown in FIGS. 1–3, each negative biaxial retarder has two separate retardation values defined by $d \cdot (n_x - n_z)$ and $d \cdot (n_x - n_y)$ respectively. As illustrated in the FIGS. 1–3 embodiments, the "x", or $n_x$, direction of the front negative biaxial retarder 13 (i.e. $FBR_x$) is oriented in a different direction (by about 90°) than the corresponding "x", or $n_x$, direction ($RBR_x$) of rear biaxial retarder 4. As illustrated in FIGS. 2–3, the $n_x$ direction ($FBR_x$) of front biaxial retarder 13 is oriented at about 0° (± about 5°), while the $n_x$ direction ($RBR_x$) of rear biaxial retarder 4 is oriented about 90° clockwise therefrom (± about 5°). Thus, rear polarization axis $P_R$ and buffing direction $B_F$ each approximately bisect the 90° angle defined between the respective $n_x$ directions $RBR_x$ and $FBR_x$ of retarders 4 and 13. Likewise, the $n_y$ directions ($RBR_y$ and $FBR_y$) of the two negative biaxial retarders 4 and 13 differ from one another by about 90° in a similar manner. As will be discussed below, directions $RBR_x$, $RBR_y$, $FBR_x$, and $FBR_y$ may be adjusted according to ceratin alternative embodiments with the $n_y$ directions always being about 90° from the corresponding $n_x$ directions in the film plane.

Figure 4A:
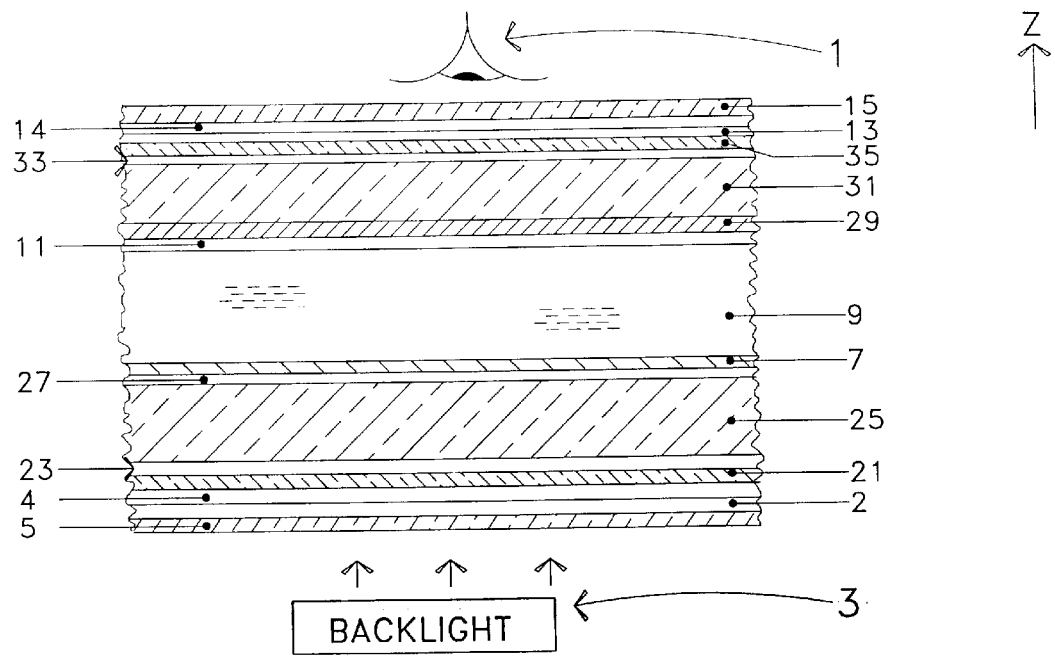
FIG. 4(a) is a side cross-sectional view of the FIG. 1 LCD according to certain embodiments of this invention.

FIG. 4(a) is a side cross-sectional view of a normally white AMLCD or light valve (LV) corresponding to FIG. 1, according to certain embodiments of this invention. As illustrated from backlight 3 forward toward viewer 1, the display includes rear polarizer 5, rear positive retarder 2 (e.g. A-plate), rear biaxial negative retarder 4, transparent glass or plastic protective sheet 21, conventional index matching oil layer 23, substantially transparent glass or plastic substrate 25, rear electrode(s) 27, rear orientation or buffing film 7, twisted nematic liquid crystal layer 9, front orientation or buffing film 11, front electrode(s) 29 for applying a voltage across the LC layer in conjunction with electrode(s) 27, front substantially transparent plastic or glass substrate 31, index matching oil layer 33, transparent plastic or glass protective sheet 35, front negative biaxial retarder 13, front positive retarder (e.g. A-plate) 14, and finally front polarizer or analyzer 15. According to this FIG. 4(a) embodiment, the two rear retarders 2, 4, rear polarizer 5, and sheet 21 are laminated together to form a single unit and thereafter secured to rear substrate 25 with index matching oil 23 layer disposed therebetween so as to ensure that no air gap is present between layers 21 and 25. Additionally, layers 13, 14, 15, and 35 are laminated together as a single unit and thereafter applied to the front surface of substrate 31 with index matching oil layer 33 disposed therebetween. Again, oil layer 33 is provided so as to ensure that no air gap or non-index matched layer exists between layers 31 and 35. It will be understood by those of skill in the art that, in AMLCD embodiments, one of electrodes 27 and 29 represents a common and continuous electrode which extends across substantially the entire display area, while the other electrode is divided up into a plurality of individual pixel electrodes, one per pixel or subpixel. Color filters (not shown) may also be provided between one of the electrode layers 27 and 29 and their adjacent substrates, such color filters being red (R), green (G), and blue (B) ,(in a triad arrangement) according to certain embodiments.

Figure 4B:
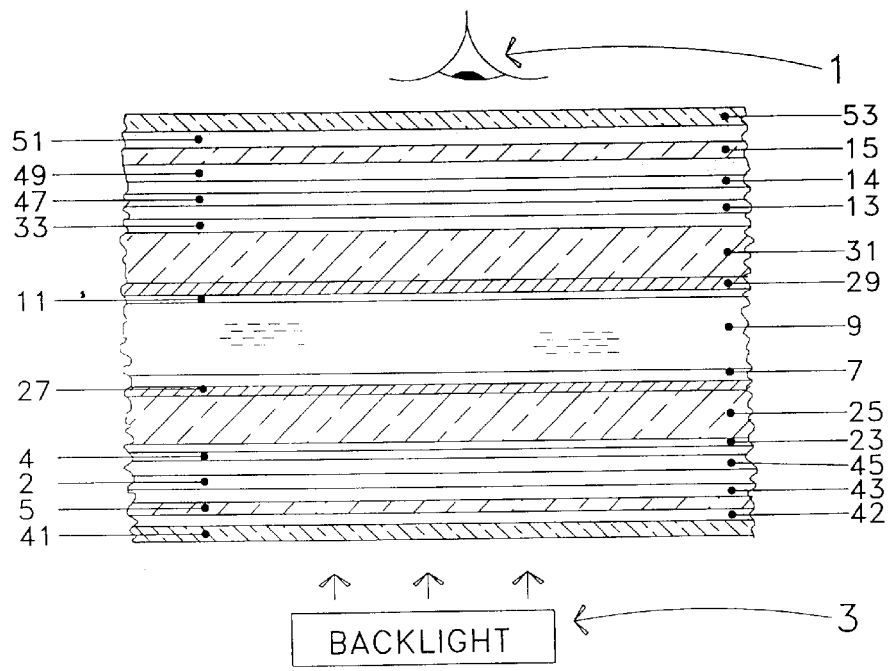
FIG. 4(b) is a side cross-sectional view of the FIG. 1 LCD according to another embodiment of this invention.

FIG. 4(b) is a side cross-sectional view of a normally white display, as shown in FIG. 1, according to another embodiment of this invention. As shown in FIG. 4(b) from the rear forward toward viewer 1, this LCD or LV includes rear glass or plastic substantially transparent cover sheet 41, laminating adhesive layer 42, rear polarizer 5, laminating adhesive layer 43, rear positive retarder 2, laminating adhesive layer 45, rear negative biaxial retarder 4, index matching oil layer 23, rear substantially transparent plastic or glass substrate 25, rear electrode 27, rear orientation or buffing film 7, twisted nematic LC layer 9 having a substantially constant thickness "d" across the viewing area of the display, front orientation or buffing film 11, front electrode 29, front substantially transparent plastic or glass substrate 31, index matching oil layer 33, front biaxial negative retarder 13, laminating adhesive layer 47, front positive retarder 14, laminating adhesive layer 49, front polarizer 15, laminating adhesive layer 51, and finally front substantially transparent glass or plastic cover sheet 53. In accordance with the FIG. 4(b) embodiment, rear cover sheet 41, rear polarizer 5, and rear retarders 2 and 4 are laminated together via adhesive layers 42, 43, and 45 so as to form a single unit which is thereafter secured to the rear surface of substrate 25 with index matching oil layer 23 disposed therebetween. Likewise, front cover sheet 53, front polarizer 15, and front retarders 13–14 are laminated together via adhesive layers 47, 49, and 51 as a single unit and thereafter secured to the front surface of substrate 31 with index matching oil layer 33 disposed therebetween. Relative to the FIG. 4(a) embodiment, the cover sheets are located differently in FIG. 4(b), and conventional laminating adhesive layers (42, 43, 45, 47, 49, and 51) which do not substantially affect optical characteristics are provided between the laminated sheets. Such adhesive layers may, of course, also be provided in the FIG. 4(a) embodiment.

Figure 11A:
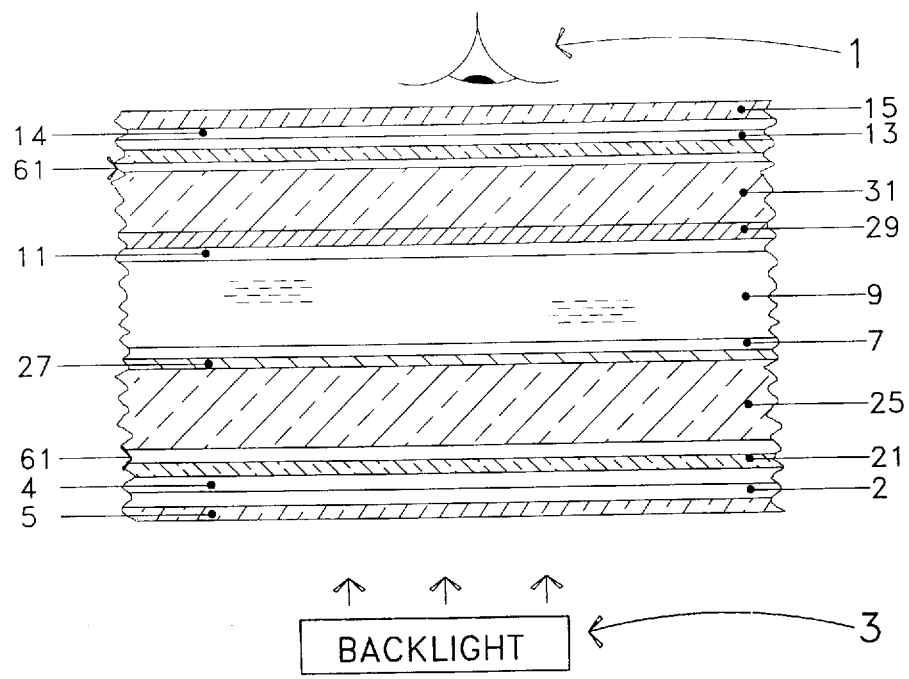
FIG. 11(a) is a side cross-sectional view of a normally white AMLCD in accordance with FIG. 1, according to another embodiment of this invention, wherein air gaps are provided between the respective transparent substrates and their adjacent retarder laminates.

FIG. 11(a) illustrates an additional embodiment of this invention wherein isotropic air gaps 61 are provided on each side of liquid crystal layer 9. Surprisingly, as will be discussed below relative to certain examples herein, the provision of air gaps 61 between their adjacent retarders (4 and 13) and LC layer 9 has been found to result in improved viewing characteristics of the display. The embodiments in accordance with FIGS. 11(a) and 11(b) are similar to those of FIGS. 4(a) and 4(b), respectively, except that, instead of index matching oil layers, isotropic air gaps 61 are provided.

As shown in FIG. 11(a), front substantially planar air gap 61 is provided between glass or plastic protective sheet 35 and front substrate 31 while rear air gap 61 is disposed between the outer surface of rear substrate 25 and rear protective sheet 21. These air gaps 61, in their illustrated positions, are formed by simply securing (e.g. via clamps or the like) the laminated product (e.g. 13, 14, 15, and 35 with corresponding laminating adhesives) to the front side of substrate 31 without any index matching oil or adhesive layer therebetween. Without the provision of index matching oil or adhesive between layers 31 and 35, air gap 61, which represents an isotropic layer, results. The air gap 61 on the rear of the LC layer 9 is formed in a similar manner. Air gaps 61 in FIG. 11(a) create an index mismatch between: (i) layers 21 and 25; and (ii) layers 31 and 35. These isotropic layers 61 alter or reflect light rays from backlight 3 to different degrees. In other words, known "S" and "P" waves are reflected in different manners as they enter, pass through, and exit air gaps 61 on both sides of the liquid crystal layer. The provision of the air gaps improves the display's inversion-relation characteristics, and creates more rounded shoulders in the viewing zone as will be seen below in certain examples herein.

Figure 11B:
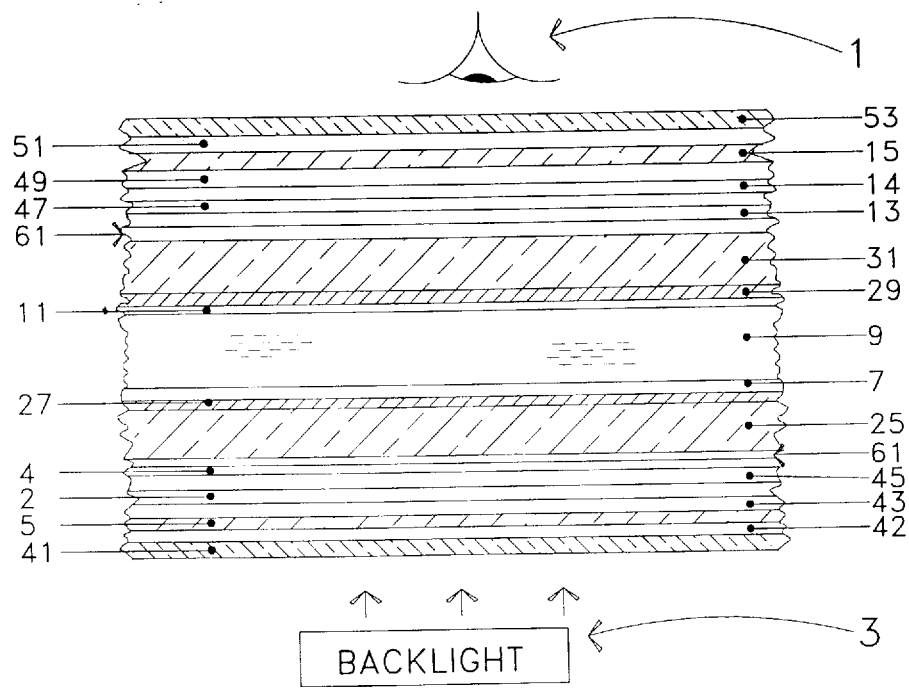
FIG. 11(b) is a side cross-sectional view of an AMLCD in accordance with FIG. 1, according to yet another embodiment of this invention where the display is provided with air gaps between the retarders and the liquid crystal material on each side of the LC.

FIG. 11(b) illustrates an embodiment similar to FIG. 4(b), except that isotropic air gaps 61 are provided on either side of LC layer 9.

Figure 13:
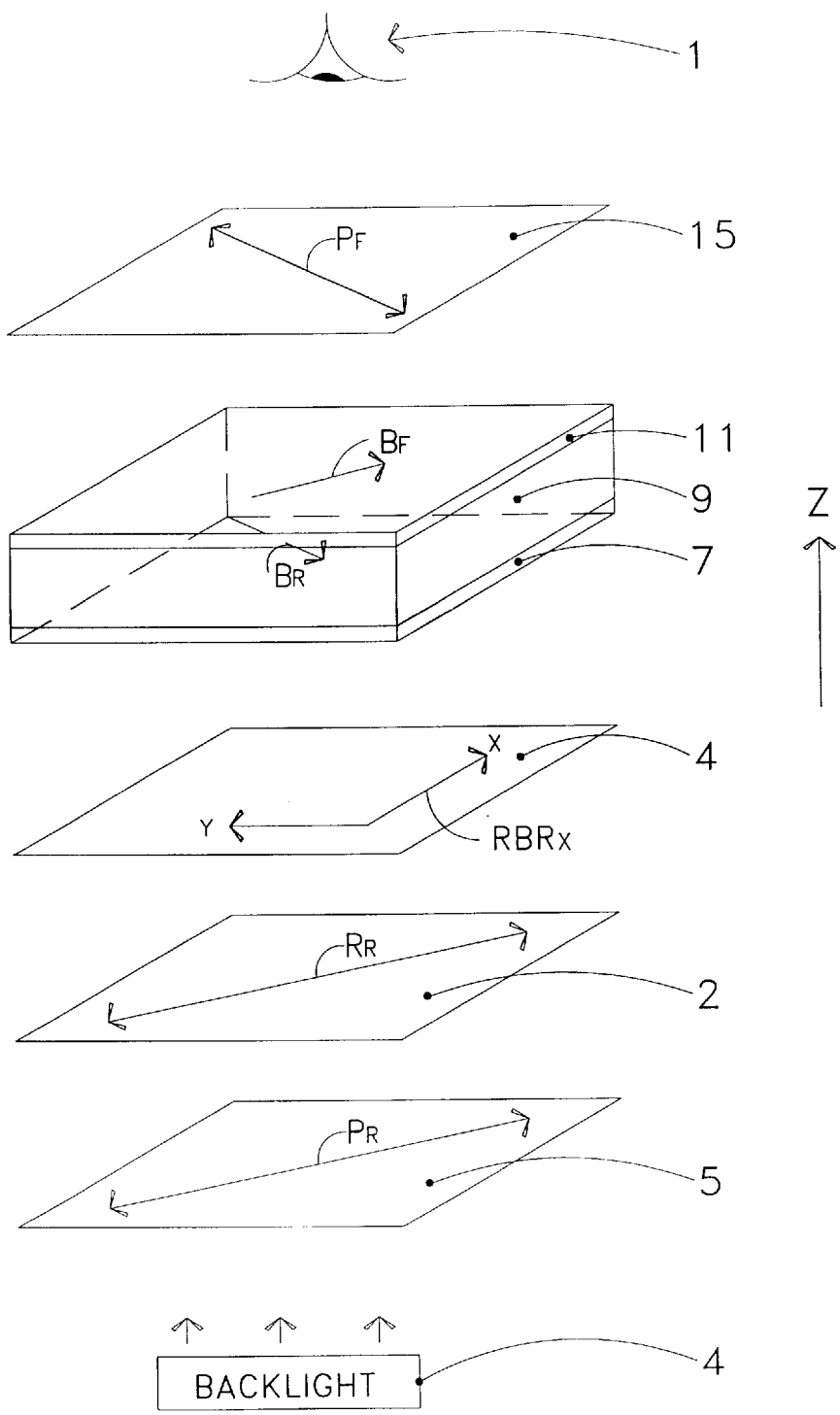
FIG. 13 is a schematic diagram of the optical components of a NW twisted nematic LCD according to another embodiment of this invention, wherein a positive uniaxial retarder and a negative biaxial retarder are provided on only one side of the LC material.
Figure 14:
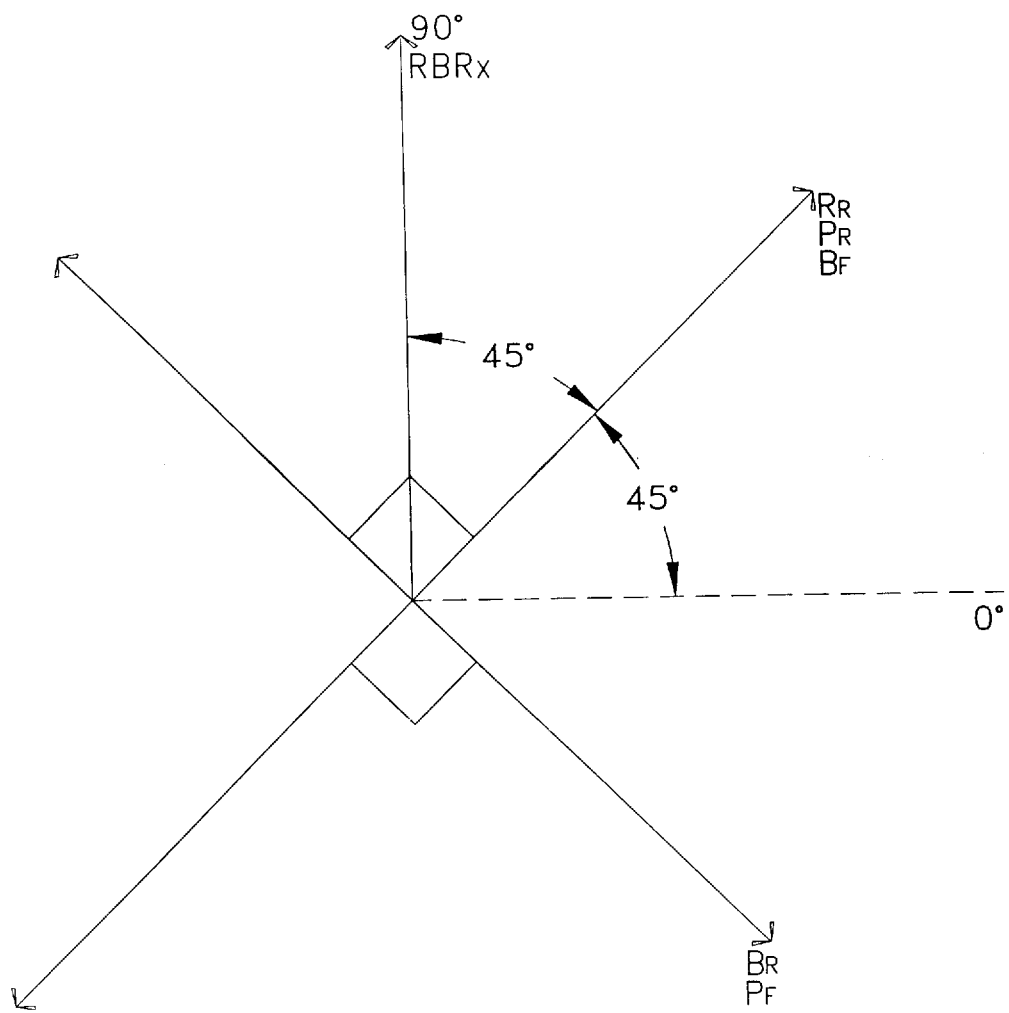
FIG. 14 illustrates the angular relationship between the respective optical axes of the FIG. 13 embodiments.

FIGS. 13 and 14 illustrate the optical components of a normally white AMLCD or LV according to another embodiment of this invention. Unlike the previous embodiments discussed above, the FIGS. 13–14 embodiment is provided with a positive uniaxial 2 and a negative biaxial 4 retarder on only one side (e.g. the rear) of liquid crystal layer 9. The two retarders 2 and 4 may be provided on the rear side of the LC layer 9, as shown in FIG. 13, in order to reduce reflections off of the front of the display.

As illustrated from the rear forward toward viewer 1 in FIG. 13, the display according to this embodiment includes rear polarizer 5 having transmission axis $P_R$, rear positive uniaxial retarder 2 having slow axis $R_R$, rear negative biaxial retarder 4 including indices of refraction $n_x$, $n_y$, and $n_z$, rear orientation layer 7 including buffing direction $B_R$, twisted nematic liquid crystal (LC) layer 9 having thickness "d", front orientation layer 11 having buffing direction $B_F$, and finally front linear analyzer or polarizer 15 having transmission axis $P_F$. With regard to negative biaxial retarder 4, the direction corresponding to index of refraction $n_z$ is aligned substantially perpendicular to the film's surface, while the directions corresponding to indices $n_x$ and $n_y$ are substantially planar to the surface of film 4. As will be appreciated by those of skill in the art, the directions corresponding to $n_x$ ($RBR_x$) and $n_y$ ($RBR_y$) are substantially perpendicular to one another within the defined plane. Alternatively, the two illustrated retarders 2 and 4 may instead be located on the front side of LC layer 9 (instead of the rear). The retardation values of retarders 2 and 4 may be the same as discussed throughout this disclosure, although, for retarder 4, retardation value $d \cdot (n_x - n_z)$ may be from about 70–300 nm, while $d \cdot (n_x - n_y)$ may be from about 1 to 40 nm in this embodiment. One or more negative biaxial retarders may be laminated together to form retarder 4.

FIG. 14 illustrates the angular relationship between the axes of the FIG. 13 embodiment as viewed from the point of view of viewer 1. As shown, the rear and front buffing directions are at right angles to one another ± about 10°, the front and rear polarizer axes are at right angles to one another ± about 10°, the slow axis $R_R$ of positive retarder 2 is substantially parallel to transmission axis $P_R$ of rear polarizer 5 ± about 10°, and the direction ($RBR_x$) corresponding to the $n_x$ index of refraction of biaxial retarder 4 is oriented at approximately a 45° angle with respect to all polarizer axes, all buffing directions, and the slow axis $R_R$ of retarder 2. In other words, direction $RBR_x$ of retarder 4 substantially bisects the approximate 90° angle defined between the polarizer axis directions according to this embodiment. It will be recognized, however, that the directional alignment of direction $RBR_x$ may be adjusted in either direction according to alternative embodiments of this invention as will be discussed below.

Figure 19:
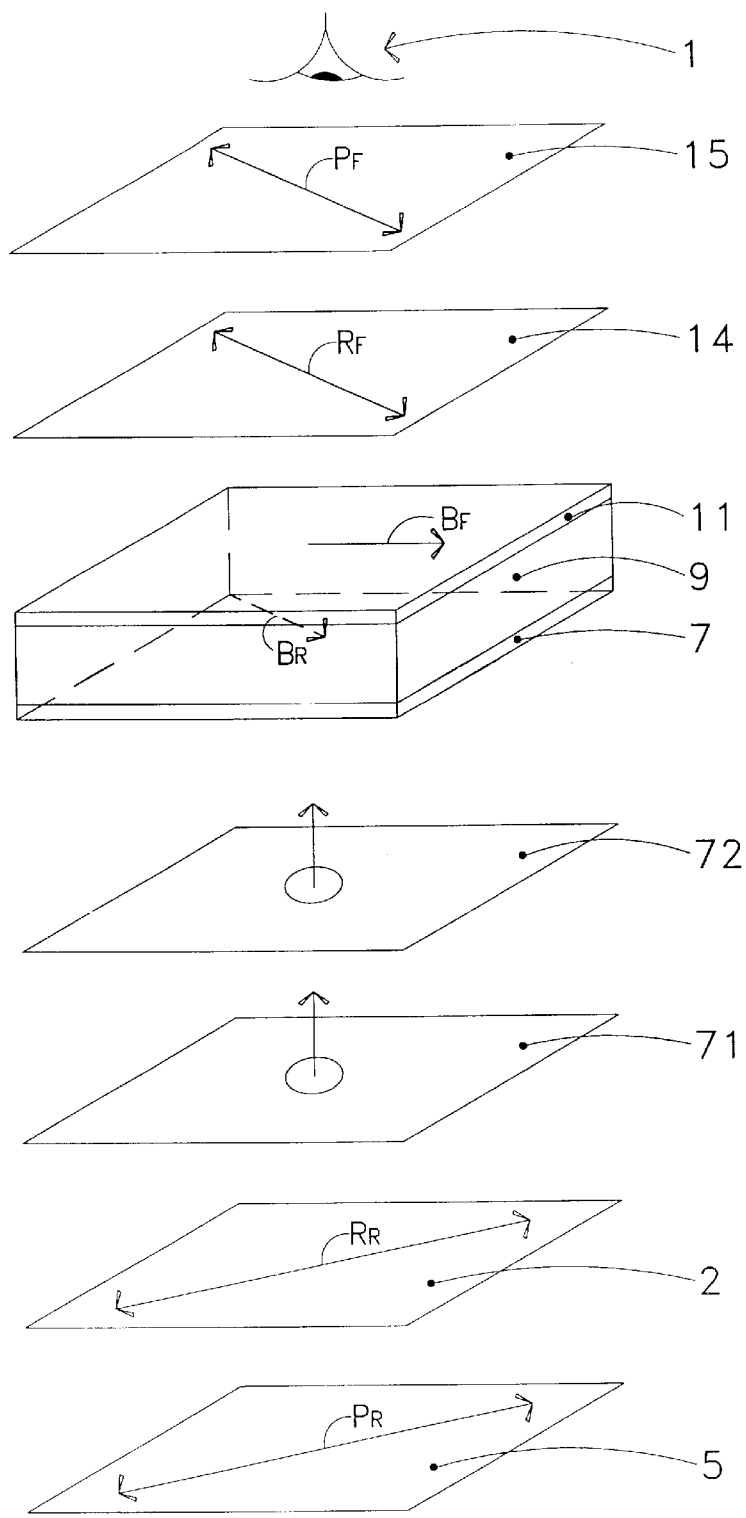
FIG. 19 is a schematic diagram of the optical components of a NW twisted nematic LCD according to another embodiment of this invention, wherein a pair of negative uniaxial retarders were provided on a single side of the LC material.

FIG. 19 is an exploded schematic view of the optical components of a NW display or light valve according to still another embodiment of this invention. As shown in FIG. 19, this embodiment includes a pair of negative uniaxial retarders 71 and 72 provided on one side (e.g. the rear side as shown) of liquid crystal layer 9. Unlike the biaxial retarders discussed above, negative uniaxial retarders 71 and 72 of this embodiment are defined by $n_x = n_y > n_z$. In other words, each of negative retarders 71 and 72 is substantially uniaxial and defines an optical retardation axis in the direction substantially perpendicular to the plane of each film. Thus, the optical axis of each negative retarder 71 and 72 is substantially in the "z" direction. The retardation value $d \cdot (n_z - n_x)$ of each retarder 71 and 72 may be from about −60 to −200 nm according to certain embodiments of this invention, more preferably from about −80 to −150 nm, and most preferably from about −100 to 140 nm. With regard to negative uniaxial retarders 71 and 72, because $n_x = n_y$, the retardation value is defined by $d \cdot (n_z - n_x)$ or alternatively in the same manner by $d \cdot (n_z - n_y)$, both of which result in substantially the same retardation value. Because $n_x$ and $n_y$ are greater than $n_z$, retarders 71 and 72 are considered "negative." Exemplary such negative uniaxial retarders are disclosed and discussed in U.S. Pat. Nos. 5,344,916 and 5,071,997, incorporated herein by reference.

As shown in FIG. 19 from the rear forward toward viewer 1, the normally white TN display or LV according to this embodiment includes rear polarizer 5, rear positive uniaxial retarder 2 having slow axis $R_R$, first negative uniaxial retarder 71, second negative uniaxial retarder 72, rear buffing layer 7, twisted nematic LC layer 9, front buffing layer 11, optional front positive uniaxial retarder 14 having slow axis $R_F$, and finally front linear polarizer 15 including transmission axis $P_F$. As with all positive retarders discussed herein, retardation value $d \cdot \Delta n$ for each of positive uniaxial retarders 2 and 14 is from about 70 to 200 nm, more preferably from about 80 to 200 nm, even more preferably from about 120 to 160 nm, and most preferably about 140 nm.

Figure 20:
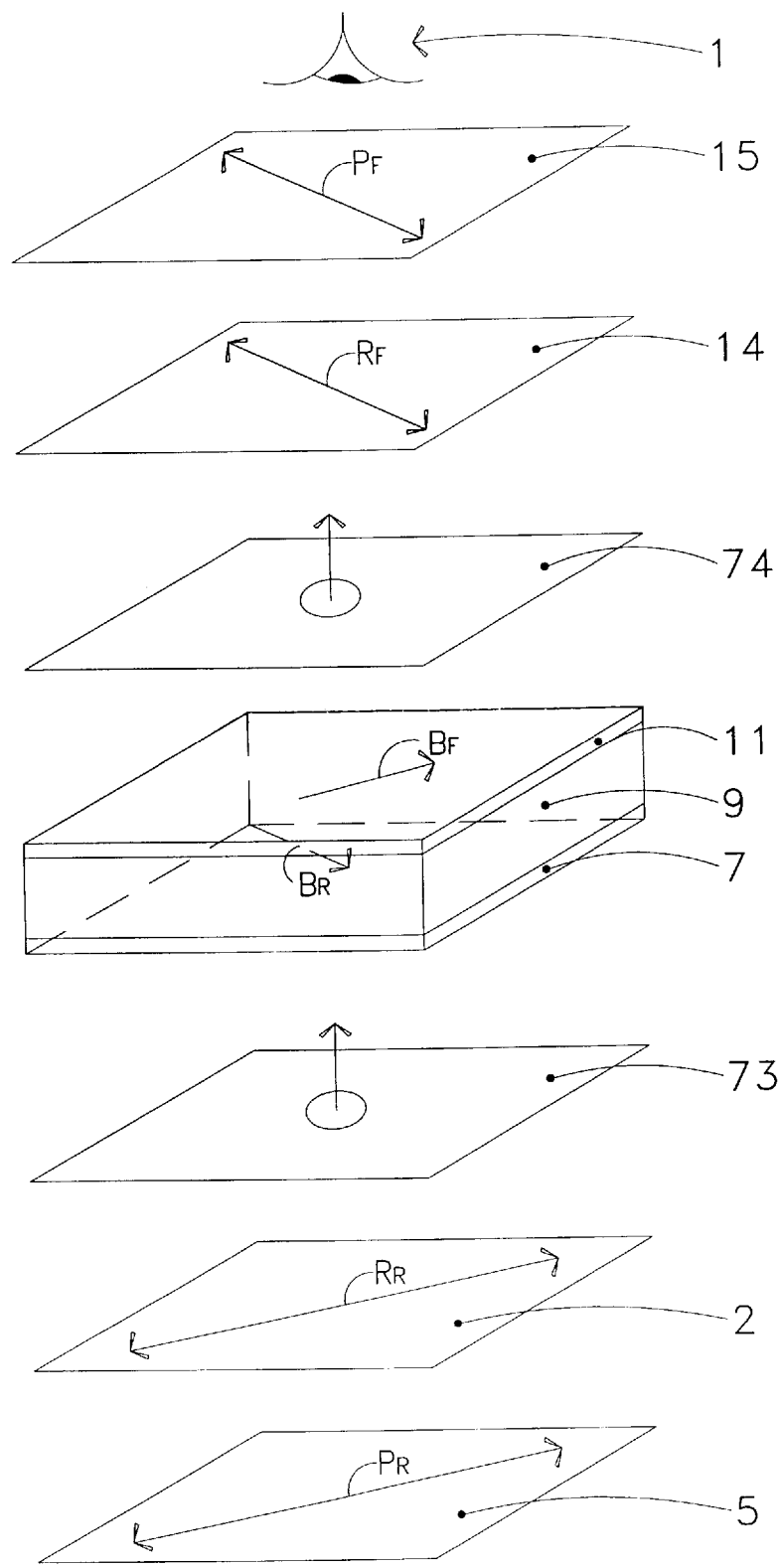
FIG. 20 is a schematic diagram illustrating the optical components of a normally white TN LCD according to another embodiment of this invention wherein a negative uniaxial retarder and a positive uniaxial retarder were provided on each side of the LC layer.

FIG. 20 is an exploded schematic illustrating the optical components of yet another embodiment of a NW LCD or LV according to this invention. As shown in FIG. 20, this embodiment includes negative uniaxial retarder 73 on the rear side of LC layer 9, and another negative uniaxial retarder 74 on the front side of LC layer 9. Negative retarders 73 and 74 as shown in FIG. 20 are similar to retarders 71 and 72 of FIG. 19, in that each is defined by $n_x = n_y > n_z$. Thus, negative retarders 73 and 74 each include an optical axis aligned substantially perpendicular to the plane of each film. As illustrated from the rear forward, the FIG. 20 embodiment includes rear polarizer 5, rear positive uniaxial retarder 2, negative uniaxial retarder 73, rear buffing layer 7, LC layer 9, front buffing layer 11, front negative uniaxial retarder 74, front positive uniaxial retarder 14, and finally front polarizer 15. The retardation value for each of negative retarders 73 and 74 is similar to that discussed above with respect to retarders 71 and 72 in the FIG. 19 embodiment.

Figure 21A:
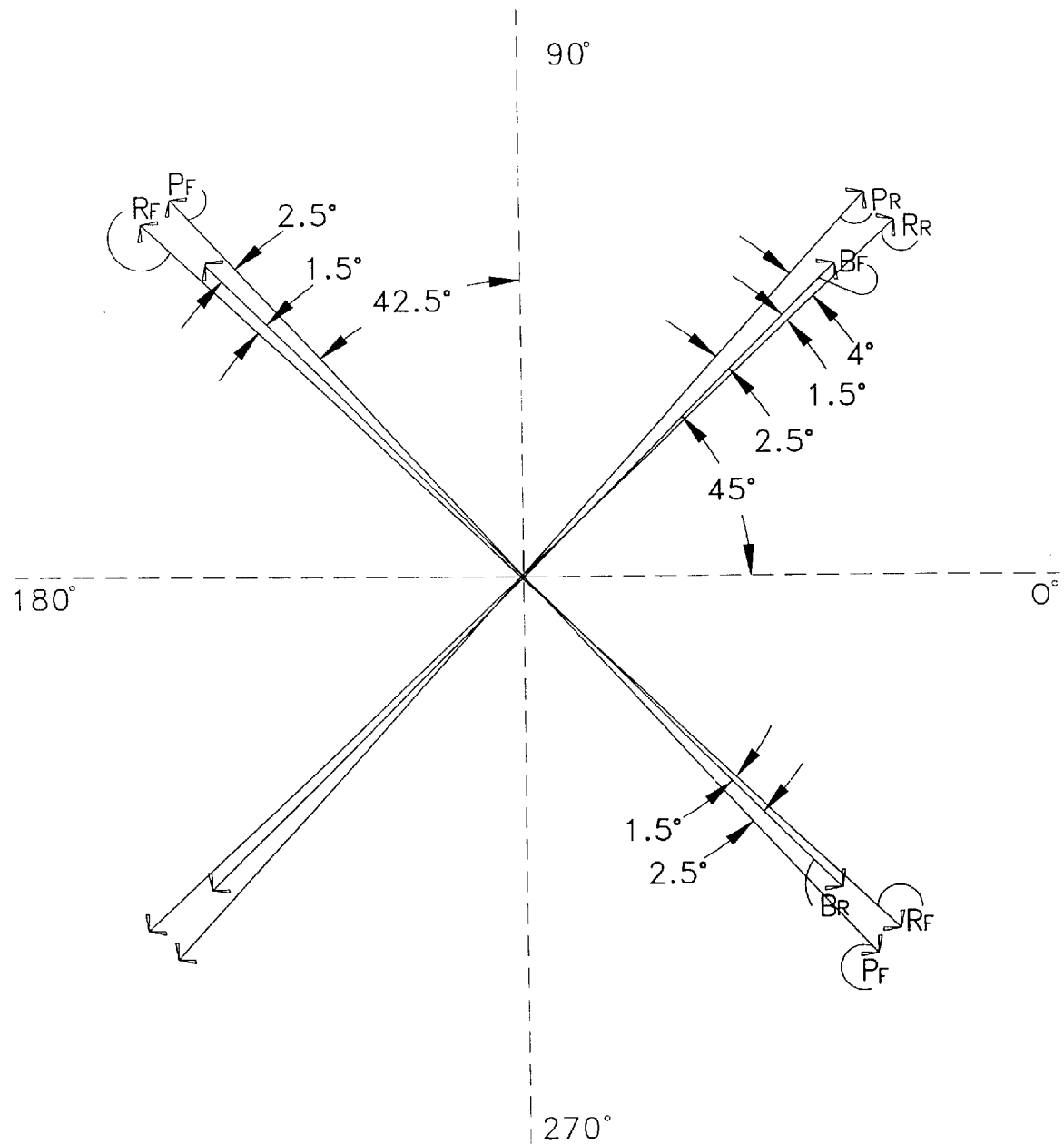
FIG. 21(a) illustrates, from the front of the display, the arrangement of the axes of the NW light valve of Example 9.

According to other embodiments of this invention, NW TN LVs or AMLCDs may be made as shown in FIGS. 20–21, except that no retarders are provided on the front side of LC layer 9. In other words, the retarders 14 and 74 in FIG. 20 may be eliminated.

This invention will now be described with respect to certain examples as follows. In each of the Examples set forth below, the LC layer had a Δn of 0.084, the thickness "d" of the LC layer 9 in each AMLCD or LV was substantially constant across the entire viewing area, the front and rear polarizers 5 and 15 were linear, and each of the positive uniaxial retarders had a retardation value (d·Δn) of 140 nm. The negative biaxial retarder(s) were interior the positive retarders. Additionally, FIGS. 5(a), 8(a), 11(c), 14, 15(a), 21(a), 22(a), 24(a), 26(a), 27(a), 30(a), 32(a), 33(a) and 34(a) all illustrate the axes from the point of view of LCD viewer 1. The Examples below show that certain NW LCDs according to this invention have a contrast ratio greater than 30:1 horizontally ±60° and vertically from −7° up to +40°.

EXAMPLE 1

Figure 5A:
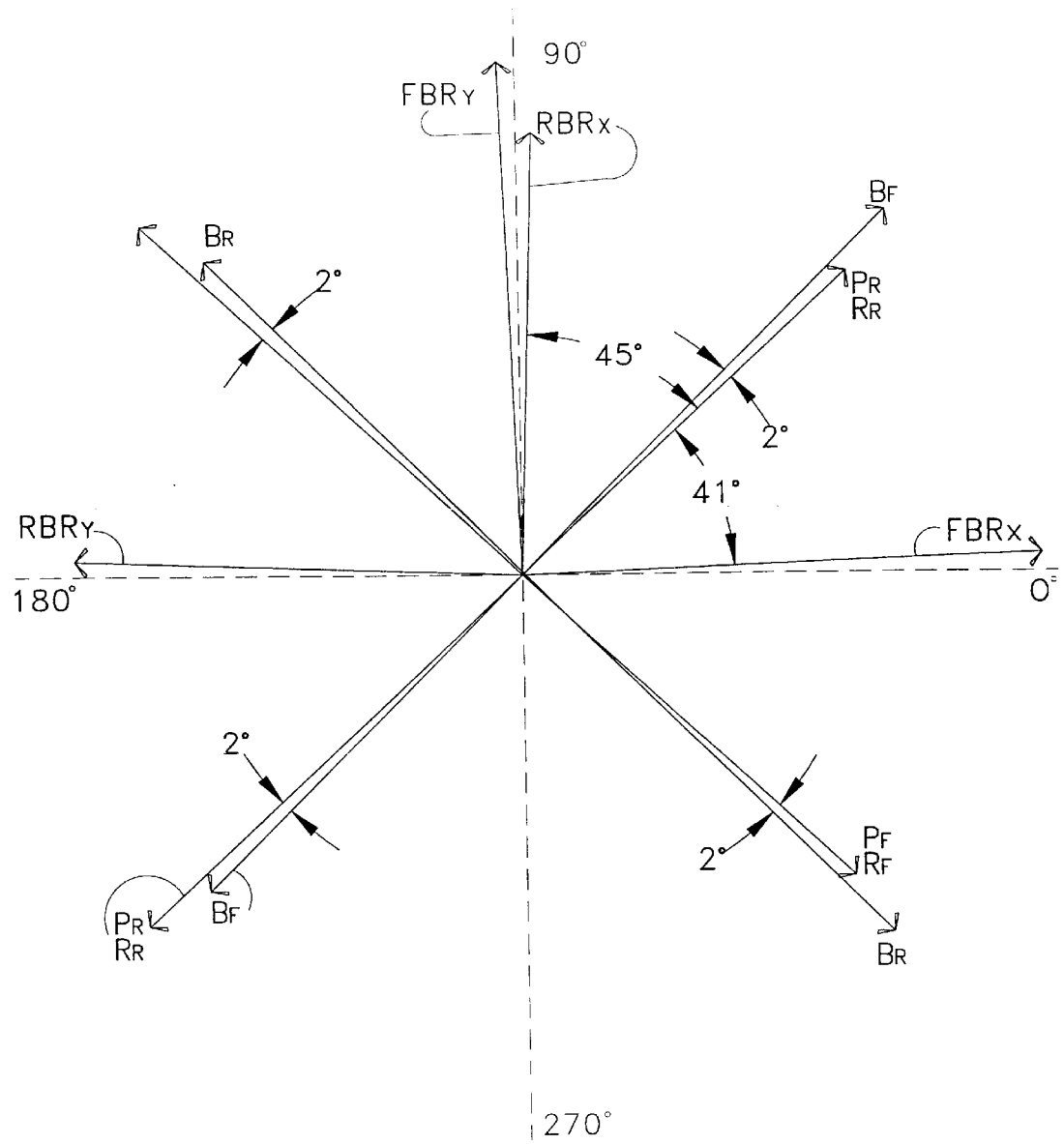
FIG. 5(a) illustrates the arrangement of the respective axes of the Example 1 TFT RGB AMLCD as viewed from the point of view of the viewer (i.e. from the front).

In this first Example, a normally white (NW) RGB thin film transistor (TFT) AMLCD was constructed as shown in FIGS. 1 and 5(a) so as to have first and second positive uniaxial retarders 2 and 14 on opposite sides of LC layer 9, and also first and second negative biaxial retarders 4 and 13 on opposite sides of LC layer 9. The negative biaxial retarder on each side of the liquid crystal layer 9 was sandwiched between the adjacent positive retarder and layer 9. The retardation value d·Δn for each positive retarder 2 and 14 was about 140 nm. The retardation value $d \cdot (n_x - n_z)$ was about 83 nm for each negative biaxial retarder 4 and 13, while the retardation value $d \cdot (n_x - n_y)$ was about 6 nm for each of biaxial retarders 4 and 13.

With reference to FIG. 5(a), the slow axis $R_F$ of front positive retarder 14 was parallel to the transmission axis $P_F$ of front polarizer 15, while the slow axis $R_R$ of rear positive retarder 2 was parallel to the transmission axis $P_R$ of rear polarizer 5. Direction $RBR_x$ (i.e. $n_x$ direction) of rear biaxial negative retarder 4 was oriented 45° counterclockwise (from the viewpoint of viewer 1) relative to rear polarizer transmission axis $P_R$, while direction $FBR_x$ ($n_x$ direction) of front biaxial retarder 13 was oriented at the 2° mark, or in other words, clockwise 41° from rear polarizer transmission axis $P_R$. Referring still to FIG. 5(a), the following axes were at the following angular locations given a 0° axis located 2° clockwise of $FBR_x$: $FBR_x$ at 2°, $R_R$ at 43°, $P_R$ at 43°, $B_F$ at 45°, $RBR_x$ at 88°, $FBR_y$ at 92°, $B_R$ at 135°, $P_F$ and $R_F$ at 137°, and $RBR_y$ at 178°. While these axes also extend across the 0°–180° axis, their angular positions in the third and fourth quadrants (i.e. from 180°–360°) are not listed above, but are shown in FIG. 5(a). Still referring to this Example, the thickness "d" of LC layer 9 was approximately 5.20 μm, while LC layer 9 had a birefringent value of about 0.084. Layer 9 twisted normally incident light approximately 90° when in the off-state.

Figure 5B:
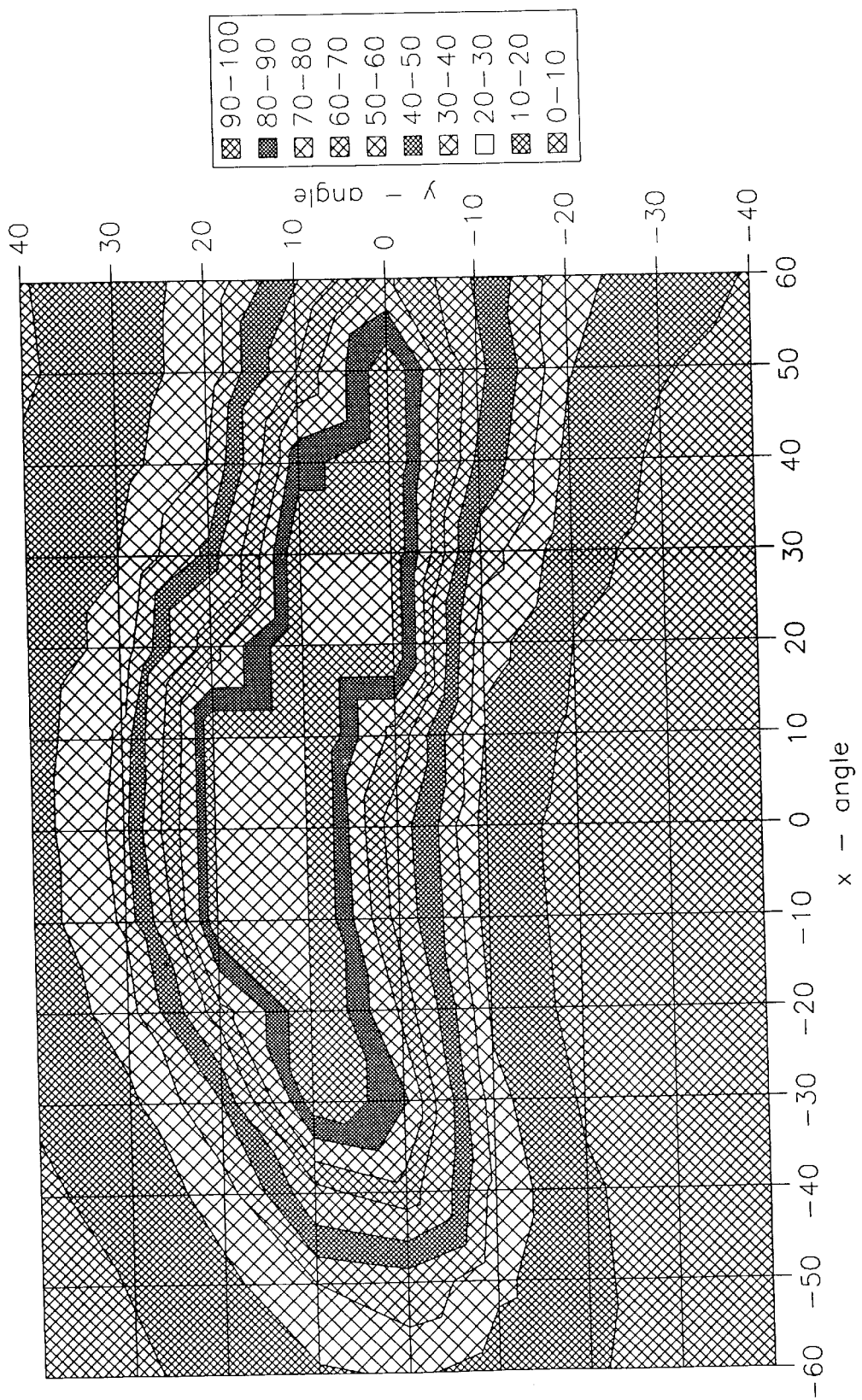
FIG. 5(b) is a white light contrast ratio graph of the normally white RGB TFT AMLCD made and tested in Example 1, when 5.5 driving volts were applied across the LC material in the on-state.

FIG. 5(b) is a white light contrast ratio graph of the AMLCD of this Example, when 5.5 driving volts were applied to liquid crystal layer 9 in the on-state. As shown, at this driving voltage, the AMLCD of this Example emitted to viewer 1 a contrast ratio of at least about 20:1 over a horizontal anglular span of at least about 120° (preferably at least about 140°) along the 0° vertical viewing axis. Furthermore, the AMLCD emitted a contrast ratio greater than about 30:1 over a horizontal angular span of at least about 105°. Vertically, the display emitted a contrast ratio of at least about 20:1 over a vertical span, along the 0° horizontal viewing axis, of at least about 45°. The viewing characteristics illustrated in FIG. 5(b) as a result of the negative biaxial retarders utilized in combination with the positive uniaxial retarders of this embodiment are surprisingly superior to those of the prior art as a result of the retardation values provided, as well as the locations of the retarders and their respective axes in the display stack.

Figure 6:
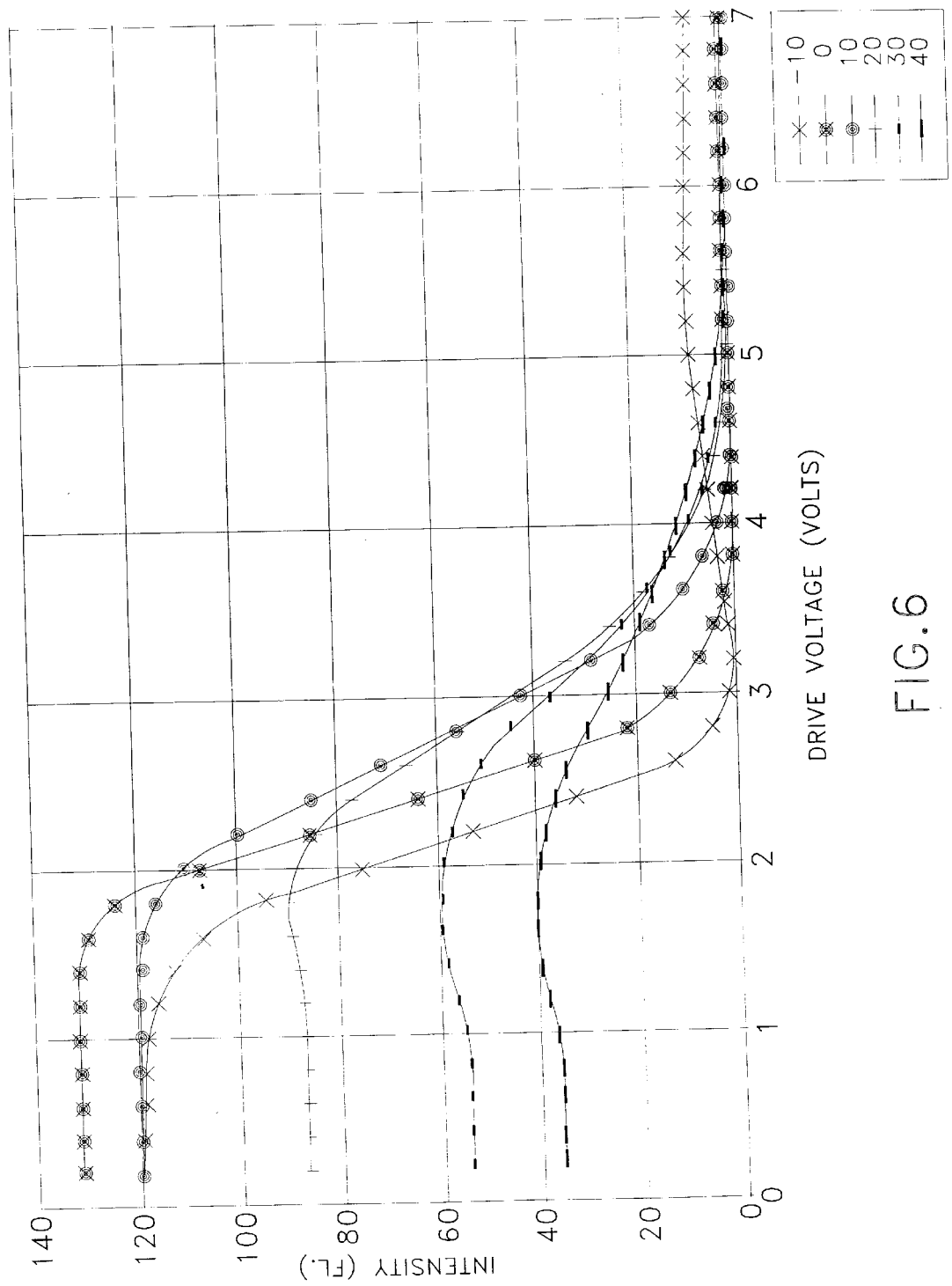
FIG. 6 is a transmission (fL) versus driving voltage (volts) curve of vertical angles along the 0 horizontal axis, for the TFT AMLCD tested in Example 1.

FIG. 6 is a transmission (fL) versus driving voltage (volts) graph of the AMLCD of this first Example, at a plurality of vertical viewing angles along the 0° horizontal viewing axis. As shown, there are very few inversion humps. In this Figure, and in all transmission (intensity) versus driving voltage graphs herein, the "y" axis represents intensity (fL) while the "x" axis represents the driving voltage (volts) applied to the display or light valve via electrodes 27 and 29.

Figure 7:
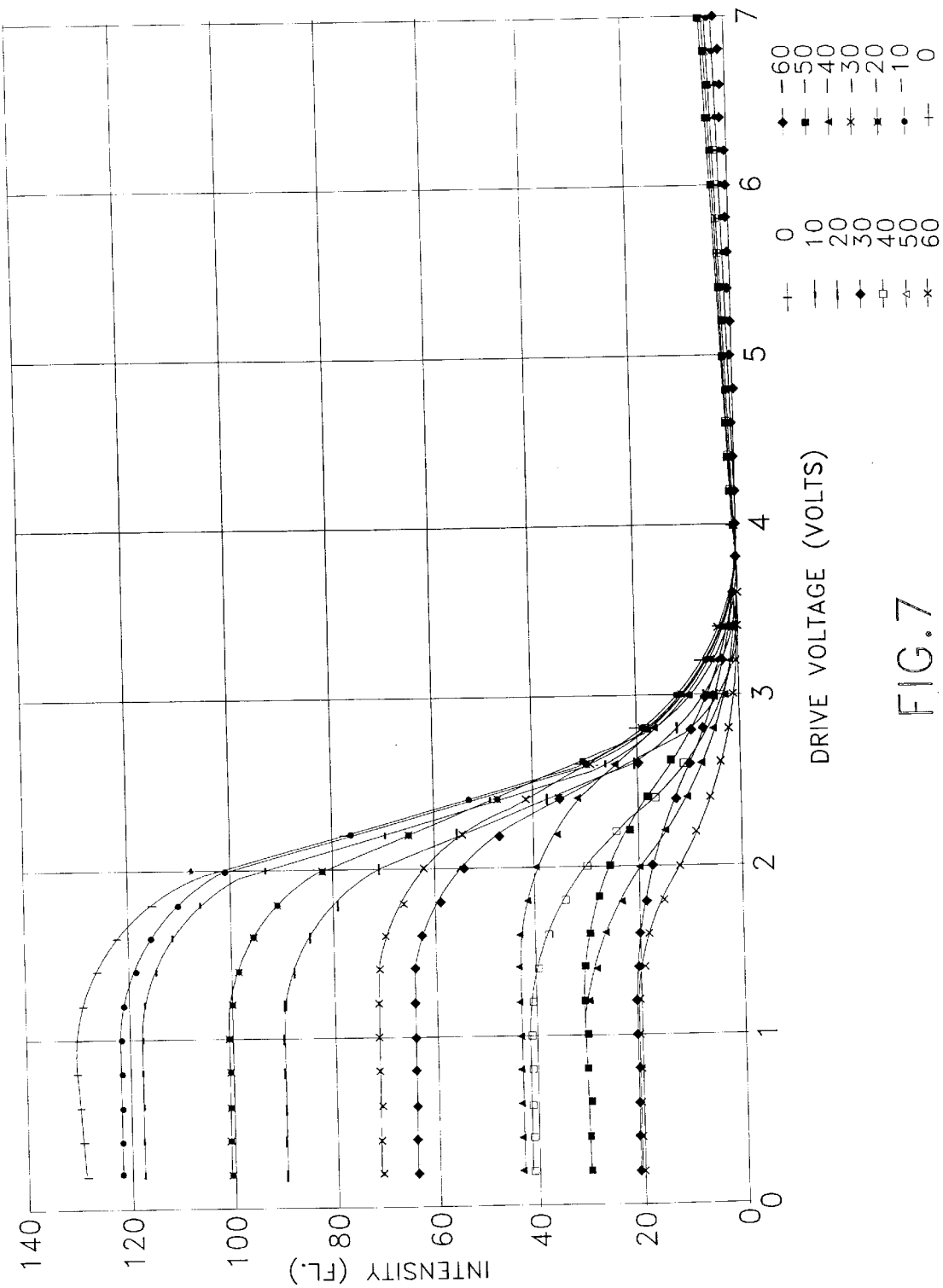
FIG. 7 is a transmission versus driving voltage graph for horizontal angles along the 0° vertical viewing axis, for the TFT AMLCD tested in Example 1.

FIG. 7 is a transmission versus driving voltage graph of the AMLCD of this first Example, showing substantially no inversion at a plurality of horizontal viewing angles along the 0° vertical viewing axis.

EXAMPLE 2

Figure 8A:
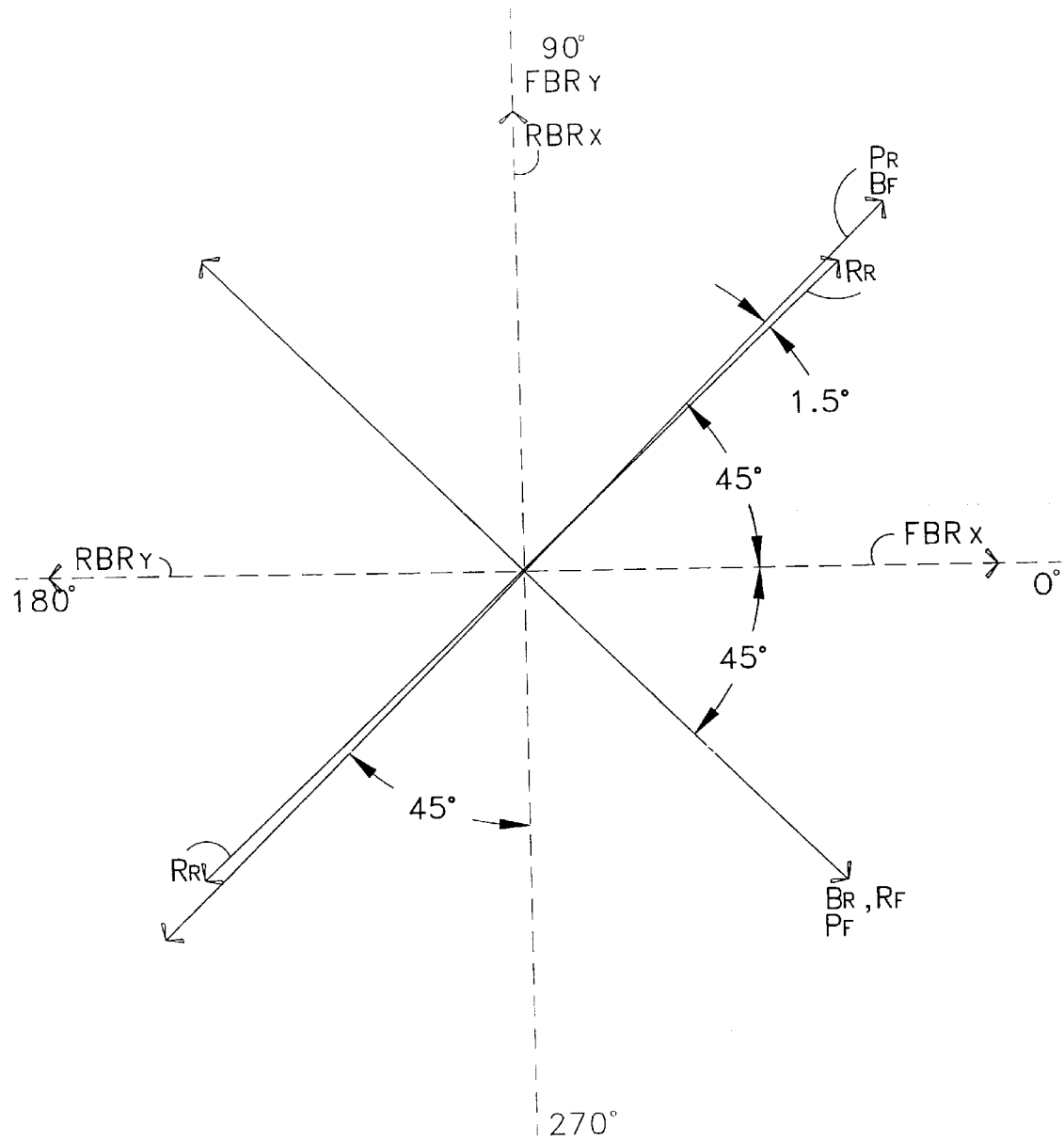
FIG. 8(a) illustrates the arrangement of the respective axes in the TFT RGB AMLCD of Example 2, as viewed from the front of the display (i.e. as by the viewer).

In this second Example (see FIGS. 1 and 8(a)–10), a normally white RGB TFT AMLCD in accordance with FIGS. 1 and 8(a) was made and tested. Positive retarders 2 and 14 each had a retardation value of about 140 nm. The retardation value d·($n_x$–$n_z$) for each of the negative biaxial retarders 4 and 13 was about 77 nm, while the retardation value d·($n_x$–$n_y$) for each of retarders 4 and 13 was about 7 nm. The thickness "d" of LC layer 9 was about 5.20 in this AMLCD.

FIG. 8(a) illustrates the angular relationship between the various axes of the AMLCD of this Example. As shown, given a 0° axis located 45° clockwise from the front buffing direction $B_F$, the respective axes were located as follows: $FBR_x$ at 0°, $R_R$ at 43.5°, $B_F$ at 45°, $P_R$ at 45°, $RBR_x$ at 90°, $FBR_y$ at 90°, $P_F$ at 135°, $R_F$ at 135°, $B_R$ at 135°, and $RBR_y$ at 180°. Corresponding positions in the third and fourth quadrants are not listed but are shown in FIG. 8(a). As will be appreciated from the disclosure set forth above, direction $RBR_y$ will always be 90° counterclockwise from $RBR_x$, while the same is true for $FBR_y$ relative to $FBR_x$.

Figure 8B:
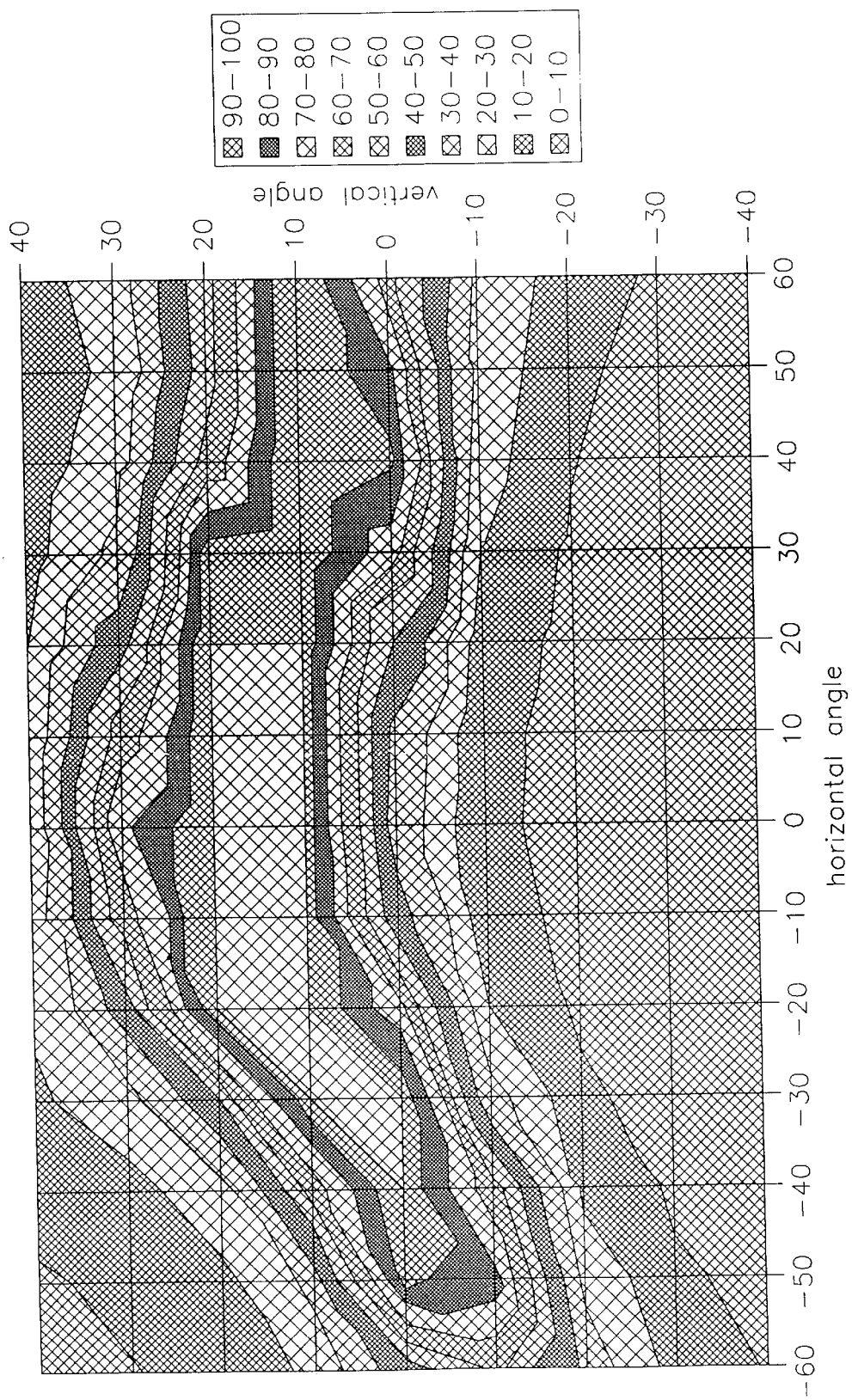
FIG. 8(b) is a white light contrast ratio graph of the NW TFT RGB AMLCD that was made and tested in Example 2, when 5.5 driving volts were applied across the liquid crystal material in the on-state.

FIG. 8(b) is a white light contrast ratio graph of the AMLCD of this second Example when 5.5 driving volts were applied to the LC layer in the on-state. As shown, the AMLCD exhibited a contrast ratio of at least about 40:1 over a horizontal angular span of at least about 120°. Furthermore, the display exhibited a contrast ratio of at least about 80:1 from horizontal angles of from about –53° to +60°. Vertically, the display exhibited a 10:1 contrast ratio over a vertical angular span along the 0° horizontal viewing axis of at least about 50°. At the –60° horizontal viewing axis, the AMLCD exhibited at least a 10:1 contrast ratio over a vertical angular span of at least about 68°.

Figure 9:
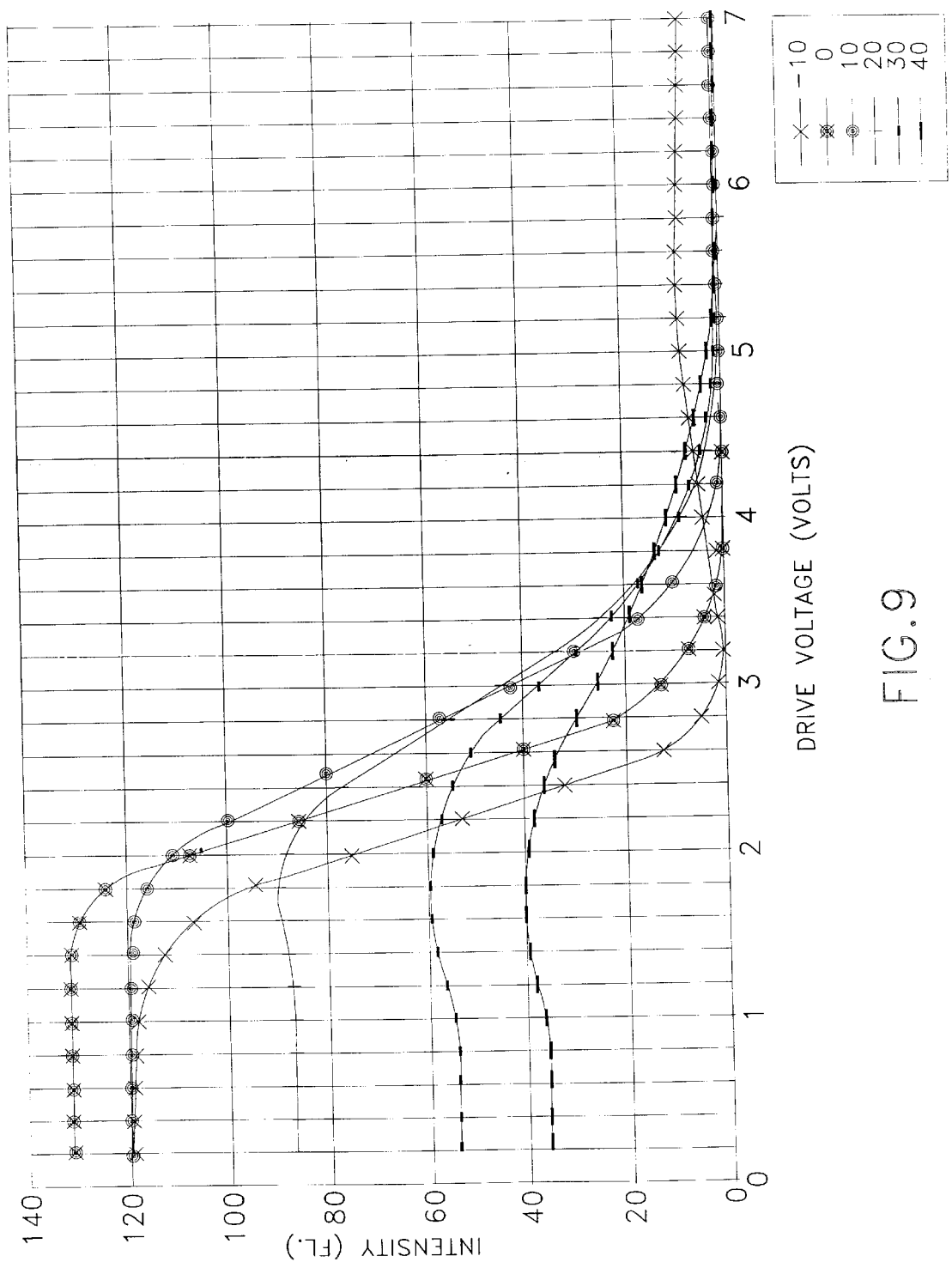
FIG. 9 is a transmission versus driving voltage graph for vertical angles along the 0° horizontal viewing axis of the TFT AMLCD tested in Example 2.
Figure 10:
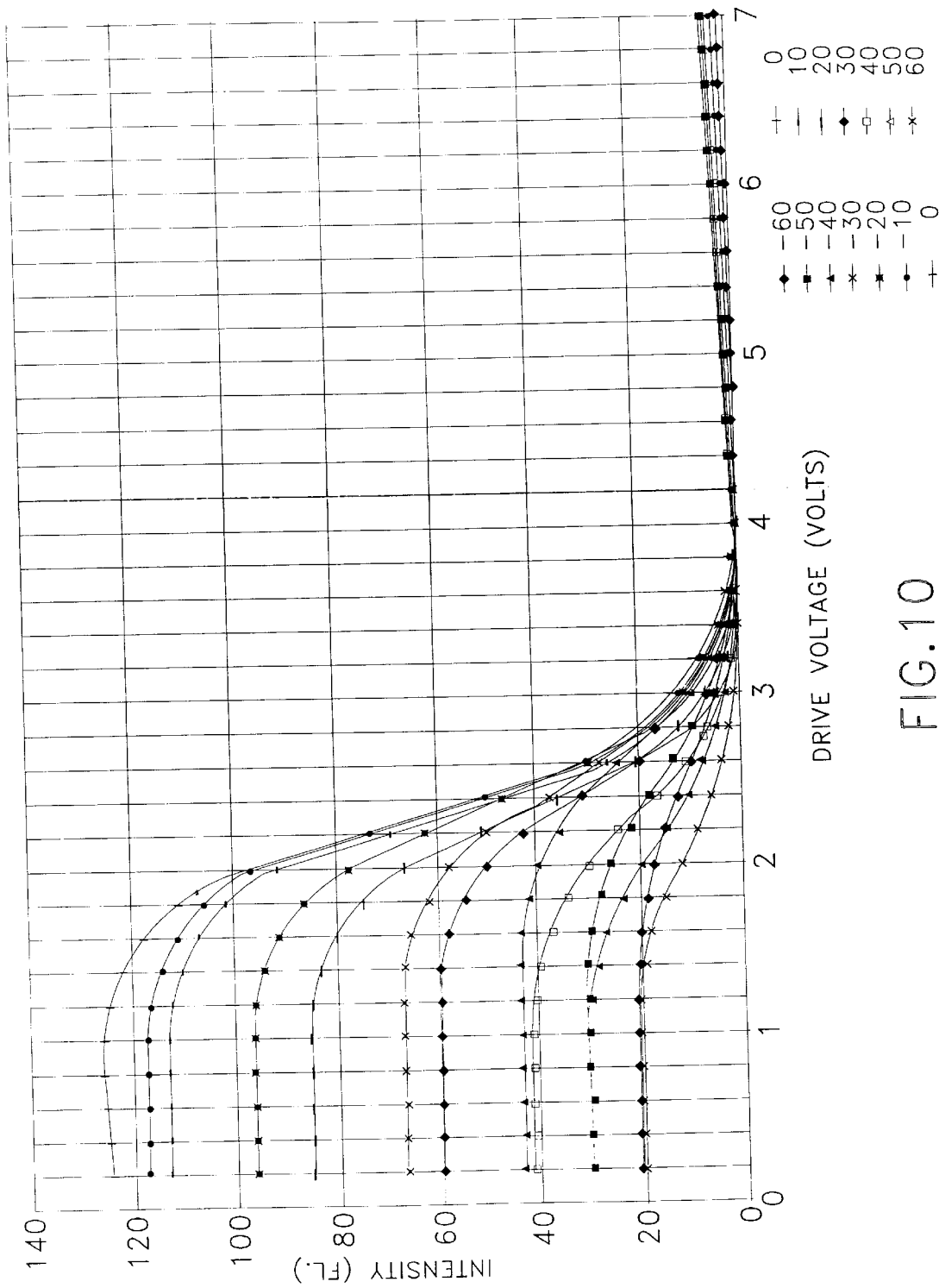
FIG. 10 is a transmission versus driving voltage graph for horizontal angles along the 0° vertical viewing axis for the TFT AMLCD tested in Example 2.

FIG. 9 is a transmission (fL) versus driving voltage (volts) graph at a plurality of vertical viewing angles along the 0° horizontal viewing axis for the AMLCD of this Example. As shown, very little inversion was present for the positive angles. FIG. 10 is a transmission versus driving voltage graph for the AMLCD of this Example at a plurality of horizontal viewing angles along the 0° vertical viewing axis. Again, the graph illustrates very little inversion at the illustrated horizontal angles.

EXAMPLE 3

In this third Example, a normally white TFT RGB AMLCD with an air gap 61 on each side of LC layer 9 was made and tested as follows in accordance with FIGS. 1, 11(a), 11(c), and 11(d). The display of this Example differed from those of the previous two Examples in that no index matching oil was provided in this Example adjacent the exterior sides of the substantially transparent substrates, thereby permitting the formation of air gaps 61 as shown in FIG. 11(a). The front and rear positive uniaxial retarders 2 and 14 each had a retardation value of about 140 nm, while the retardation value d·($n_x$–$n_z$) was about 100 nm for each of negative biaxial retarders 4 and 13. The retardation value d·($n_x$–$n_y$) for each of retarders 4 and 13 was about 12 nm. LC layer 9 had a thickness of about 5.20 μm in this Example.

Figure 11C:
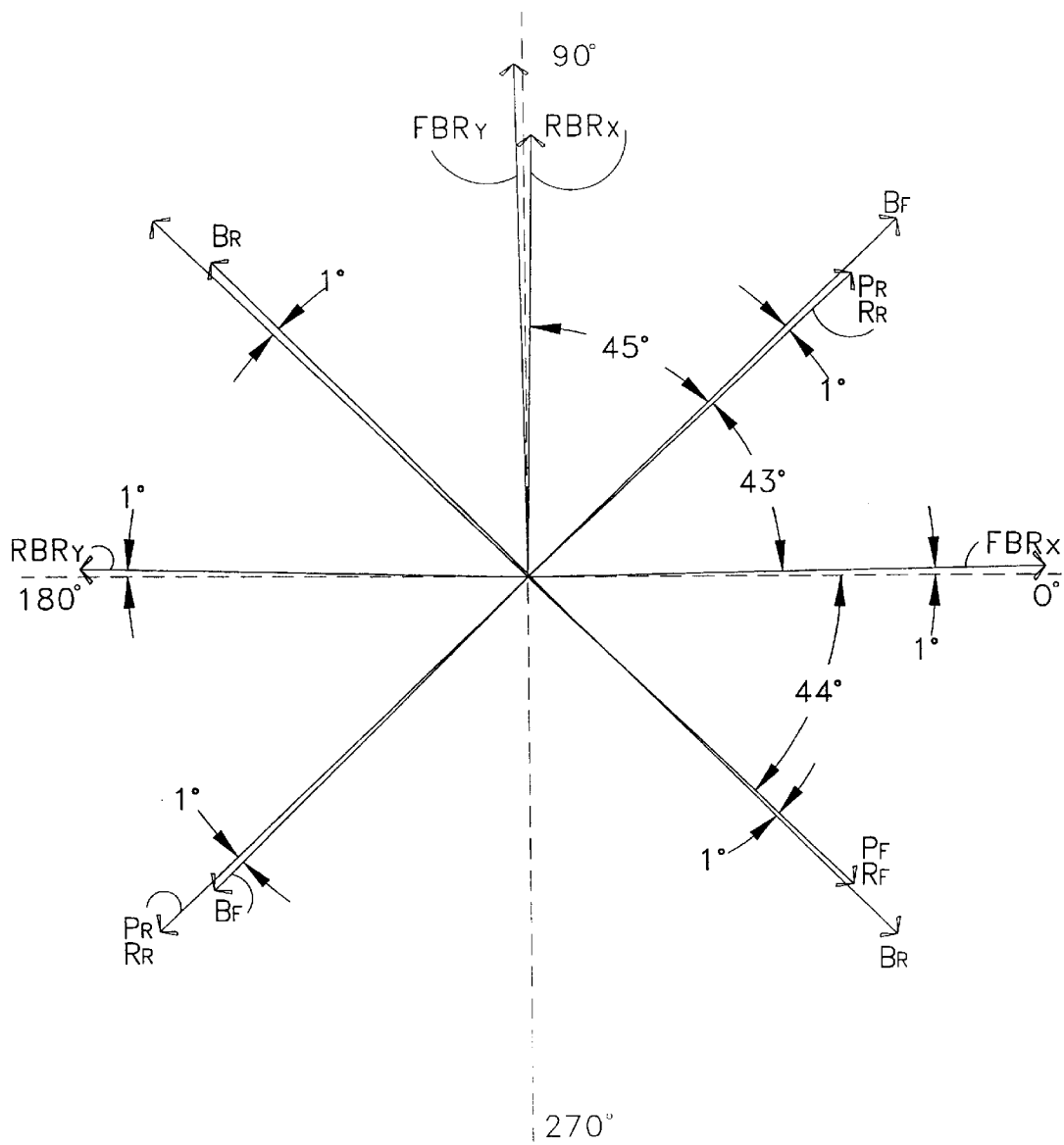
FIG. 11(c) illustrates the angular relation between the axes of the TFT RGB AMLCD made and tested in Example 3.

FIG. 11(c) illustrates, from the point of view of viewer 1, the angular relationship between the various axes of this AMLCD. Given a 0° axis 1° clockwise of $FBR_x$, the various axes were located as follows: $FBR_x$ at 1°, $P_R$ at 44°, $R_R$ at 44°, $B_F$ at 45°, $RBR_x$ at 89°, $FBR_y$ at 91°, $B_R$ at 135°, $P_F$ at 136°, $R_F$ at 136°, and $RBR_y$ at 179°. Again, third and fourth quadrant angular positions are not listed, but are shown in FIG. 11(c).

Figure 11D:
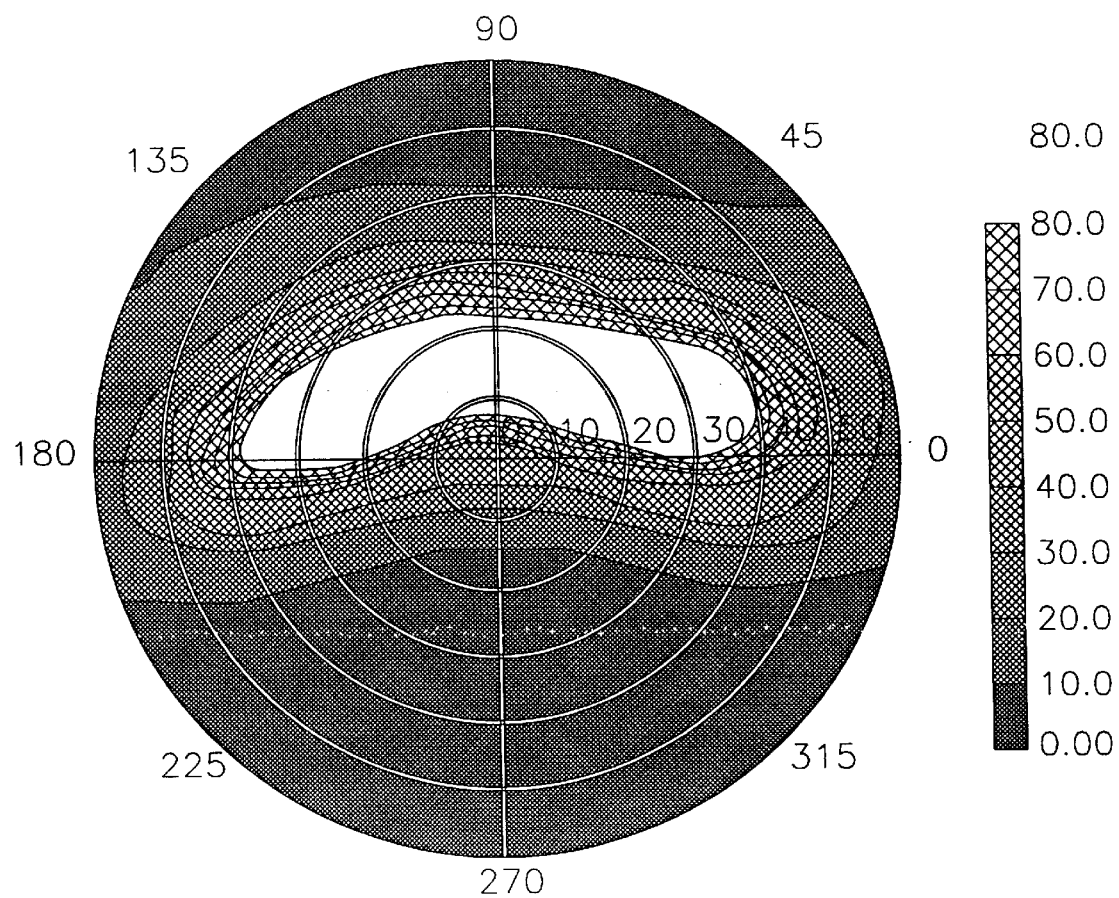
FIG. 11(d) is a white light contrast ratio graph of the Example 3 normally white TFT RGB AMLCD as shown in FIGS. 1, 11(a), and 11(c), where d·($n_x$−$n_z$)=100 nm for each of the two negative biaxial retarders, and d·Δn=140 nm for each of the positive uniaxial retarders.

FIG. 11(d) is a white light contrast ratio graph of the AMLCD of this Example. As shown, air gaps 61 provide for more rounded shoulders and a more rounded viewing zone. The maximum contrast ratio in this plot was 156.19. As illustrated, the AMLCD, when 5.5 driving volts were applied in the on-state, exhibited a contrast ratio of at least about 10:1 over a horizontal angular span along the 0° vertical viewing axis of at least about 120°. Vertically, the display exhibited a contrast ratio of at least about 10:1 over a vertical span along the 0° horizontal axis of at least about 55°. The high 80:1 and above contrast ratio area extended, at about 10° vertical, horizontally at least about 70°.

EXAMPLE 4

A NW TFT RGB AMLCD similar to that of the third Example was made and tested in this fourth Example, the only difference between this and the third Example being the retardation values of the negative biaxial retarders. Each of biaxial retarders 4 and 13 in this fourth Example had a retardation value d·($n_x$-$n_z$) of about 75 nm and a retardation value d·($n_x$-$n_y$) of about 9 nm. Otherwise, everything was the same as in Example 3, and as shown in FIGS. 11(*a*) and 11(*c*), including the provision of air gaps 61. Examples 3 and 4 are the only Examples herein, in which air gap(s) were provided. Index matching oil was utilized in all other Examples.

Figure 12:
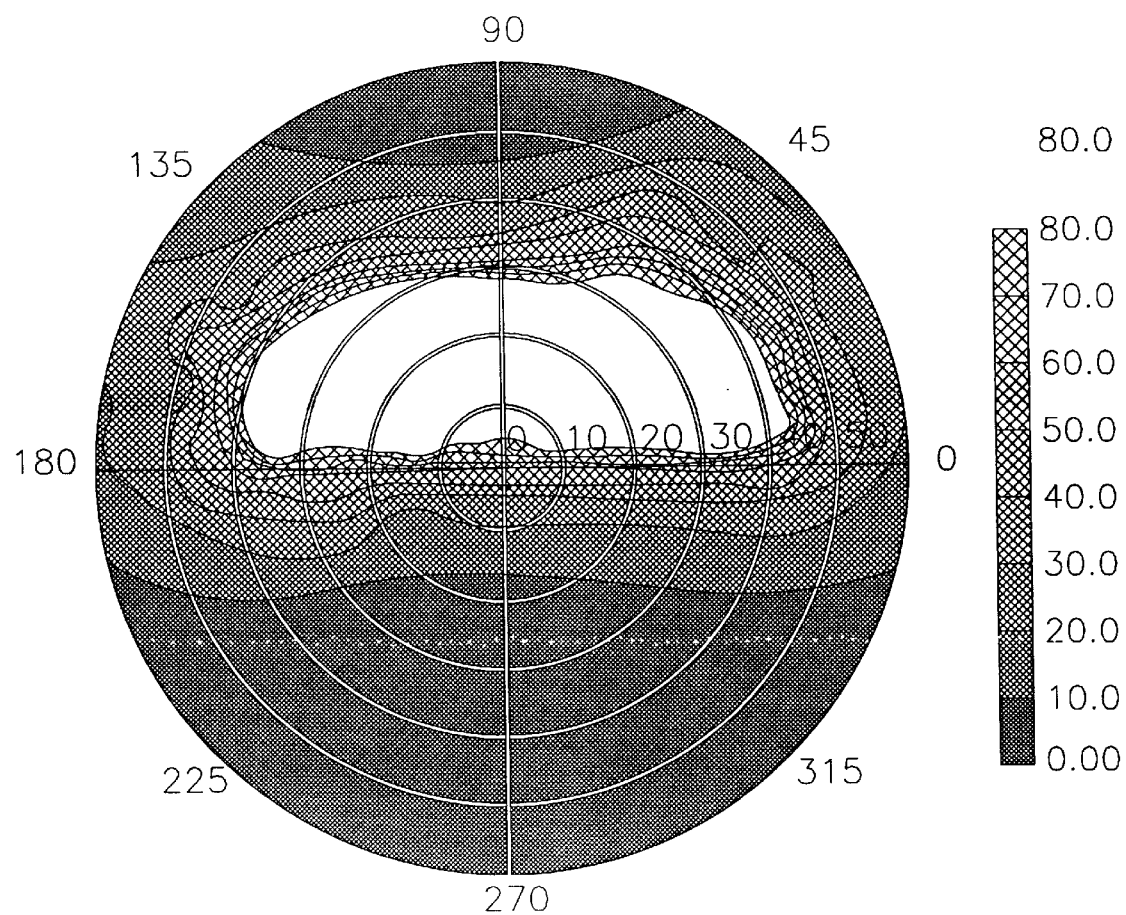
FIG. 12 is a white light contrast ratio graph of the light valve (LV) made and tested in Example 4 in accordance with FIGS. 1, 2, and 11(a) when the cell gap of LC layer 9 was 5.2 μm, 5.5 driving volts were applied across the LC in the on-state, and d·($n_x$−$n_z$) was 75 nm for each of the negative biaxial retarders.

FIG. 12 is a white light contrast ratio graph of the AMLCD of this fourth Example, when 5.5 driving volts were applied in the on-state. Note the rounded shoulders of the high contrast zone. Again, this AMLCD exhibited a contrast ratio (CR) of at least about 10:1 over a horizontal angular span of at least about 120°, and a contrast ratio of at least about 80:1 over a horizontal angular span of at least about 75°. Vertically, the high contrast ratio zone of about 80:1 and above extended over an angular span of at least about 23°. The maximum contrast in FIG. 12 was 293.88 while the minimum was 0.88.

EXAMPLE 5

Figure 15A:
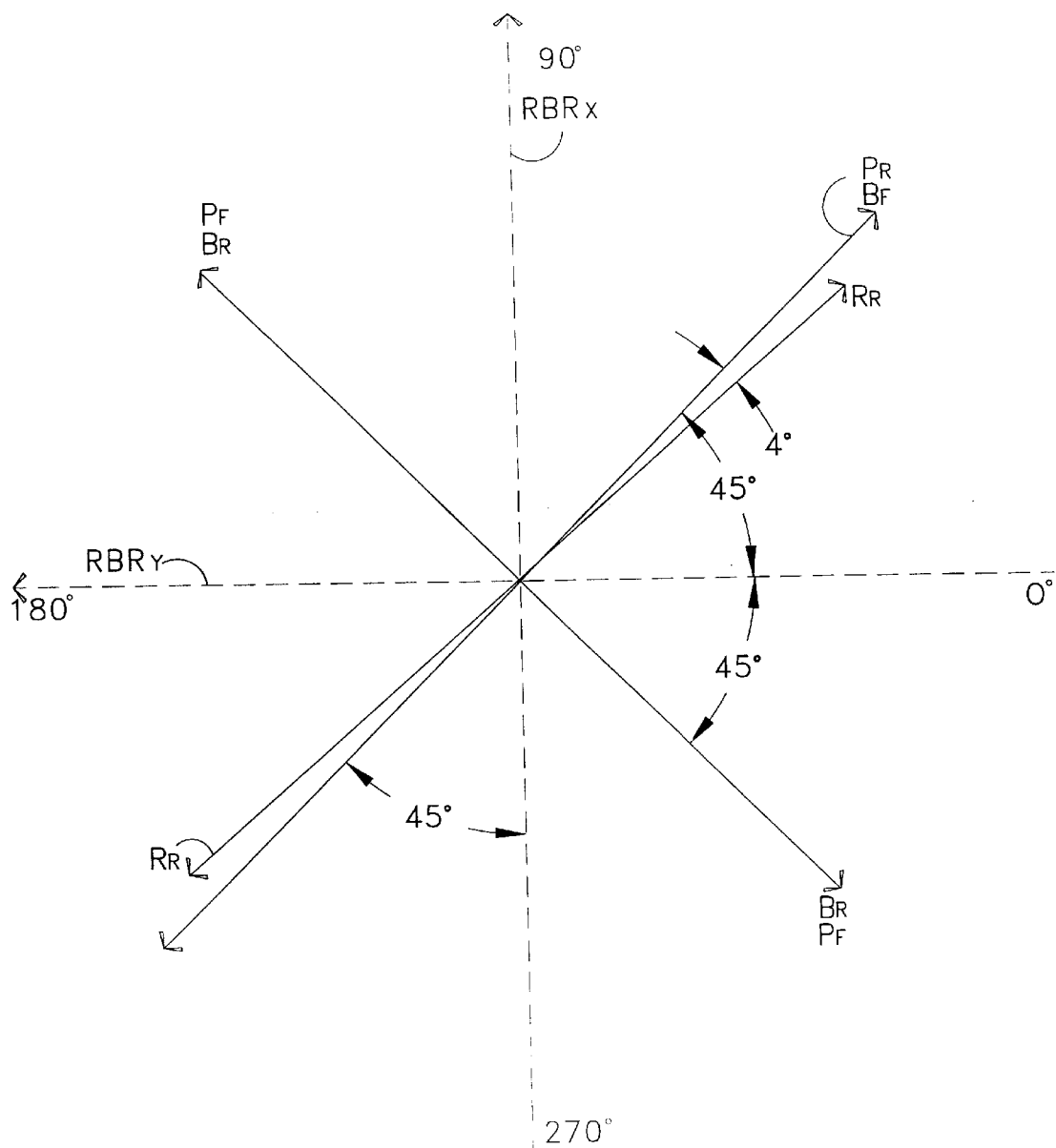
FIG. 15(a) illustrates the orientation of the axes of the NW RGB TFT AMLCD made and tested in Example 5 in accordance with FIG. 13.
Figure 15B:
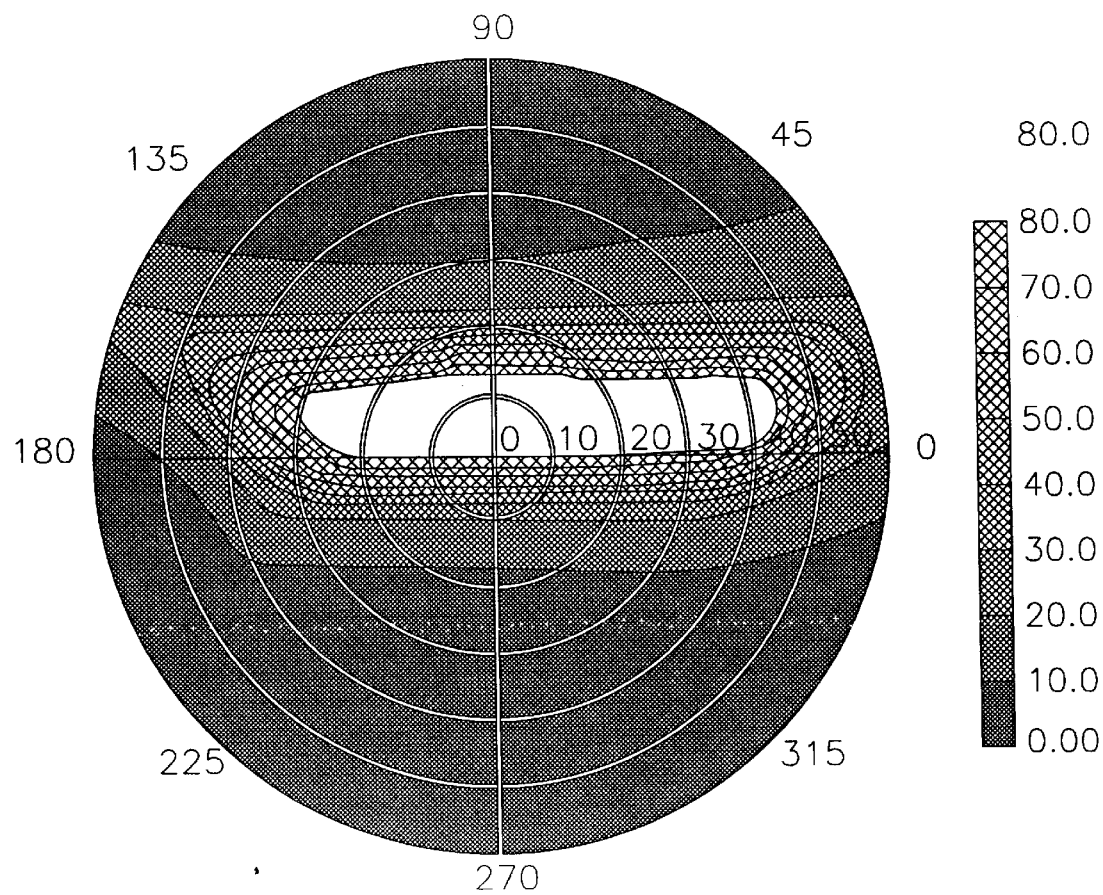
FIG. 15(b) is white light contrast ratio graph of the Example 5 RGB TFT AMLCD, in accordance with FIGS. 13 and 15(a), when the cell gap was 5.7 μm, 5.5 driving volts were applied in the on-state, d·Δn was 140 nm for the sole positive uniaxial retarder, and d·($n_x$−$n_z$) was 100 nm for the sole biaxial negative retarder.

In this fifth Example, a normally white RGB TFT AMLCD having a cell gap of 5.7 μm was made and tested in accordance with FIGS. 13, 15(*a*), and 15(*b*). As shown in FIG. 13, this AMLCD included rear positive uniaxial retarder 2 and rear negative biaxial retarder 4, but no front retarders. The retardation value d·Δn for positive retarder 2 was 140 nm, while the retardation value d·($n_x$-$n_z$) was 100 nm for biaxial retarder 4, and retardation value d·($n_x$-$n_y$) was 12 nm for retarder 4. No air gaps were present, nor were any present in any of the remaining Examples discussed hereinafter.

FIG. 15(*a*) illustrates, from the point of view of viewer 1, the relationship between the axes of the AMLCD of this fifth Example. Given a 0° axis 45° clockwise from front buffing direction $B_F$, the axes of this AMLCD were arranged as follows: $R_R$ at 41°, $P_R$ at 45°, $B_F$ at 45°, RBR$_x$ at 90°, $B_R$ at 135°, $P_F$ at 135°, and RBR$_y$ at 180°. Third and fourth quadrant angles are shown in FIG. 15(*a*).

FIG. 15(*b*) is a white light contrast ratio graph of the NW AMLCD of this fifth Example when 5.5 driving volts were applied to the display in the on-state. As shown, the display exhibited a contrast ratio of at least about 80:1 over a horizontal anglular span of at least about 65°. Additionally, the display exhibited at least a 10:1 contrast ratio over a horizontal angular span of at least about 140°. Vertically, the display exhibited at least a 10:1 contrast ratio along the 0° horizontal viewing axis of at least about 48°. The maximum CR in FIG. 15(*b*) was 132.95 while the minimum was 0.40.

EXAMPLE 6

Figure 16:
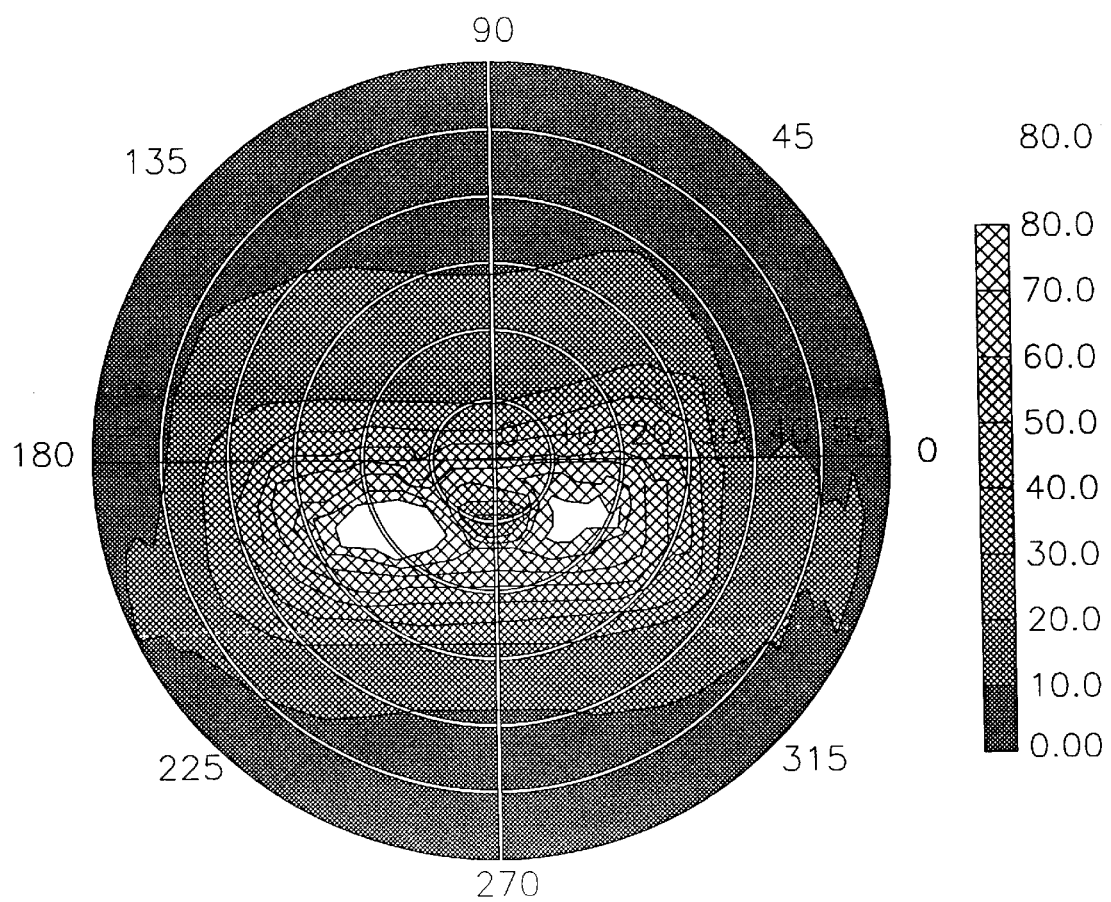
FIG. 16 is a white light contrast ratio graph of the NW LV made and tested in Example 6, in accordance with FIG. 1, where the cell gap was 5.20 μm, 5.5 driving volts were applied, d·Δn for each positive uniaxial retarder was 140 nm, d·($n_x$−$n_z$) was 100 nm for each of the negative biaxial retarders, and both biaxial negative retarders were rotated symmetrically 180° with respect to the FIG. 2 embodiment.

In the sixth Example, a normally white light valve having a cell gap of 5.20 μm was made and tested in accordance with FIGS. 1 and 16. The front and rear positive uniaxial retardation films 14 and 2 each had a retardation value of 140 nm, while each of the front and rear negative biaxial retarders 13 and 4, respectively, had a retardation value d·($n_x$-$n_z$) of 100 nm and d·($n_x$-$n_y$) of 12 nm. In each of the negative biaxial retarders, $n_x$ was about 1.5855, $n_y$ was about 1.5853, and $n_z$ was about 1.5839. With regard to the optical axes of this sixth Example, they were arranged as shown in FIG. 2 except that each of the negative biaxial retarders was rotated 180° symmetrically.

FIG. 16 is a white light contrast ratio graph of the normally white light valve of this sixth Example. As shown, the output included two "eyes", both located below the 0° vertical viewing axis. 5.5 driving volts were applied to this light valve in the on-state to come up with the FIG. 16 graph. The maximum CR in FIG. 16 was 101.18 while the minimum was 1.01.

EXAMPLE 7

Figure 17:
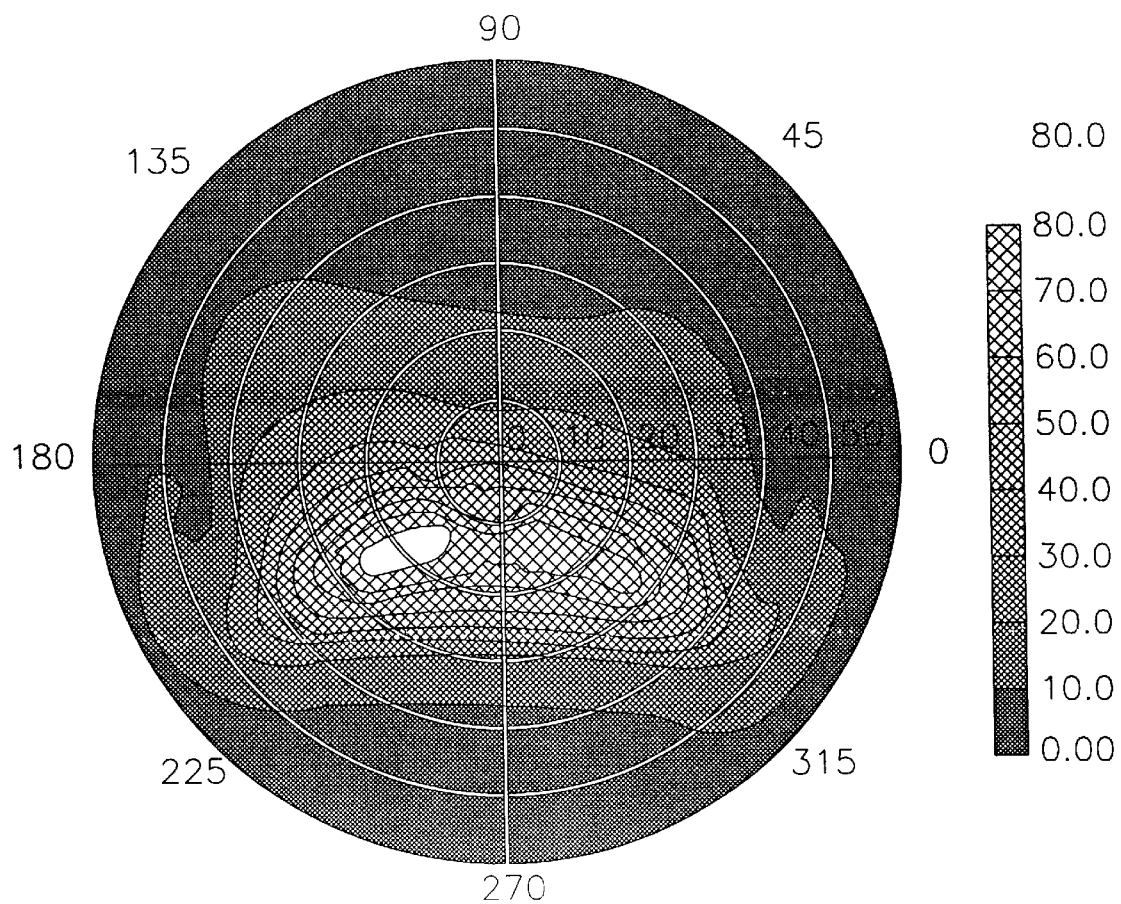
FIG. 17 is a white light contrast ratio graph of the NW LV made and tested in Example 7, where the cell gap was 5.20 μm, 5.5 driving volts were applied, d·($n_x$−$n_z$) was 100 nm for each of the biaxial negative retarders, d·Δn was 140 nm for each of the positive uniaxial retarders, and the $n_x$ axis of each of the biaxial retarders was aligned parallel to the adjacent polarizer transmission axis.

In this seventh Example, a normally white light valve (LV) having a cell gap of 5.20 μm was made and tested in accordance with FIGS. 1 and 17. Each of the positive uniaxial retarders 2 and 14, respectively, had a retardation value d·Δn of 140 nm. Each of the negative biaxial retarders 4 and 13, respectively, had a retardation value d·($n_x$-$n_z$) of 100 nm and d·($n_x$-$n_y$) of 12 nm. The axes of this NW light valve were as shown in FIGS. 1 and 2 except that the $n_x$ direction (RBR$_x$ and FBR$_x$) of each of the biaxial retarders was parallel to the adjacent polarizer transmission axis. In other words, FBR$_x$ was substantially parallel to $P_F$, while RBR$_x$ was substantially parallel to $P_R$. FIG. 17 is a white light contrast ratio graph of this NW LV when 5.5 driving volts were applied in the on-state. As illustrated, the highest contrast area was located in the lower vertical viewing area, or below the 0° vertical viewing axis. The light valve in FIG. 17 exhibited a 10:1 contrast ratio along the 0° vertical viewing axes only over a horizontal angular span of less than about 85°. The maximum CR in FIG. 17 was 92.03 while the minimum was 1.26.

EXAMPLE 8

Figure 18:
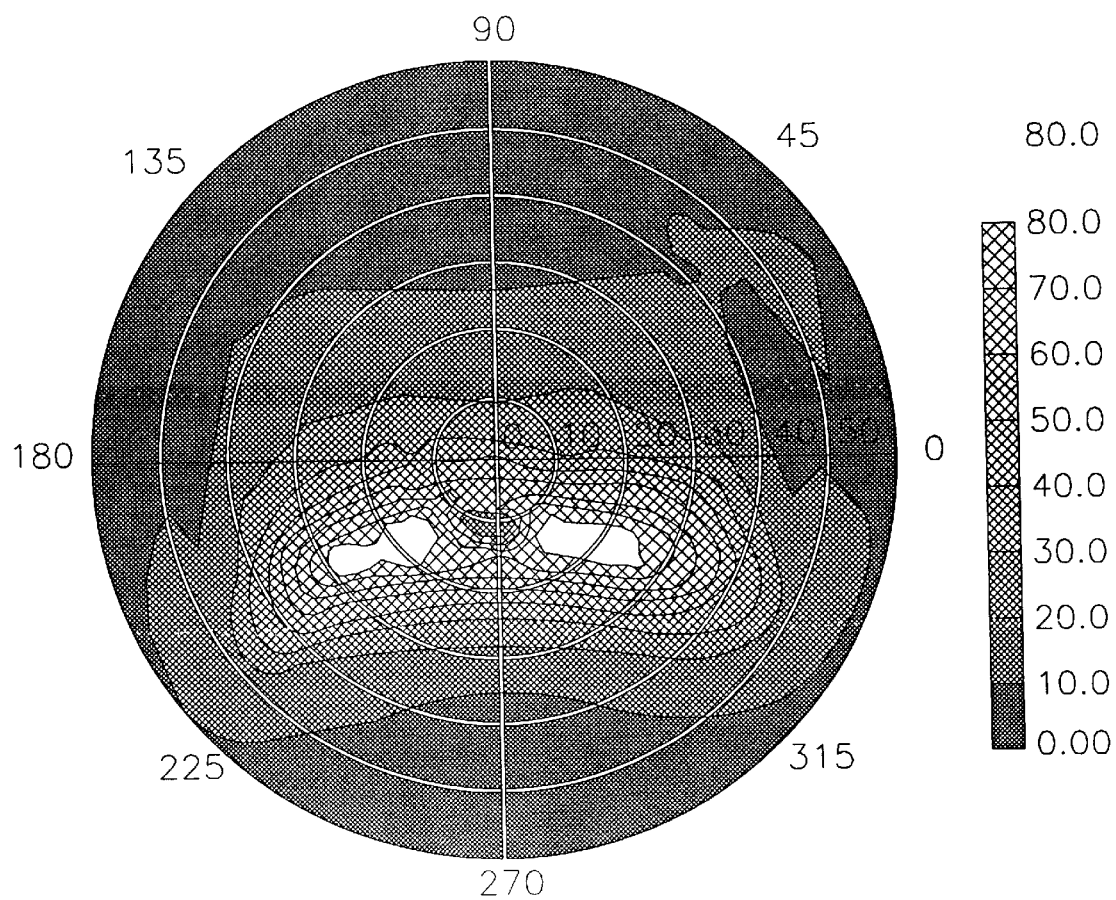
FIG. 18 is a white light contrast ratio graph of the Example 8 NW LV which was similar to that of FIGS. 16–17, except that the same negative biaxial retarders were rotated such that their respective $n_x$ optical axes were aligned substantially perpendicular to their adjacent polarizer transmission axes in this Example.

In this eighth Example, a normally white LV having a cell gap of about 5.20 μm was made and tested in accordance with FIGS. 1 and 18. Each of the positive retarders 2 and 14 had a retardation value of about 140 nm. Each of the negative biaxial retarders 4 and 13 had retardation values the same as in Example 7. The NW LV of this eighth Example had its axes arranged as shown in FIGS. 1 and 2, except that the $n_x$ direction of each negative biaxial retarder was aligned substantially perpendicular to the corresponding adjacent polarizer transmission axis. In other words, FBR$_x$ was substantially perpendicular to $P_F$, while RBR$_x$ was substantially perpendicular to $P_R$.

FIG. 18 is a white light contrast ratio graph of this NW LV when 5.5 driving volts were applied in the on-state. As shown, the display exhibited two "eyes" in the lower vertical viewing zone. Again, this LV exhibited a contrast ratio along the 0° vertical viewing axes of 10:1 over a horizontal angular span of less than about 90°. The maximum CR in FIG. 18 was 95.65 while the minimum was 1.03.

EXAMPLE 9

In this ninth Example, a normally white LV having a cell gap of 5.20 μm was made and tested in accordance with FIGS. 20, 21(*a*), and 21(*b*). As shown in FIG. 20, this NW LV had rear and front positive uniaxial retarders 2 and 14, each having a retardation value of 140 nm. Additionally, this LV included rear and front negative uniaxial retarders 73 and 74, respectively, each having a retardation value d·Δn of 100 nm. These two negative uniaxial retarders were defined by $n_x$=$n_y$≠$n_z$. The optical axis of each of retarders 73 and 74 was substantially perpendicular to the plane of each film (i.e. in the "z" direction). FIG. 21(*a*) illustrates the relationship between the axes of this NW LV given a 0° axis 45° clockwise of $B_F$. The axes were aligned as follows as shown in FIG. 21(*a*): $R_R$ at 43.5°, $B_F$ at 45°, $P_R$ at 47.5°, $B_R$ at 135°, $P_F$ at 132.5°, and $R_F$ at 138.5°. For each of the negative uniaxial retarders 73 and 74 in this Example, the index of refraction $n_x$ equaled the index of refraction $n_y$.

Figure 21B:
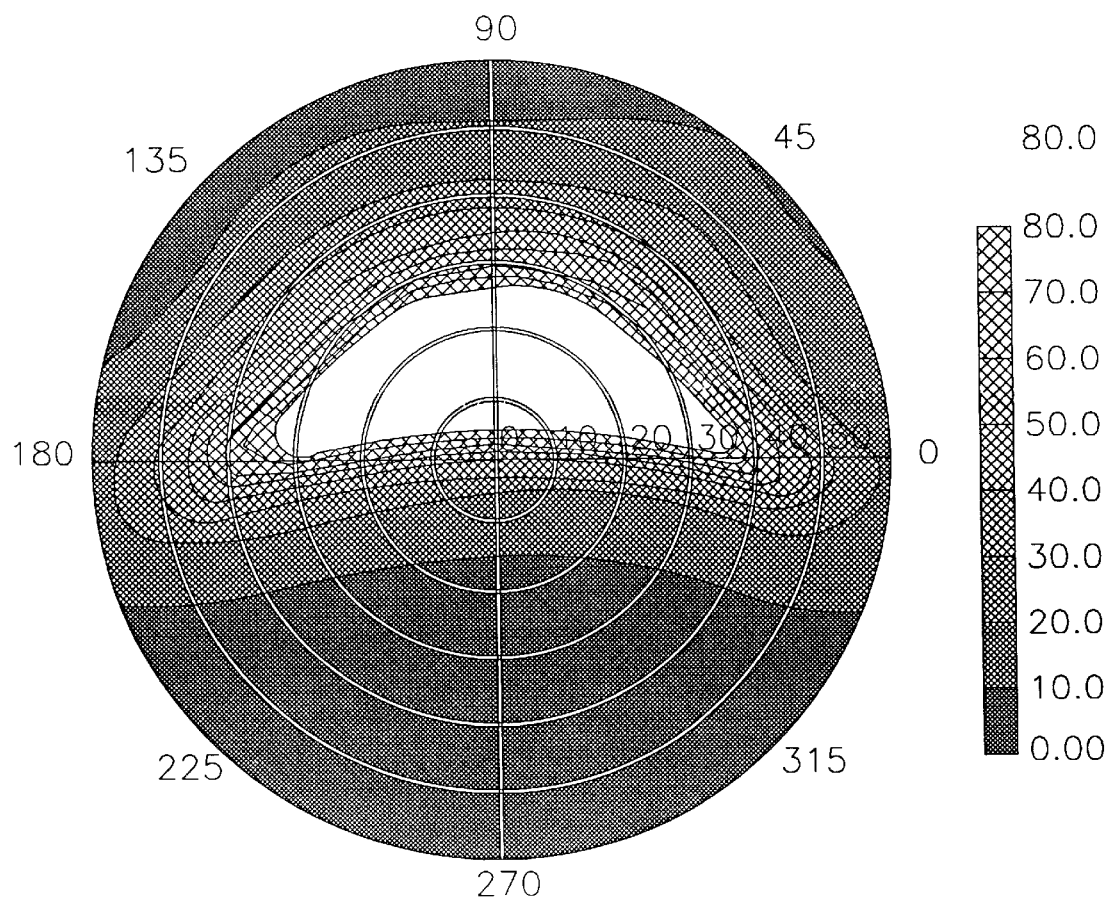
FIG. 21(b) is a white light contrast ratio graph of the NW LV made and tested in Example 9, in accordance with FIG. 20, where each of the two negative uniaxial retarders had a retardation value of d·Δn 100 nm, the cell gap was 5.20 μm, and 5.5 driving volts were applied to the LC in the on-state.

FIG. 21(b) is a white light contrast ratio (CR) graph of the NW LV of this Example when 5.5 driving volts were applied to the LC layer 9 in the on-state. As shown, the LV exhibited a contrast ratio along the 0° vertical viewing axis of at least about 10:1 over a horizontal angular span of at least about 120°. The display also exhibited a contrast ratio of at least about 80:1 over a horizontal angular span of at least about 68°. The maximum CR in FIG. 21(b) was 177.68 while the minimum was 0.50.

EXAMPLE 10

Figure 22A:
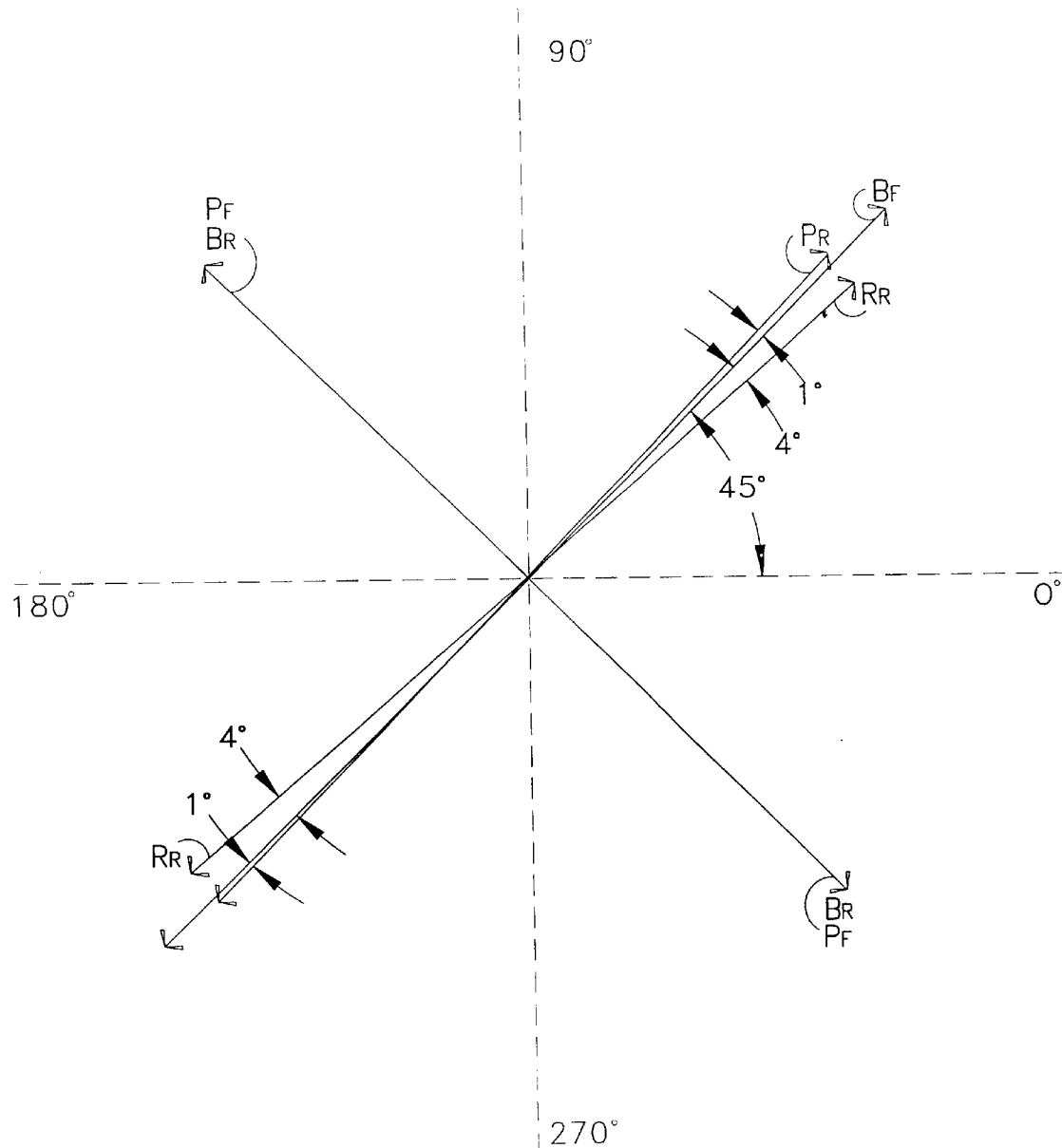
FIG. 22(a) illustrates the angular relationship, from the front of the display, between the axes of the NW light valves of Examples 10 and 11.
Figure 22B:
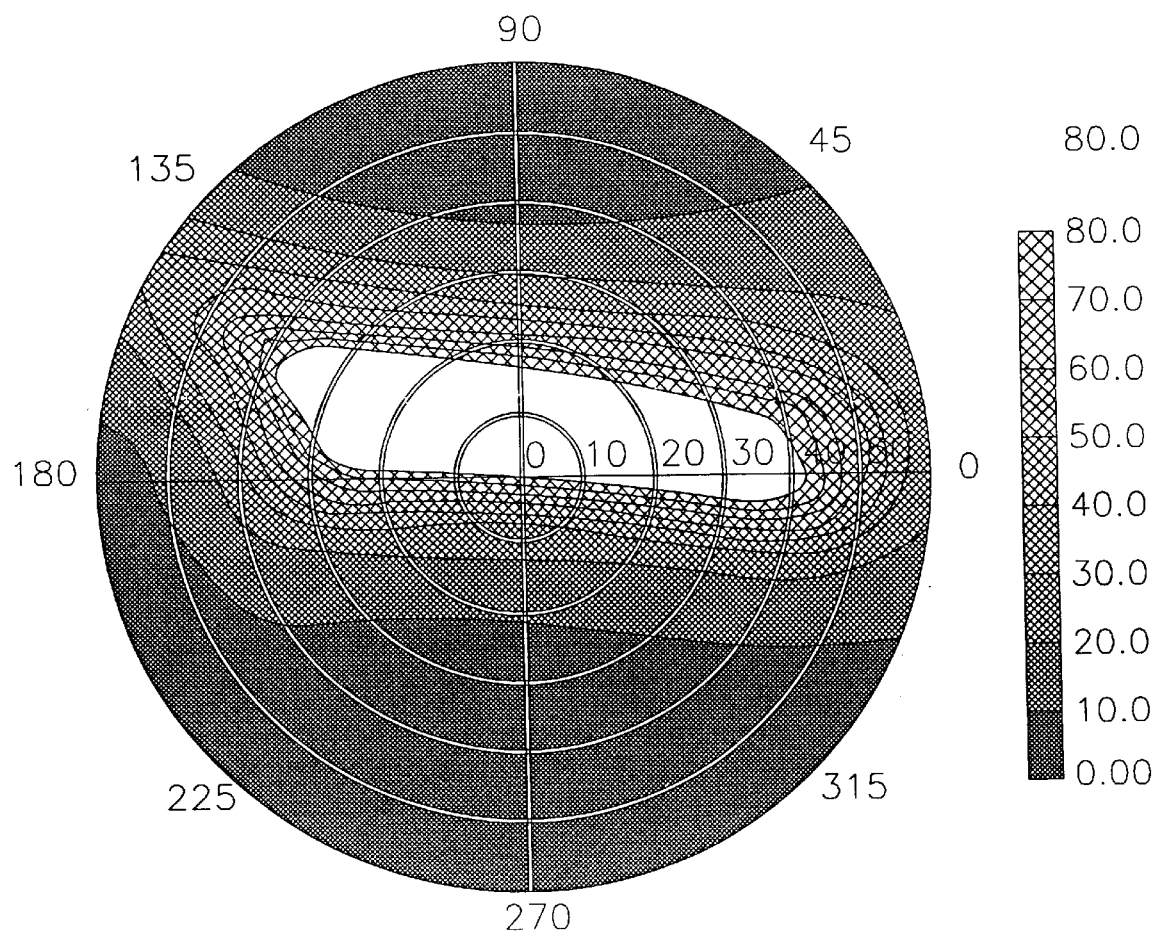
FIG. 22(b) is a white light contrast ratio graph of the NW LV made and tested in Example 10 in accordance with FIGS. 19 and 22(a), wherein the two uniaxial negative retarders each had a retardation value of about 100 nm and the cell gap "d" was 5.20 μm.

In this tenth Example, a normally white LV was made and tested in accordance with FIGS. 19, 22(a), and 22(b). As shown in FIG. 19, this NW LV included rear positive uniaxial retarder 2, a first rear negative uniaxial retarder 71, and second rear uniaxial negative retarder 72. In contrast to FIG. 19, no front retarder was provided in the LV of this Example. In other words, only front polarizer 15 was located on the front side of LC layer 9, in addition to the typical orientation film, substrate, etc. For each of negative uniaxial retarders 71 and 72, $n_x = n_y$ in this Example. The optical axis of each of retarders 71 and 72 was aligned in the "z" direction. Positive uniaxial retarder 2 had a retardation value of 140 nm, while each of negative uniaxial retarders 71 and 72 had a retardation value d Δn of 100 nm for a total negative retardation of 200 nm on the rear side of the LC layer 9.

As shown in FIG. 22(a), given a 0° axes 45° clockwise of $B_F$, the axes of this NW LV were oriented as follows from the point of view of viewer 1: $R_R$ at 41°, $P_R$ at 46°, $B_F$ at 45°, $B_R$ at 135°, and $P_F$ at 135°.

FIG. 22(b) is a white light contrast ratio graph of the NW LV of this tenth Example when about 5.5 driving volts were applied to the LC layer in the on-state. The maximum contrast ratio of FIG. 22(b) was 166.83, while the minimum contrast ratio was 0.84. As illustrated, this LV exhibited a contrast ratio of at least about 80:1 over a horizontal anglular span of at least about 80°. Additionally, at about 20° vertical, the display exhibited at least a 20:1 contrast ratio over a horizontal anglular span of at least about 120°. Vertically, along the 0° horizontal viewing axis, the display exhibited at least a 10:1 contrast ratio over a vertical angular span of at least about 57°.

EXAMPLE 11

Figure 23:
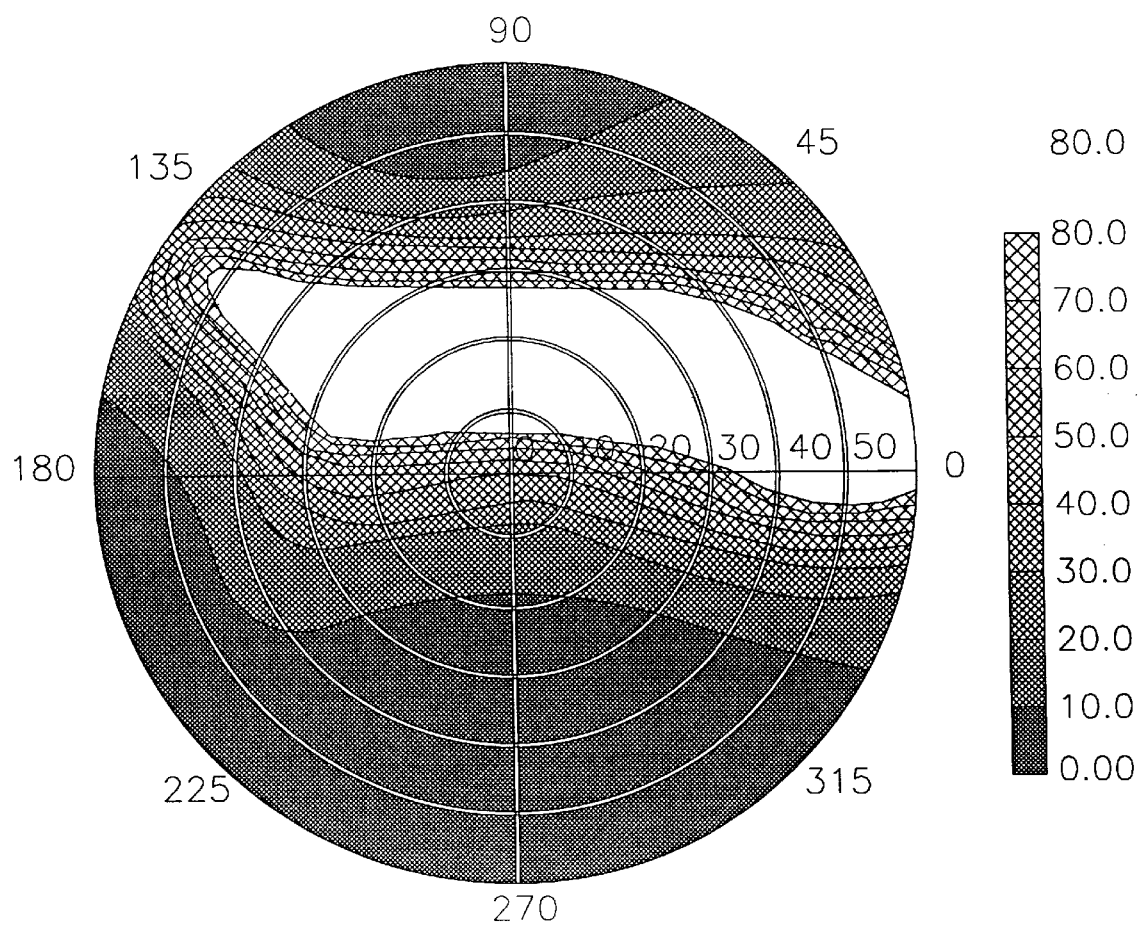
FIG. 23 is a white light contrast ratio graph of the NW light valve made and tested in Example 11, in accordance with FIGS. 19 and 22(a) and similar to the FIG. 22 light valve, except that each negative uniaxial retarder had a retardation value of about 120 nm.

In this eleventh Example, an NW LV was made and tested. The NW LV of this Example was the same as that of Example 10, except that each of the two rear negative uniaxial retarders had a retardation value of 120 nm (instead of 100 nm). The axes of this NW LV were as shown in FIG. 22(a) and as discussed above in Example 10. FIG. 23 is a normally white contrast ratio graph of the NW LV of this Example when 5.5 volts were applied to the LC in the on-state. This LV had, as in Example 10, a cell gap "d" of about 5.20 μm. The maximum contrast ratio in FIG. 23 was 357.70, while the minimum contrast ratio was 0.57. As illustrated in FIG. 23, this LV exhibited a contrast ratio of at least about 80:1 over an angular span of at least about 105°. Additionally, this display exhibited a contrast ratio of at least about 50:1 over an angular span of at least about 120° as measured along the proximate longitudinal axis of the high contrast ratio region. Vertically, along the 0° horizontal viewing axis, this LV exhibited a contrast ratio of at least about 10:1 over a vertical angular span of at least about 63°.

EXAMPLE 12

Figure 24A:
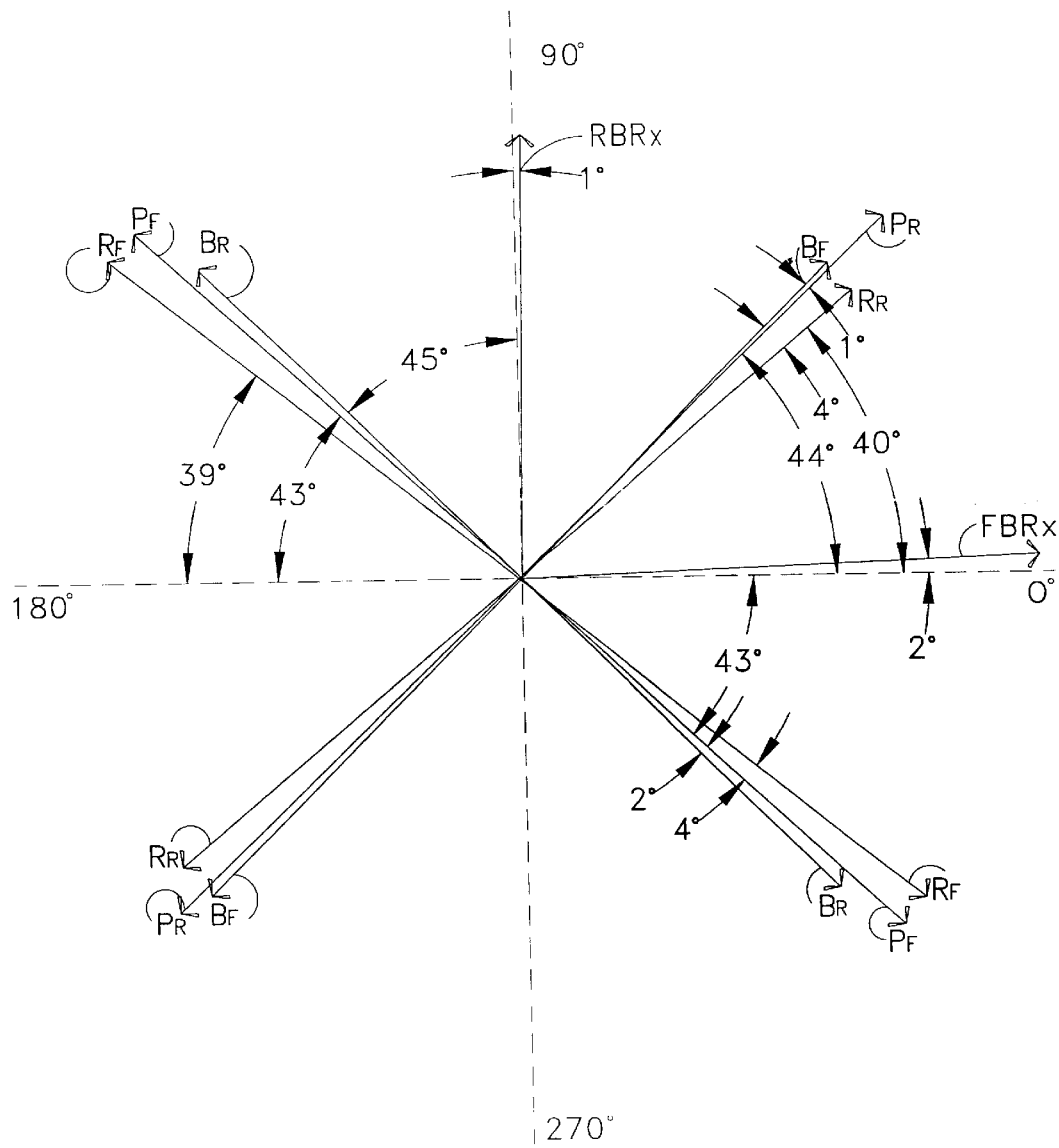
FIG. 24(a) illustrates the angular relationship of the axes in the NW LVs of Examples 12–13, made in accordance with FIG. 1.
Figure 24B:
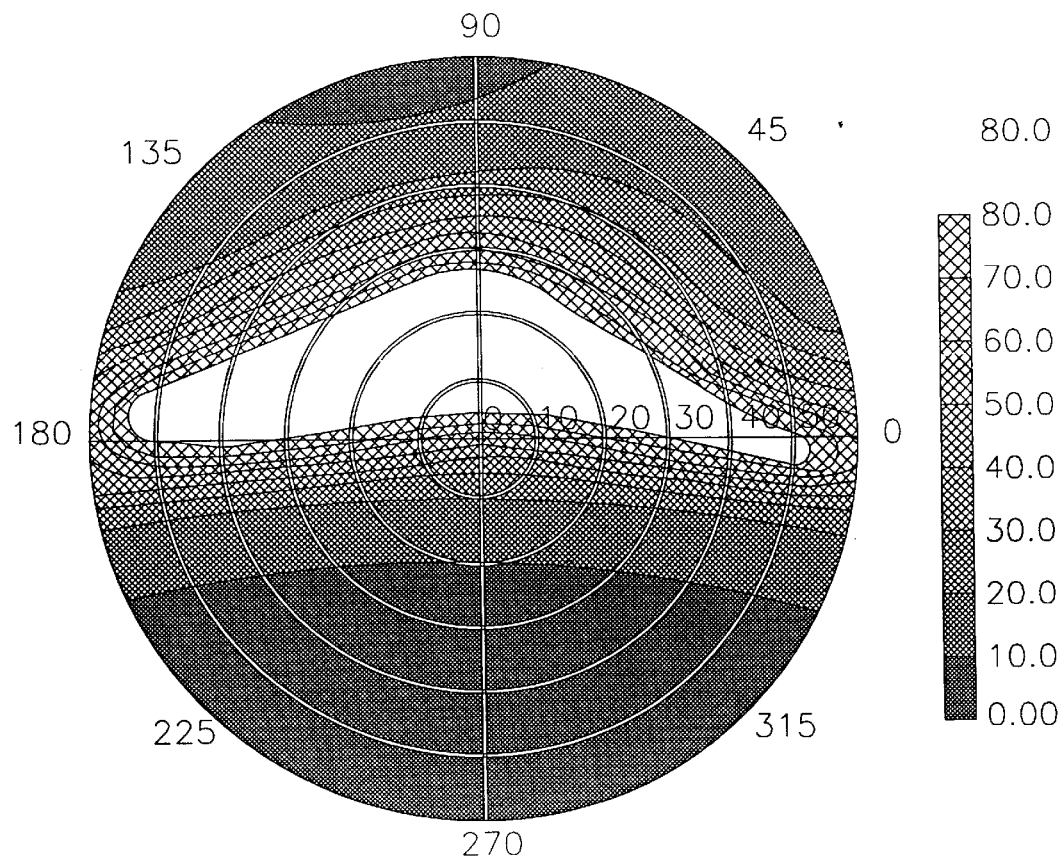
FIG. 24(b) is a white light contrast ratio graph of the normally white LV made and tested in Example 12, in accordance with FIGS. 1 and 24(a), where the cell gap was 5.75 μm, 6.0 driving volts were applied in the on-state, and d·($n_x$–$n_z$)=100 nm for each of the negative biaxial retarders.

In this twelfth Example, an NW LV having a cell gap "d" of 5.75 μm was made and tested in accordance with FIGS. 1, 24(a), and 24(b). Each of the front 14 and rear 2 positive uniaxial retarders had a retardation value d·Δn of 140 nm. Meanwhile, each of the rear 4 and front 13 negative biaxial retarders had a retardation value d·$(n_x-n_z)$ of 100 nm and a retardation value d $(n_x-n_y)$ of 12 nm. As shown in FIG. 24(a), this NW LV included numerous axes with the following relation given a 0° axis 45° clockwise of $B_F$ as viewed from viewer 1: $FBR_x$ at 2°, $R_R$ at 40°, $P_R$ at 44°, $B_F$ at 45°, $RBR_x$ at 89°, $B_R$ at 135°, $P_F$ at 137°, and $R_F$ at 141°.

FIG. 24(b) is a white light contrast ratio of the NW LV of this twelfth Example when 6.0 driving volts were applied to the LC in the on-state. The maximum contrast ratio in FIG. 24(b) was 228.0 while the minimum was 1.09. As shown, along the 0° vertical viewing axis, this LV exhibited a contrast ratio of at least about 30:1 over a horizontal angular span of at least about 120°. Additionally, this LV exhibited, along the 0° horizontal viewing axis, a contrast ratio of at least about 10:1 over a vertical angular span of at least about 70°. The extent of the high contrast 80:1 ratio range extended horizontally to horizontal viewing angles of at least about −50 and +50 along the 0° vertical viewing axis.

EXAMPLE 13

Figure 25:
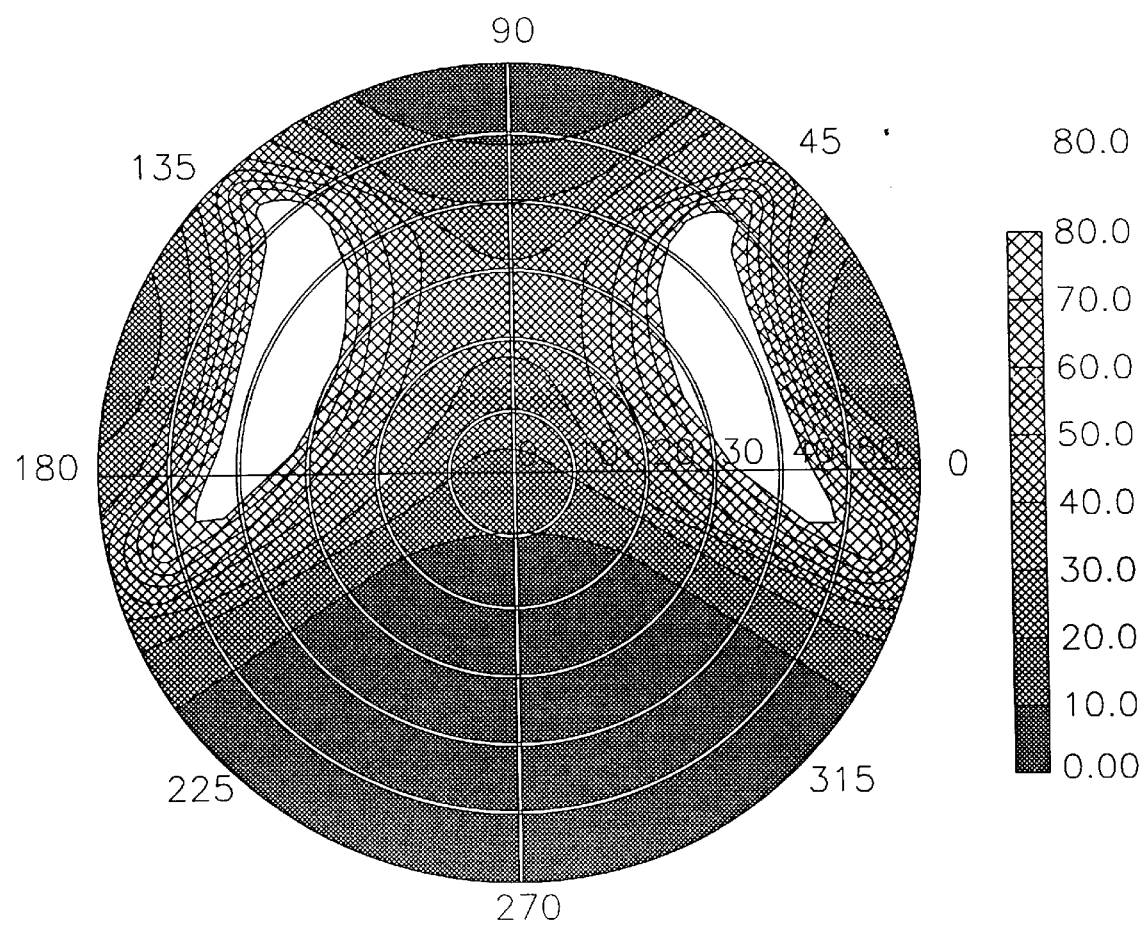
FIG. 25 is a white light contrast ratio graph of the NW LV made and tested in Example 13, in accordance with FIGS. 1 and 24(a), where the cell gap was 4.75 μm, 6.0 driving volts were applied, and d·($n_x$–$n_z$)=100 nm for each of the negative biaxial retarders.

In this thirteenth Example, a NW LV similar to that of Example 12 was made and tested. The LV of this thirteenth Example was the same as that in Example 12, except that the cell gap was only 4.75 μm in this Example (instead of 5.75 μm in Example 12). Otherwise, the retardation values, axis alignments, etc. were the same. FIG. 25 is a white light contrast ratio graph of the LV of this thirteenth Example when 6.0 driving volts were applied to the LC in the on-state. As can be seen, the 80:1 high contrast viewing zone was divided into two separate areas, one to the left and one to the right of the 0° horizontal viewing axis. Additionally, the viewing zone was shifted slightly vertically, and exhibited excellent viewing characteristics at horizontal angles in the vertical viewing zone of about ±30°. The maximum CR in FIG. 25 was 156.31 while the minimum was 0.53.

EXAMPLE 14

Figure 26A:
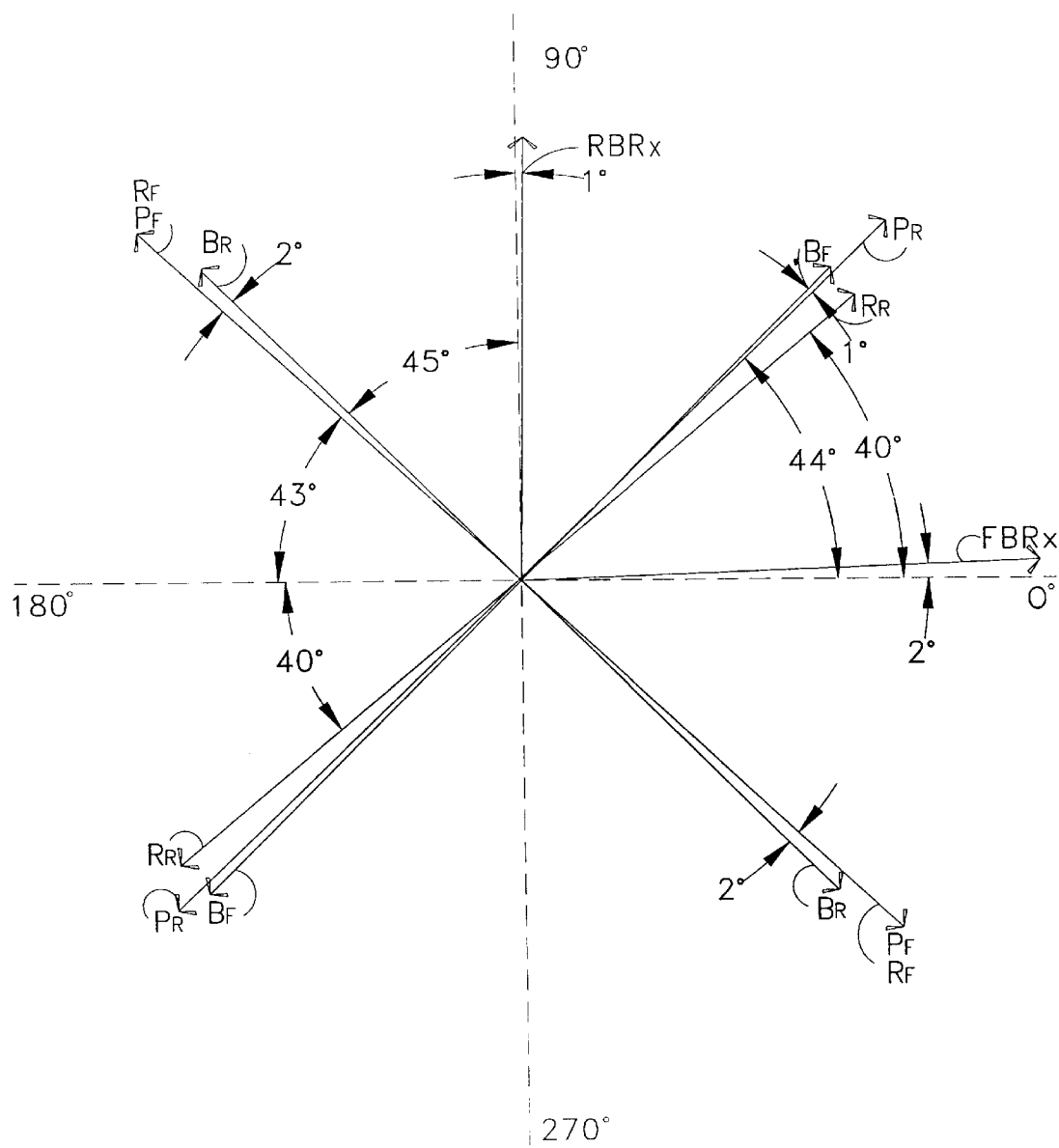
FIG. 26(a) illustrates the relationship between the axes of the Example 14 NW light valve.
Figure 26B:
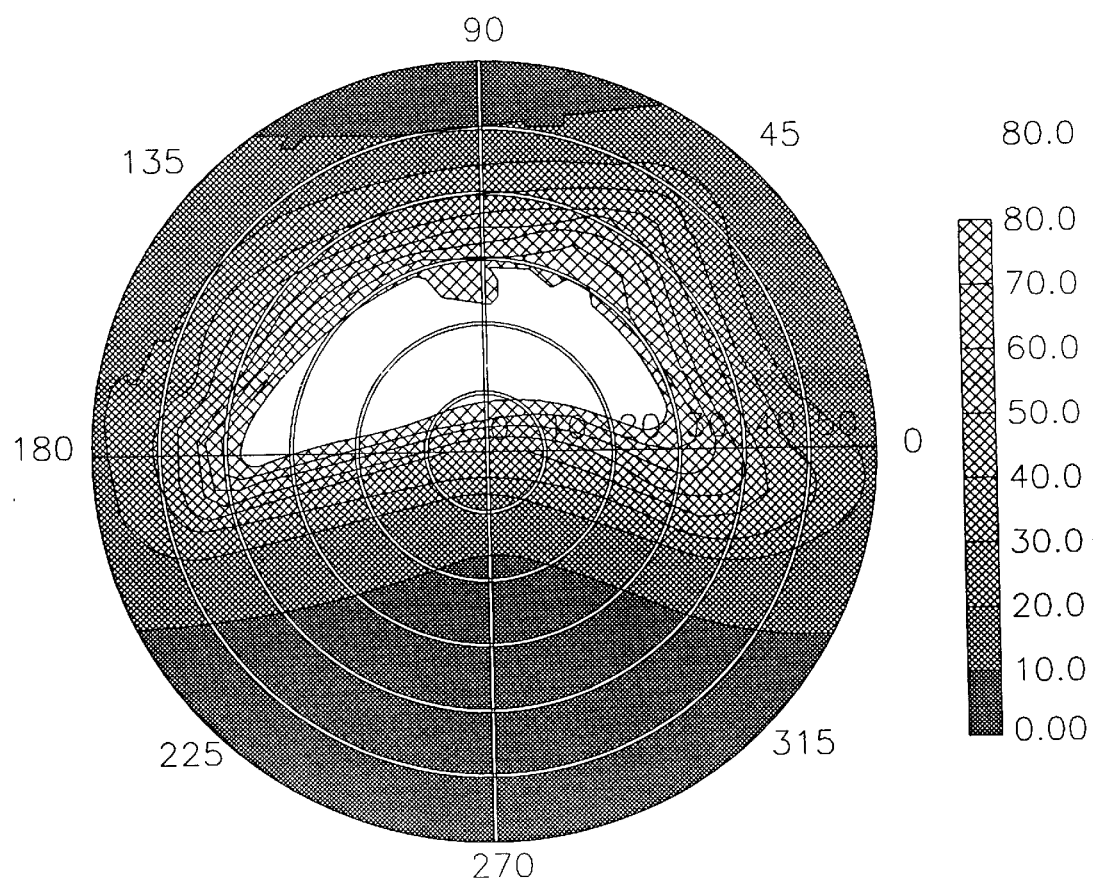
FIG. 26(b) is white light contrast ratio graph of the NW LV made and tested in Example 14, in accordance with FIGS. 1 and 26(a), where the cell gap was 5.20 μm, 5.5 driving volts were applied in the on-state, and d·($n_x$–$n_z$)=100 nm for the rear negative biaxial retarder and 75 nm for the front negative biaxial retarder.

In this fourteenth Example, a NW LV having a cell gap of 5.20 μm was made and tested in accordance with FIGS. 1, 26(a), and 26(b). Each of the front and rear positive uniaxial retarders 2 and 14 had a retardation value of 140 nm. The rear negative biaxial retarder 4 had a retardation value d·$(n_x-n_z)$ of 100 nm, and a retardation of d·$(n_x-n_y)$ of 12 nm. Meanwhile, the front negative biaxial retarder 13 had a retardation value d·$(n_x-n_z)$ of 75 nm, and a retardation value d $(n_x-n_y)$ of 9 nm. The cell gap of this LV was 5.20 μm.

FIG. 26(a) illustrates the angular relationship between the axes of this LV given a 0° axis 45° clockwise of $B_F$. As illustrated, the axes were oriented as follows: $FBR_x$ at 2°, $R_R$ at 40°, $P_R$ at 44°, $B_F$ at 45°, $RBR_x$ at 89°, $B_R$ at 135°, $R_F$ at 137°, and $P_F$ at 137°.

FIG. 26(b) is a white light contrast ratio graph of the NW LV of this fourteenth Example when 5.5 driving volts were applied to the LC in the on-state. The maximum contrast ratio in FIG. 26(b) was 199.92 while the minimum was 0.68. As will be appreciated by those of skill in the art, the maximum contrast ratio is marked by the cross symbol in the high contrast (white) viewing area. As shown, this LV exhibited a contrast ratio of at least about 10:1 over a horizontal anglular span of at least about 130°. Vertically, the display exhibited a contrast ratio of at least about 10:1 over a vertical angular span of at least about 65°. Along the 0° vertical viewing axis, the display exhibited a contrast ratio of at least about 20:1 over a horizontal angular span of at least about 110°.

EXAMPLE 15

Figure 27A:
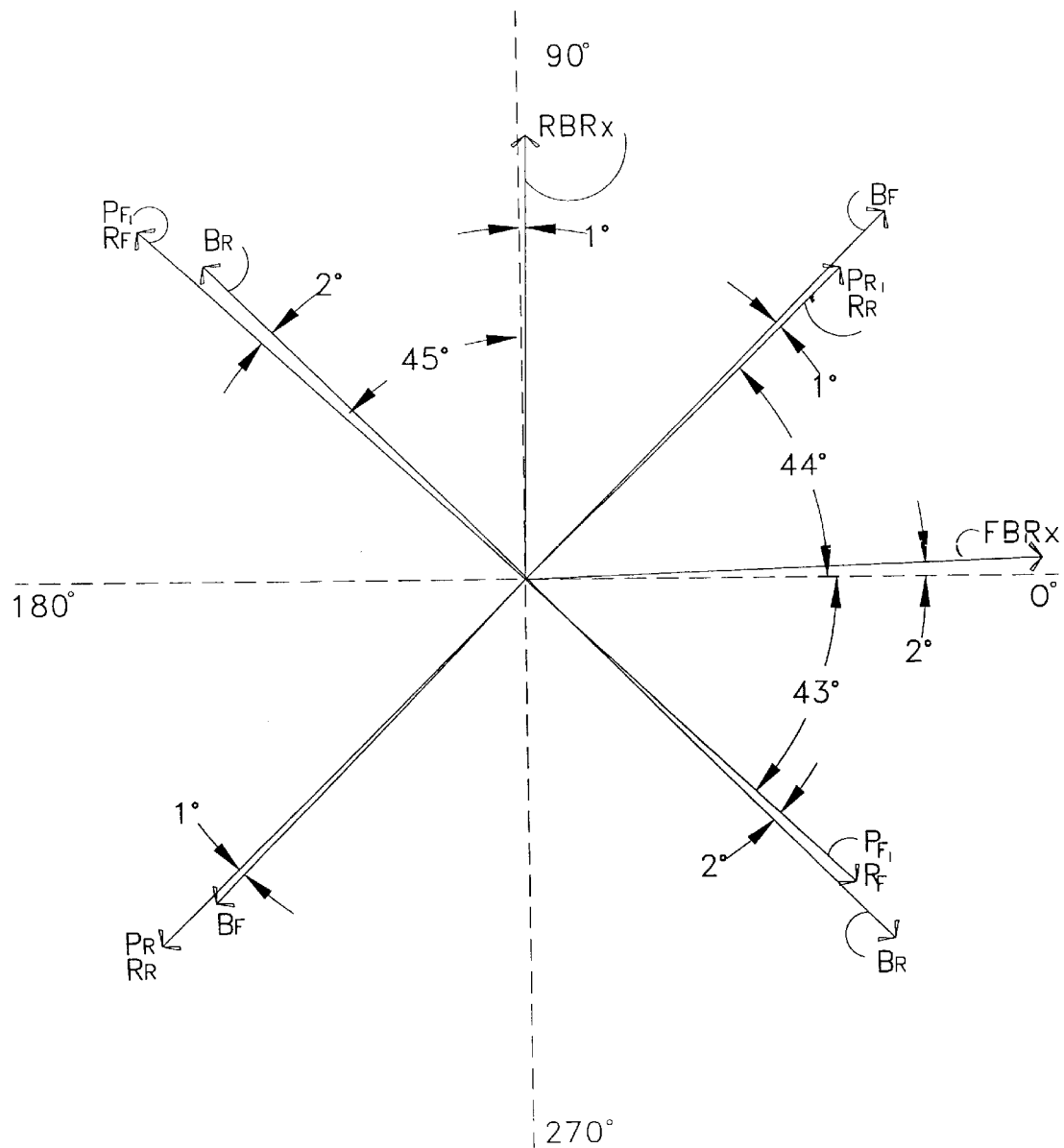
FIG. 27(a) illustrates the angular relationship of the axes of the NW light valves of Examples 15 and 16.
Figure 27B:
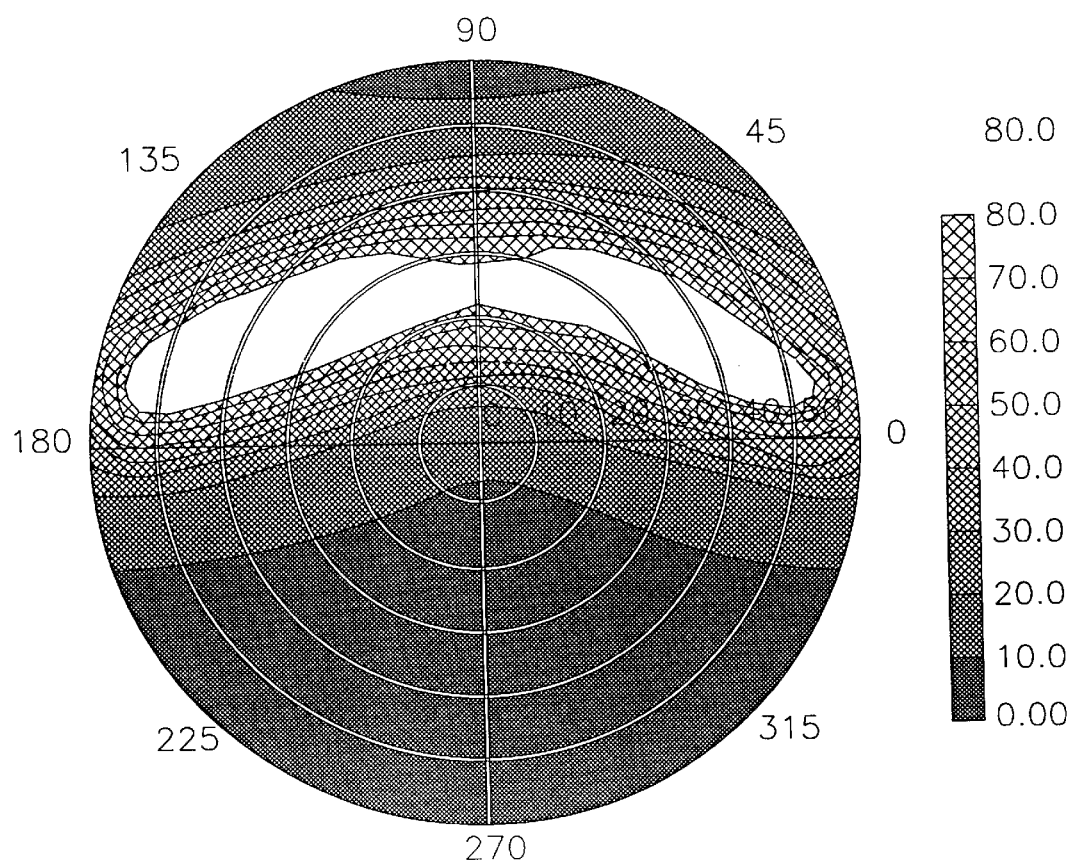
FIG. 27(b) is a white light contrast ratio graph for the normally white light valve made and tested in Example 15, in accordance with FIG. 27(a), where the cell gap was 5.20 μm, 5.5 driving volts were applied in the on-state, and d·($n_x$–$n_z$)=117 nm for each of the two negative biaxial retarders.

In this fifteenth Example, a NW LV having a cell gap of 5.20 μm was made and tested in accordance with FIGS. 1, 27(*a*), and 27(*b*). Each of the positive uniaxial retarders 2 and 14 had a retardation value of 140 nm. Rear negative biaxial retarder 4 had a retardation value d·($n_x$–$n_z$) of 117 nm and a retardation value d·($n_x$–$n_y$) of 12 nm. The front negative biaxial retarder 13 had the same retardation values as rear biaxial retarder 4. FIG. 27(*a*) illustrates the angular relationship between the axes of this NW LV given a 0° axis 45° clockwise of $B_F$. The axes were aligned as follows: $FBR_x$ at 2°, $P_R$ at 44°, $R_R$ at 44°, $B_F$ at 45°, $RBR_x$ at 89°, $B_R$ at 135°, $R_F$ at 137°, and $P_F$ at 137°.

FIG. 27(*b*) is a white light contrast ratio graph of the NW LV of this fifteenth Example when 5.5 driving volts were applied to the LC in the on-state. The maximum contrast ratio marked by the cross symbol in FIG. 27(*b*) was 199.48, while the minimum was 0.80. As illustrated, the 80:1 contrast ratio region extended from about –55° horizontal to about +53° horizontal.

EXAMPLE 16

In this sixteenth Example, a NW LV having a cell gap of 5.20 μm was made and tested in accordance with FIGS. 1, 27(*a*), and 28. The relationship between the respective axes of this LV was the same as in Example 15 (see FIG. 27(*a*)). However, in this sixteenth Example, the rear negative biaxial retarder 4 had retardation values d·($n_x$–$n_z$) of 100 nm and d·($n_x$–$n_y$) of 9 nm. The front biaxial retarder 13 had the same retardation values as the rear retarder 4 in this sixteenth Example. Both positive retarders 2 and 14 each had a retardation value d·Δn of 140 nm.

Figure 28:
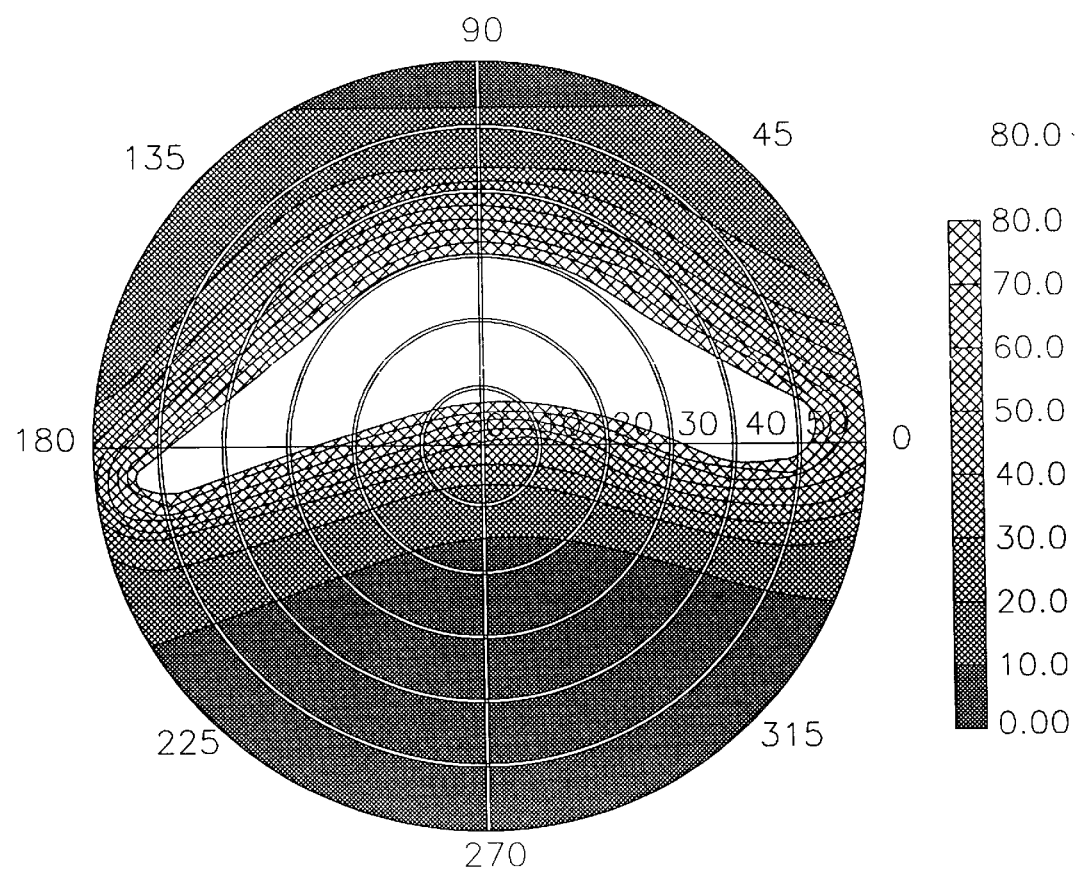
FIG. 28 is a white light contrast ratio graph in accordance with FIGS. 1 and 27(a), for the normally white LV of Example 16, where the cell gap was 5.20 μm, 5.5 driving volts were applied in the on-state, and d ($n_x$–$n_z$)=100 nm for each of the two negative biaxial retarders.

FIG. 28 is a white light contrast ratio graph of the NW LV of this sixteenth Example when 5.5 driving volts were applied to the LC in the on-state. The maximum contrast ratio of FIG. 28 was 293.76 while the minimum was 0.71. The high contrast ratio zone of at least about 80:1 extended horizontally from viewing angles of about –54° to +54°. Meanwhile, along the 0° horizontal viewing axis, the display exhibited a contrast ratio of at least about 80:1 over a vertical range of at least about 22°, and a ratio of at least about 10:1 over a vertical range of at least about 65°.

EXAMPLE 17

Figure 29:
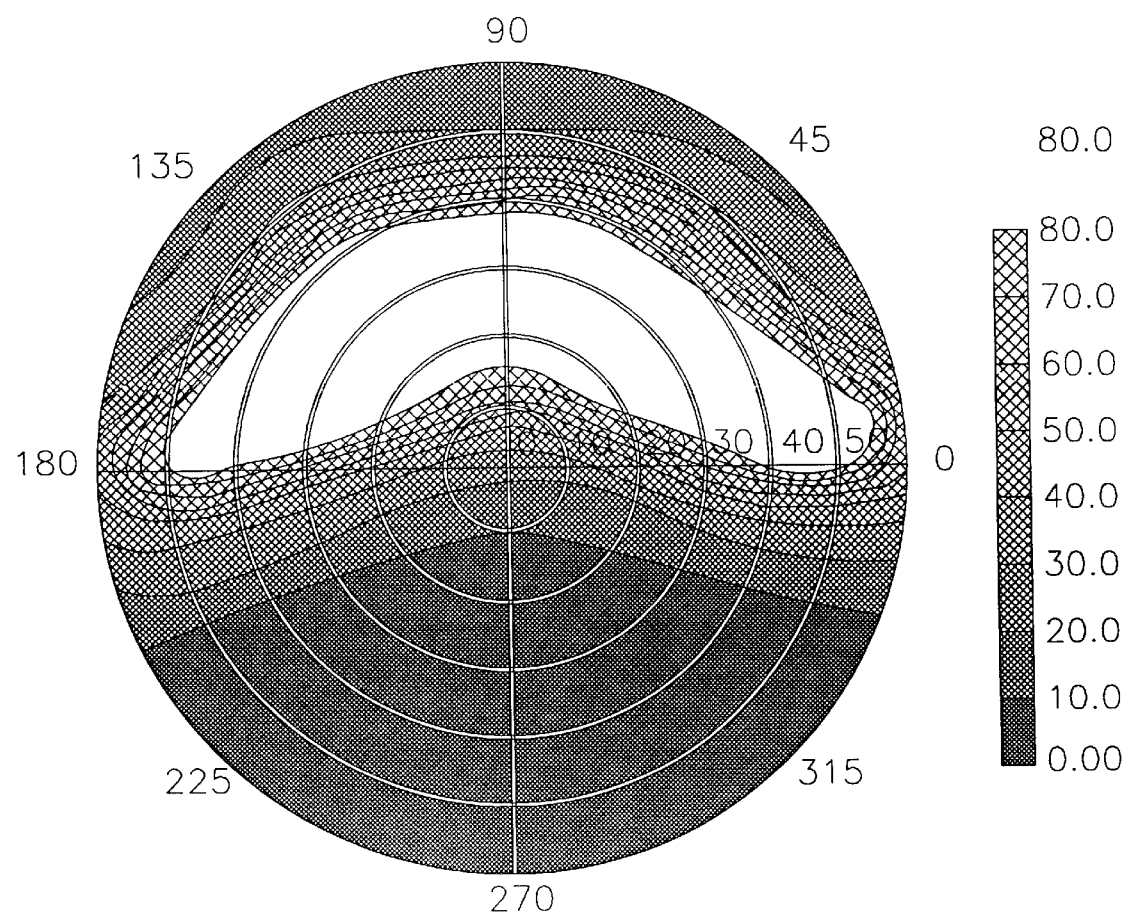
FIG. 29 is a white light contrast ratio graph of the NW light valve made and tested in Example 17, in accordance with FIG. 1, where the cell gap was 5.20 μm, 5.5 driving volts were applied in the on-state, and d·($n_x$–$n_z$)=100 nm for each of the two negative biaxial retarders.

In this seventeenth Example, an NW LV having a cell gap of 5.20 μm was made and tested in accordance with FIGS. 1 and 29. Each of the positive retarders had a retardation value of 140 nm. Each of the rear and front negative biaxial retarders 4 and 13, respectively, had a retardation value d·($n_x$–$n_z$) of 100 nm and a retardation value d·($n_x$–$n_y$) of about 8 nm in this Example. The axes of this LV were the same as in Example 16 (see FIG. 27(*a*)), except that rear positive retarder axis $R_R$ was rotated clockwise 3° from its position shown in FIG. 27(*a*). Otherwise, all axis alignments were the same as in Example 16 and FIG. 27(*a*).

FIG. 29 is a white light contrast ratio graph of the NW LV of this seventeenth Example when 5.5 driving volts were applied to the LC in the on-state. The maximum contrast ratio in FIG. 29 was 314.13, while the minimum was 0.63. Vertically, along the 0° horizontal axis, the LV exhibited a contrast ratio of at least about 10:1 over a vertical angular span of at least about 70°. Horizontally, along the 0° vertical viewing axis, the LV of this Example exhibited a contrast ratio of at least about 20:1 over a horizontal angular span of at least about 120°. At a vertical viewing angle of about +5°, the LV of this Example exhibited a contrast ratio of at least about 30:1 over a horizontal angular span of at least about 120°.

EXAMPLE 18

Figure 30A:
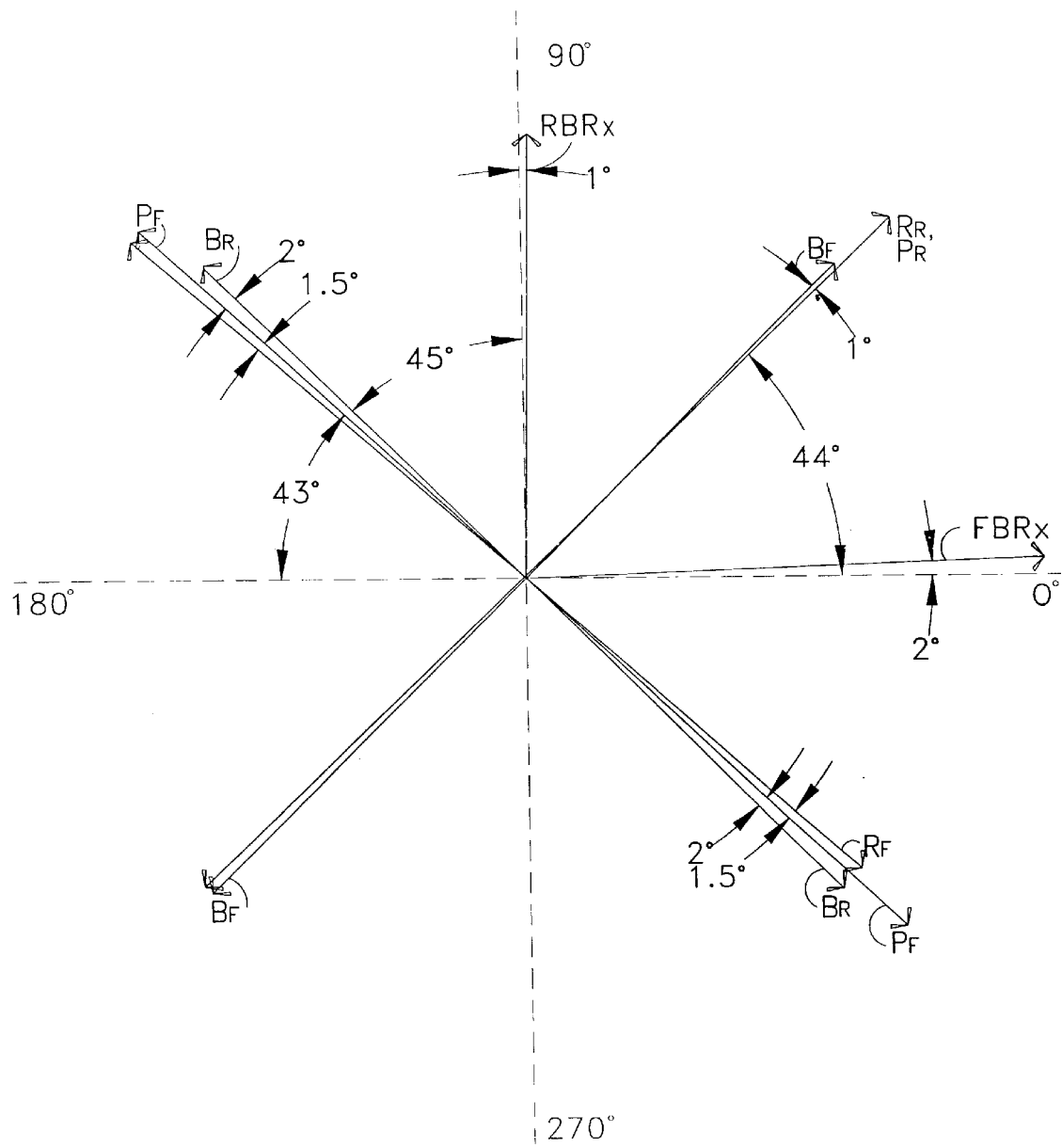
FIG. 30(a) illustrates the angular relationship from the point of view of the viewer, of the axes of the NW light valves of Examples 18 and 19.
Figure 30B:
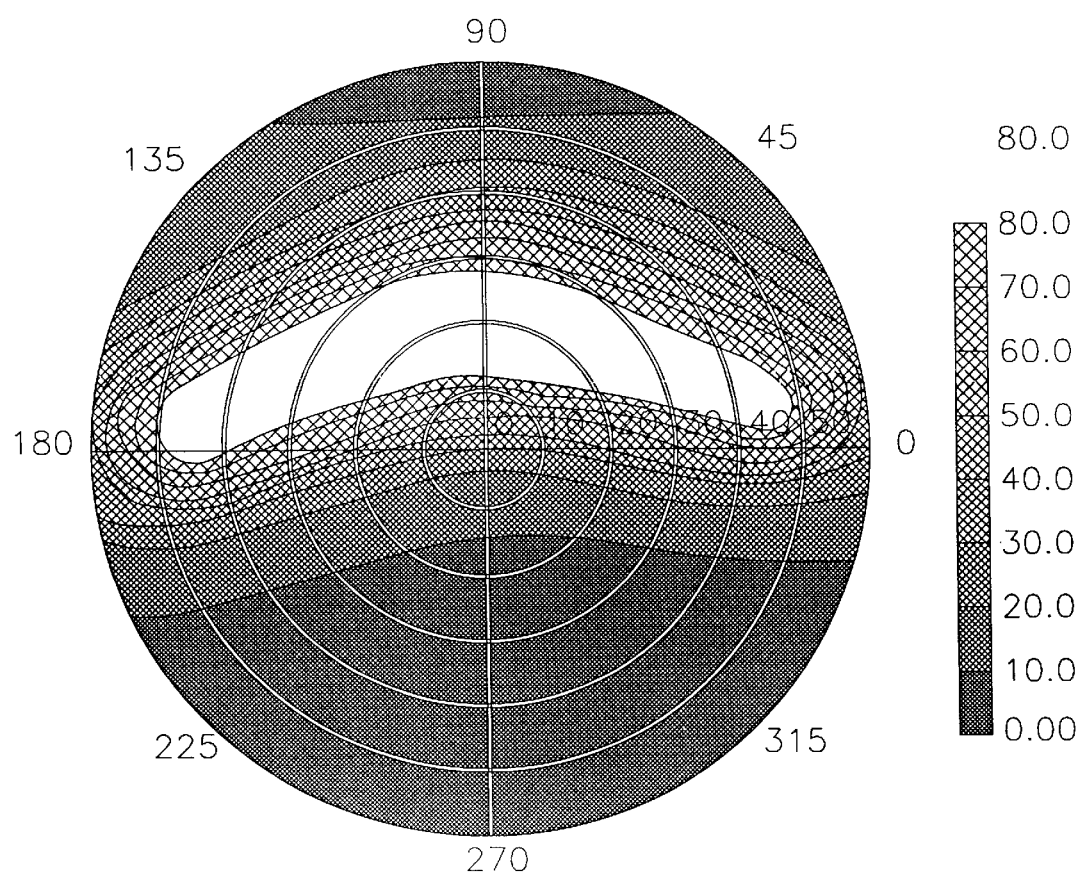
FIG. 30(b) is a white light contrast ratio graph of the NW light valve made and tested in Example 18, in accordance with FIGS. 1 and 30(a), where the cell gap was 5.20 μm, 5.5 driving volts were applied in the on-state, and d·($n_x$–$n_z$)=100 nm for the rear negative biaxial retarder and 83 nm for the front biaxial negative retarder.

In this eighteenth Example, an NW LV having a cell gap "d" of 5.20 μm was made and tested in accordance with FIGS. 1, 30(*a*), and 30(*b*). Each of the positive retarders 2 and 14 had a retardation value of 140 nm. The rear negative biaxial retarder had a retardation value d·($n_x$–$n_z$) of 100 nm and a retardation value d·($n_x$–$n_y$) of 8 nm. The front negative biaxial retarder 13 had a retardation value d·($n_x$–$n_z$) of 83 nm and a retardation value d·(n–$n_y$) of 6 nm.

FIG. 30(*a*), from the point of view of viewer 1, illustrates the relationship between the different axes of the LV of this Example, given a 0° axis 45° clockwise of $B_F$. The axes were aligned as follows: $FBR_x$ at 2°, $P_R$ at 44°, $R_R$ at 44°, $B_F$ at 45°, $RBR_x$ at 89°, $B_R$ at 135°, $P_F$ at 137°, and $R_F$ at 138.5°.

FIG. 30(*b*) is a white light contrast ratio graph of the NW LV of this Example when 5.5 driving volts were applied to the LC in the on-state. The maximum contrast ratio in FIG. 30(*b*) was 237.48, while the minimum was 0.76. As illustrated, at about +5° vertical, the display of this Example exhibited a contrast ratio of at least about 40:1 over a horizontal angular span of at least about 120°. Additionally, the display of this Example, at this viewing angle, exhibited a contrast ratio of at least about 30:1 over this horizontal angular span of at least about 120°.

EXAMPLE 19

In this nineteenth Example, an NW LV in accordance with FIGS. 1, 30(*a*), and 31 was made and tested. The LV of this nineteenth Example was the same as that of Example 18, except that the rear negative biaxial retarder 4 also had a retardation value d·($n_x$–$n_z$) of 83 nm and a retardation value d·($n_x$–$n_y$) of 6 nm. Everything else was the same as in Example 18 (see FIG. 30(*a*))

Figure 31:
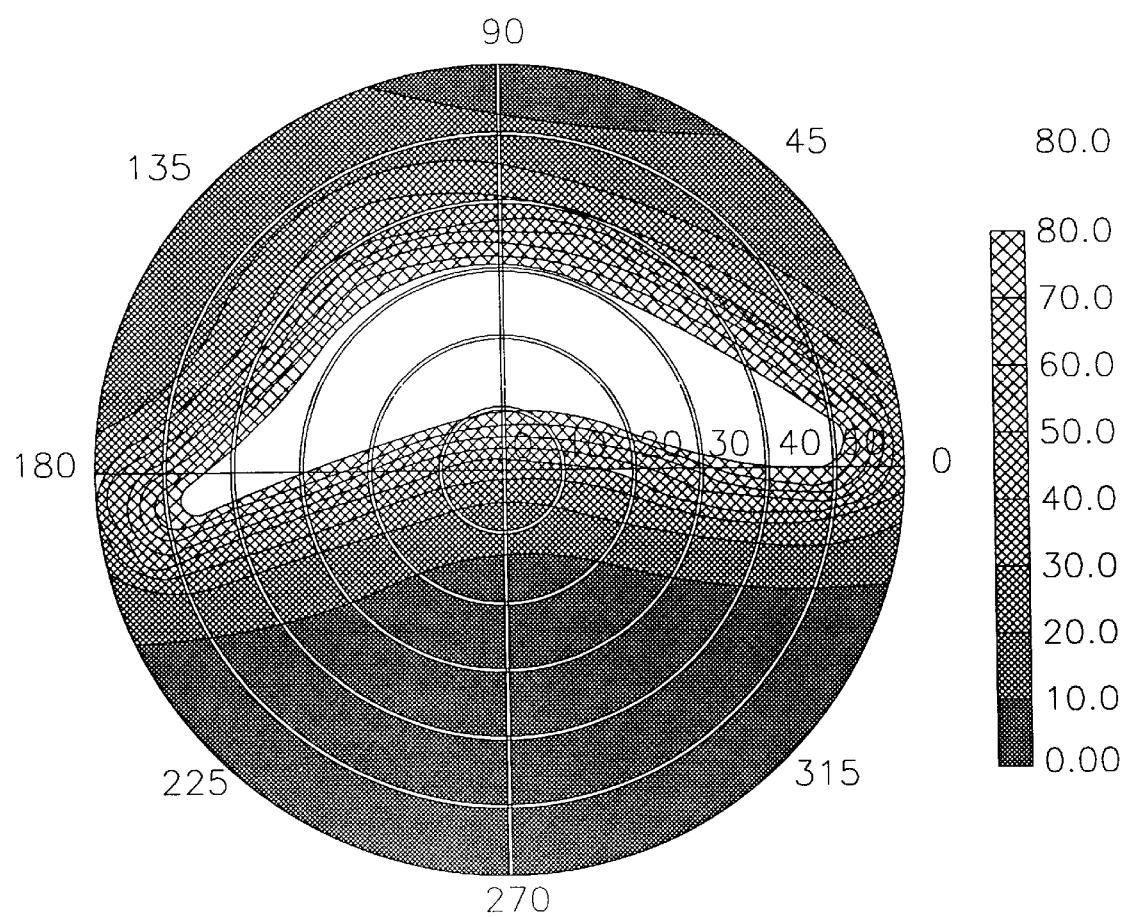
FIG. 31 is a white light contrast ratio graph of the normally white LV made and tested in Example 19, in accordance with FIGS. 1 and 30(a), where the cell gap was 5.20 μm, 5.5 driving volts were applied in the on-state, and d·($n_x$–$n_z$)=83 nm for each of the two negative biaxial retarders.

FIG. 31 is a white light contrast ratio graph of the LV of this nineteenth Example when 5.5 driving volts were applied to the LC in the on-state. As shown, at the 0° vertical viewing axis, this LV would display exhibited a contrast ratio of at least about 20:1 over a horizontal angular span of at least about 120°. Vertically, along the 0° horizontal axis, this LV exhibited a contrast ratio of at least about 10:1 over a vertical angular span of at least about 60°. The high contrast ratio area of at least about 80:1 extended from about –500 horizontal to about +52° horizontal. The highest contrast ratio in FIG. 31 was 192.04, located at the cross symbol, while the minimum was 0.62.

EXAMPLE 20

In this twentieth Example, an NW LV in accordance with FIGS. 1, 32(*a*), and 32(*b*) was made and tested. This LV had a cell gap of 5.20 μm. Each of the positive uniaxial retarders 2 and 14 had a retardation value of 140 nm. Rear negative biaxial retarder 4 had a retardation value d·($n_x$–$n_z$) of 83 nm and a retardation value d·($n_x$–$n_y$) of 6 nm. Front negative biaxial retardation film 13 in this twentieth Example had a retardation value d·($n_x$–$n_z$) of 100 nm, and a retardation value d·($n_x$–$n_y$) of 12 nm. For the rear negative biaxial retarder, $n_x$ was about 1.5854, $n_y$ was about 1.5853, and $n_z$ was about 1.5841. For the front negative biaxial retarder in this Example, $n_x$ was about 1.5855, $n_y$ was about 1.5853, and $n_z$ was about 1.5839.

Figure 32A:
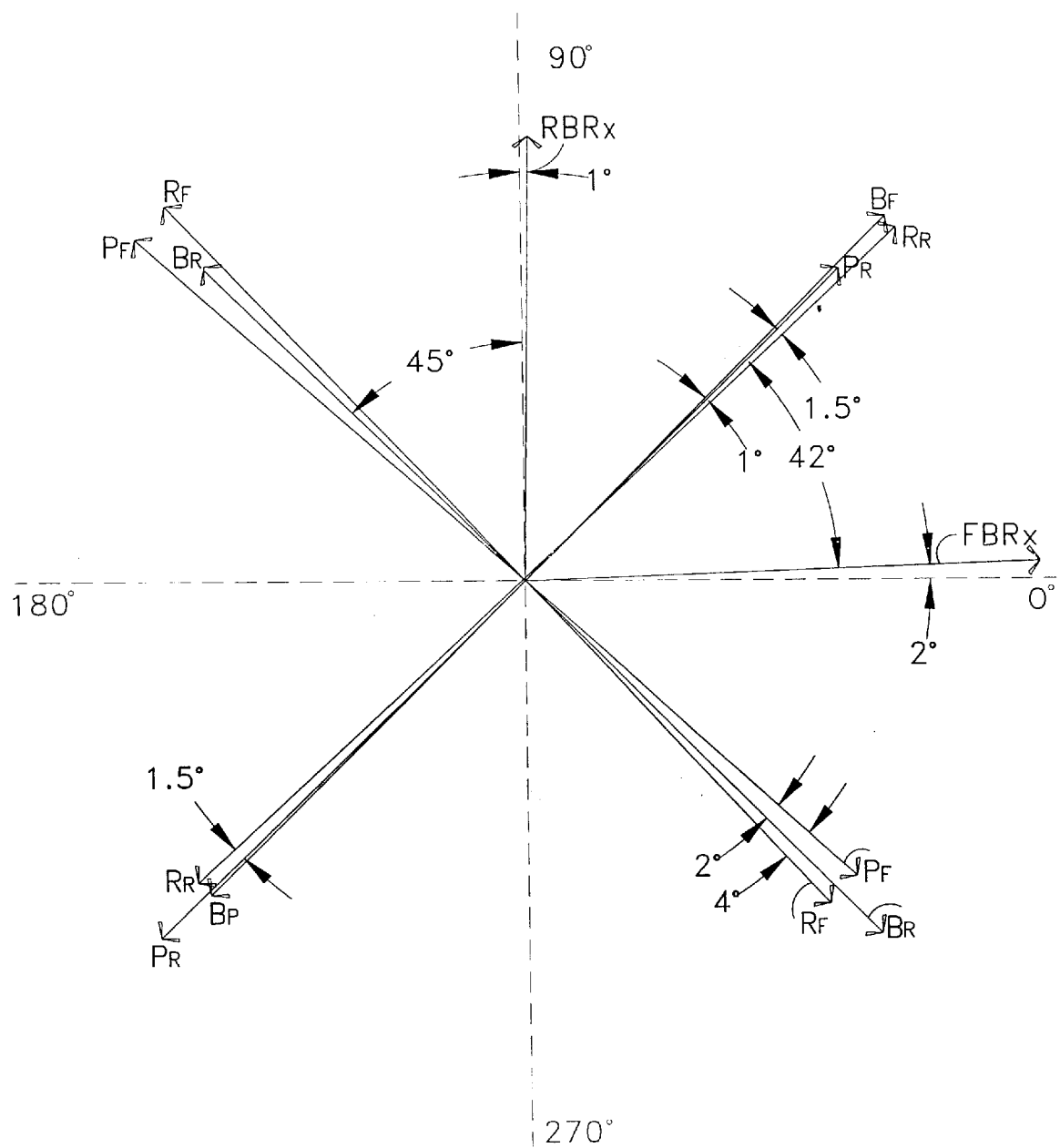
FIG. 32(a) illustrates the relationship between the axes for the NW light valve made and tested in Example 20.

FIG. 32(a), from the point of view of viewer 1, illustrates the relationship between the axes of the LV of this Example, given a 0° axis 45° clockwise of front buffing direction $B_F$. As illustated, the axes were aligned as follows: $FBR_x$ at 2°, $R_R$ at 42.5°, $P_R$ at 44°, $B_F$ at 45°, $RBR_x$ at 89°, $R_F$ at 133°, $B_R$ at 135°, and $P_F$ at 137°.

Figure 32B:
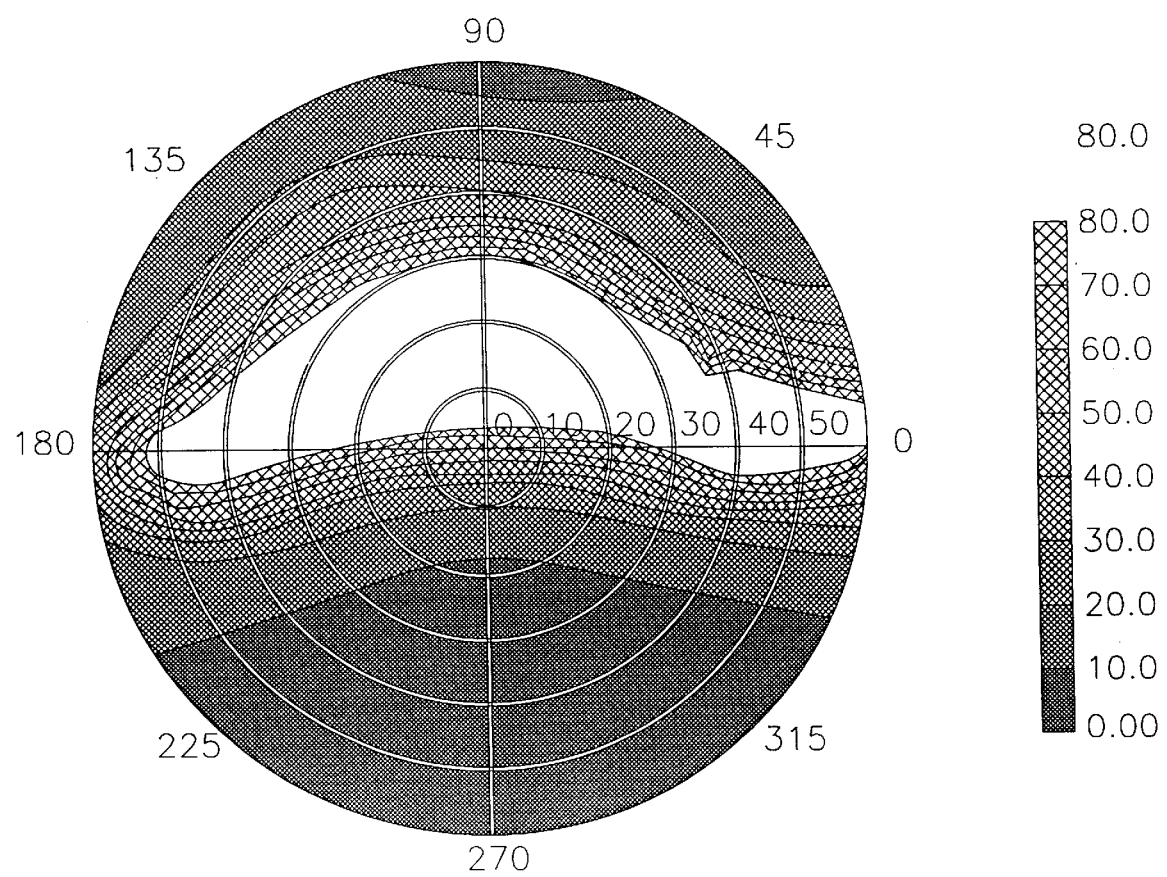
FIG. 32(b) is a white light contrast ratio graph of the NW light valve of Example 20, in accordance with FIGS. 1 and 32(a) where the cell gap was 5.20 μm, 5.5 driving volts were applied, and d·($n_x$–$n_z$)=83 nm for the rear negative biaxial retarder and 100 nm for the front biaxial negative retarder.

FIG. 32(b) is a white light contrast ratio of the V of this twentieth Example when 5.5 driving volts were applied to the LC in the on-state. The maximum contrast ratio in FIG. 32(b) was 263.47, while the minimum was 0.79. As illustrated, at about +5° vertical, the high contrast zone of at least about 80:1 extended over a horizontal angular span of at least about 110°, while the display also exhibited a contrast ratio of at least about 30:1 over this horizontal angular span of at least about 120°. At about +4° vertical, this display or light valve exhibited a contrast ratio of at least about 50:1 over a horizontal angular span of at least about 113°. Vertically, along the 0° horizontal axis, this display exhibited a contrast ratio of at least about 10:1 over a vertical angular span of at least about 70°.

EXAMPLE 21

Figure 33A:
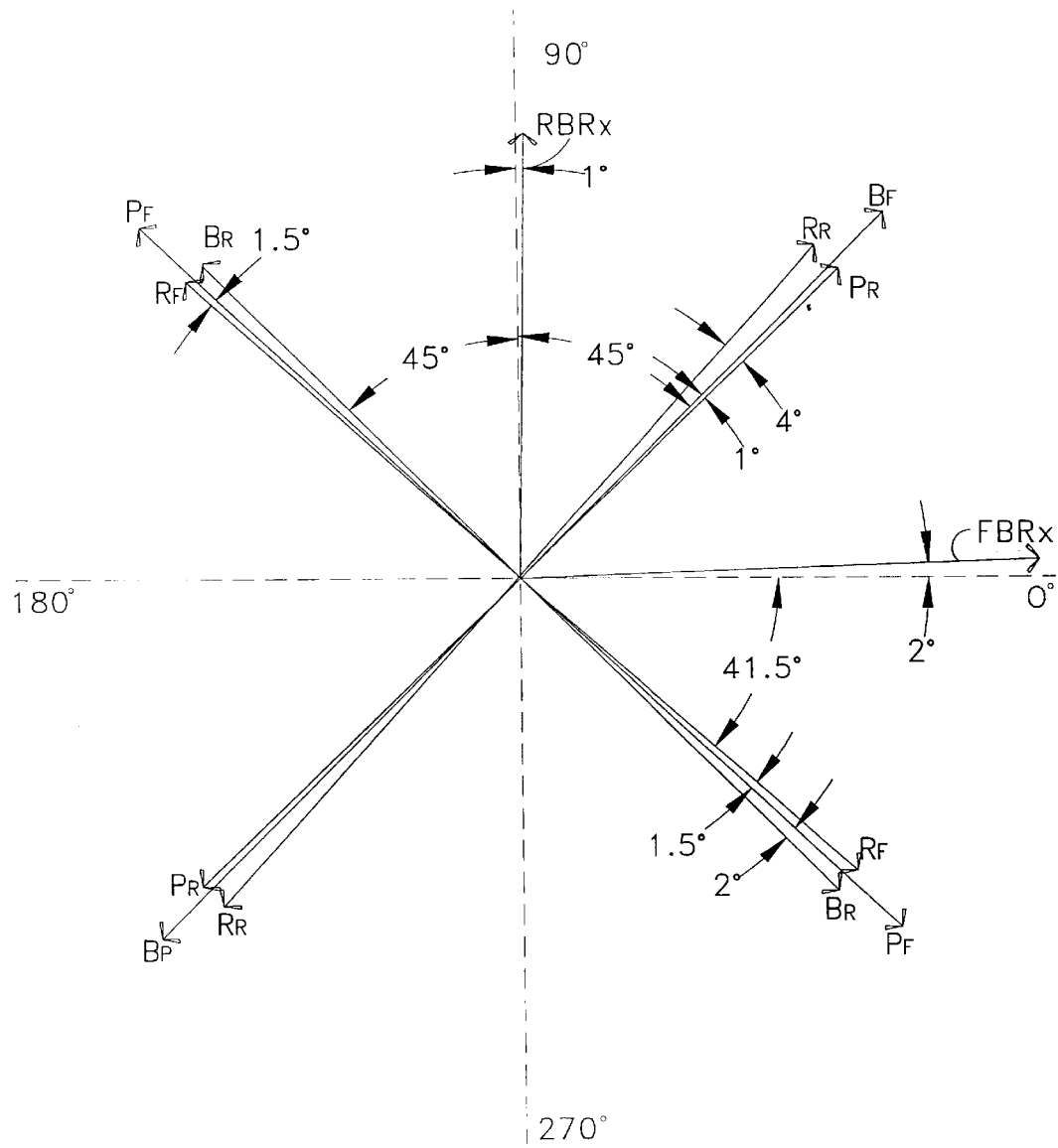
FIG. 33(a) illustrates the angular relationship between the axes of the Example 21 NW light valve.
Figure 33B:
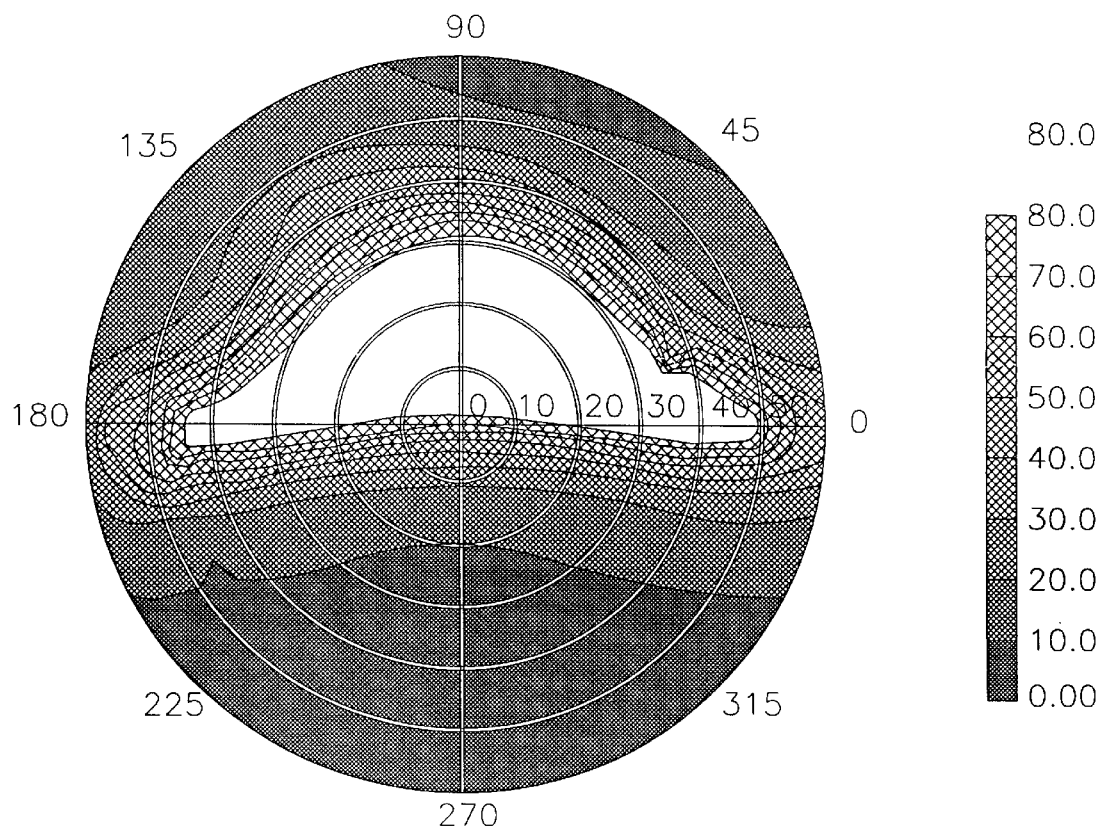
FIG. 33(b) is a white light contrast ratio graph of the NW light valve of Example 21, in accordance with FIGS. 1 and 33(a), where the cell gap was 5.20 μm, 5.5 driving volts were applied in the on-state, and d·($n_x$–$n_z$) =83 nm for the rear biaxial negative retarder and 100 nm for the front biaxial negative retarder.

In this twenty-first Example, an NW LV was made and tested in accordance with FIGS. 1, 33(a), and 33(b). The cell gap "d" for the LV of this Example was 5.20 μm. Each of the positive uniaxial retarders had a retardation value of about 140 nm. The front negative biaxial retarder 13 had a retardation value $d·(n_x-n_z)$ of 100 nm and a value $d·(n_x-n_y)$ of 12 nm, while rear biaxial retarder 4 had values $d·(n_x-n_z)$=83 nm and $d·(n_x-n_y)$=6 nm. FIG. 33(a) illustrates the angular relationship between the axes of this NW LV. FIG. 33(b) is a white light CR graph of this LV when 5.5 driving volts were applied to LC layer 9 in the on-state. The maximum CR for FIG. 33(b) was 334.2°, while the minimum was 0.87.

In FIG. 33(b), the NW LV of this Example had a contrast ratio of at least about 20:1 over a horizontal angular span of at least about 120° along the 0° vertical viewing axis. Additionally, this display had a contrast ratio of at least about 10:1 over a vertical angular span of at least about 70° along the 0° horizontal viewing axis. Along the 0° vertical viewing axis, the NW LV had a contrast ratio at this driving voltage of at least about 40:1 over a horizontal angular span of at least about 105°.

EXAMPLE 22

Figure 34A:
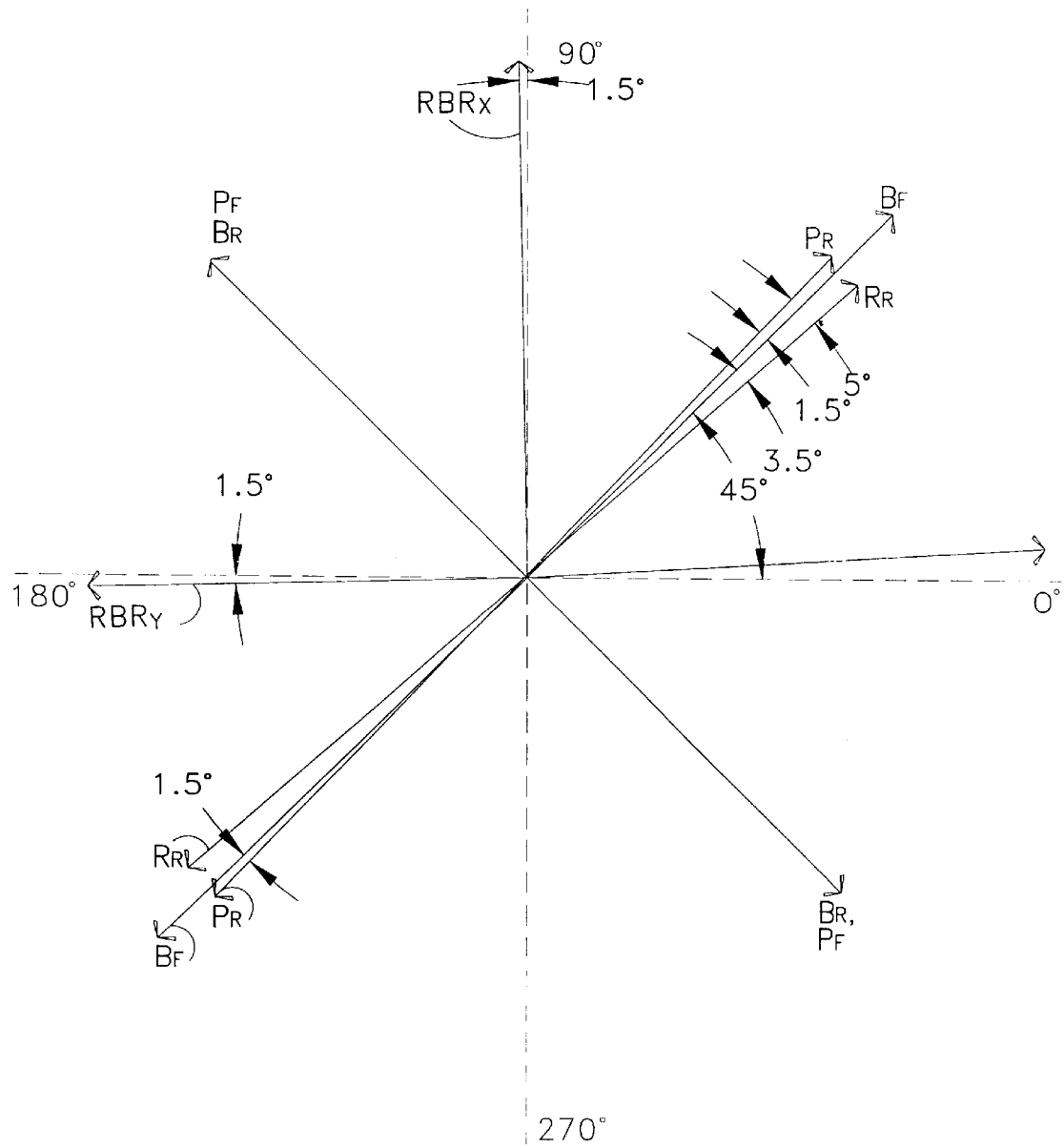
FIG. 34(a) illustrates the angular relationship between the axes of the Example 22 NW light valve.
Figure 34B:
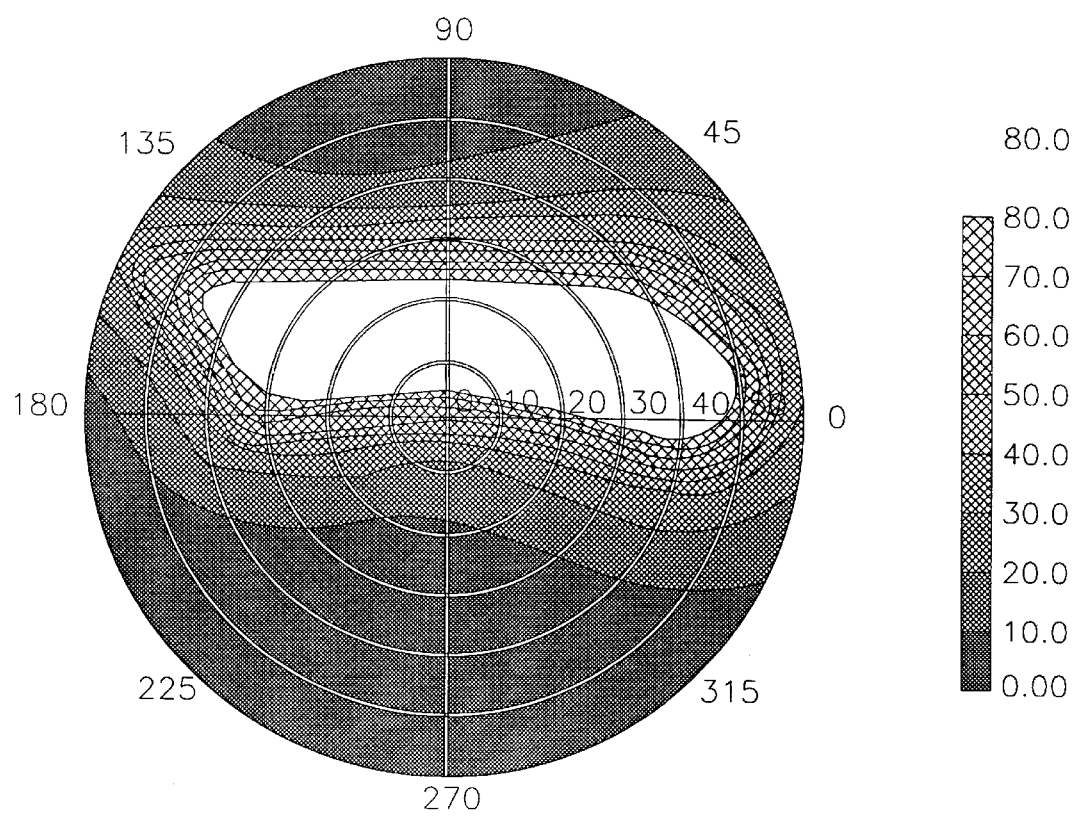
FIG. 34(b) is a white light contrast ratio graph of the NW light valve of Example 22, in accordance with FIG. 13, where the cell gap was 5.20 μm, 5.5 driving volts were applied in the on-state, and d·($n_x$–$n_z$)=a total of about 285 nm for a stack of laminated negative biaxial retarders on the rear side of the LC layer. No front retarders were provided in Example 22.

In this twenty-second Example, an NW LV was made and tested in accordance with FIGS. 13, 34(a), and 34(b). The cell gap for the LV of this Example was 5.20 μm, while 5.5 driving volts was utilized in the on-state with respect to FIG. 34(b). No front retarders were provided (see FIG. 13). From the rear forward, the display included rear polarizer 5, rear 140 nm positive retarder 2, three separate negative biaxial retarders 4 laminated together as a single unit, rear buffing layers 7, LC layer 9, front buffing layer 11, and front polarizer 15. Each of the three negative biaxial retarders 4 laminated together in this Example had a retardation value $d·(n_x-n_z)$ of 95 nm and a retardation value $d·(n_x-n_y)$ of 11 nm. Thus, the "total" retardation for the three negative biaxial retarders provided between layers 2 and 7, was a retardation value $d·(n_x-n_z)$ of 285 nm, and a retardation value $d·(n_x-n_y)$ of 33 nm. FIG. 34(a) illustrates the angular relationship between the axes of this NW LV. As shown, given a 0° axis 45° clockwise from $B_F$, the axes were aligned as follows: $R_R$ at 41.5°, $B_F$ at 45°, $P_R$ at 46.5°, $RBR_x$ at 91.5°, $R_F$ at 135°, $B_R$ at 135°, and $RBR_y$ at 181.5°.

FIG. 34(b) is a white light contrast ratio of the LV of this twenty-second Example when 5.5 driving volts were applied in the on-state. The maximum contrast ratio in FIG. 34(a) was 354.55, while the minimum was 0.57. As shown, the high contrast area is skewed slightly to the right due to the provision of retarders on only one side of the LC layer.

The pretilt angle of the displays and LVs herein may be about 3° in certain embodiments, and the value of d/p (thickness/natural pitch of the LC material) of the LC layers may be about 0.25. Additionally, the Eldin EZ Contrast System was utilized to come up with the circular contrast ratio graph disclosed herein (e.g. see FIGS. 11(d), 12, 15(b), 16, 17, 18, 21(b), 22(b), 23, 24(b), 25, 26(b), 27(b), 28, 29, 30(b), 31, 32(b), and 33(b)).

Once given the above disclosure, many other features, modifications, and improvements will become apparent to the skilled artisan. Such other features, modifications, and improvements are therefore considered to be a part of this invention. The scope of which is to be determined by the following claims.

We claim:

1. A normally white twisted nematic liquid crystal display comprising:

a liquid crystal layer for twisting at least one normally incident visible wavelength of light from about 80°–100° as it passes therethrough when the liquid crystal layer is in substantially the off-state thereby defining a twisted nematic display;

first and second negative biaxial retarders sandwiching said liquid crystal layer therebetween, wherein $n_x > n_y > n_z$ for each of said negative biaxial retarders, wherein $n_z$ is perpendicular to a plane defined by $n_x$ and $n_y$;

wherein each of said negative biaxial retarders has a retardation value $d·(n_x-n_z)$ of from about 70–130 nm; and wherein the display outputs contrast ratios to the viewer of at least about 30:1 at horizontal viewing angles along the 0° vertical axis of about ±60°.

* * * * *